（12）United States Patent
Kobayashi

(10) Patent No.: US 10,267,543 B2
(45) Date of Patent: Apr. 23, 2019

(54) ADSORPTION REFRIGERATOR, METHOD FOR CONTROLLING ADSORPTION REFRIGERATOR, AND COOLING SYSTEM

(71) Applicant: Panasonic Intellectual Property Management Co., Ltd., Osaka (JP)

(72) Inventor: Susumu Kobayashi, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/853,502

(22) Filed: Dec. 22, 2017

(65) Prior Publication Data

US 2018/0224169 A1 Aug. 9, 2018

(30) Foreign Application Priority Data

Feb. 7, 2017 (JP) .................................. 2017-020443

(51) Int. Cl.
 *F25B 15/02* (2006.01)
 *F25B 17/08* (2006.01)
 (Continued)

(52) U.S. Cl.
 CPC .......... *F25B 17/086* (2013.01); *F25B 15/025* (2013.01); *F25B 17/083* (2013.01);
 (Continued)

(58) Field of Classification Search
 CPC ...... F25B 17/083; F25B 49/043; F25B 41/04; F25B 25/005; F25B 2339/047; F25B 15/025
 See application file for complete search history.

(56) References Cited

U.S. PATENT DOCUMENTS 3,421,984 A * 1/1969 Jensen .................... B01D 3/143
 203/4

3,742,728 A * 7/1973 Mamiya ................ F25B 15/008
 62/476

(Continued)

FOREIGN PATENT DOCUMENTS

| JP | 2009-121740 | 6/2009 |
| JP | 2010-002084 | 1/2010 |
| WO | 2013/061746 | 5/2013 |

OTHER PUBLICATIONS

Atsushi Akisawa, "Selection of adsorbents for double effect adsorption refrigeration cycles", Japan Society of Mechanical Engineers (No. 15-12), 20th National Symposium on Power and Energy Systems, Jun. 18, 2015, pp. 127-130 (English Abstract).

*Primary Examiner* — Kun Kai Ma

(74) *Attorney, Agent, or Firm* — McDermott Will & Emery LLP

(57) ABSTRACT

An adsorption refrigerator comprising a first adsorber containing a first adsorbent capable of adsorbing and desorbing a first adsorbent refrigerant, a second adsorber containing a second adsorbent capable of adsorbing and desorbing the first adsorbent refrigerant, a first evaporator capable of evaporating the first adsorbent refrigerant under reduced pressure to cool a first working fluid, a first condenser capable of condensing the first adsorbent refrigerant in gaseous state, a third adsorber containing a third adsorbent capable of adsorbing and desorbing a second adsorbent refrigerant, a fourth adsorber containing a fourth adsorbent capable of adsorbing and desorbing the second adsorbent refrigerant, a second evaporator capable of evaporating the second adsorbent refrigerant under reduced pressure to cool a second working fluid, a second condenser capable of condensing the second adsorbent refrigerant in gaseous state, a first heat exchanger capable of applying heat absorbed from a first heat source to a first heating medium, a second heat exchanger capable of removing and releasing heat from a second heating medium, and a heat recovery path where a third heating medium performs recovery of adsorption heat generated by adsorption-driving of the first (Continued)

adsorber or the second adsorber and performs heat application of regeneration-driving of the third adsorber or the fourth adsorber.

11 Claims, 12 Drawing Sheets

(51) Int. Cl.
    *F25B 25/00*     (2006.01)
    *F25B 41/04*     (2006.01)
    *F25B 49/04*     (2006.01)

(52) U.S. Cl.
    CPC ............ *F25B 25/005* (2013.01); *F25B 41/04* (2013.01); *F25B 49/043* (2013.01); *F25B 49/046* (2013.01); *F25B 2315/005* (2013.01); *F25B 2315/007* (2013.01); *F25B 2339/047* (2013.01); *Y02A 30/277* (2018.01); *Y02A 30/278* (2018.01); *Y02B 30/62* (2013.01); *Y02B 30/64* (2013.01)

(56) References Cited

U.S. PATENT DOCUMENTS

| | | | | |
|---|---|---|---|---|
| 3,831,397 A * | 8/1974 | Mamiya | ............... | F25B 15/008 62/476 |
| 5,463,879 A * | 11/1995 | Jones | ................... | F25B 15/006 62/480 |
| 5,619,866 A * | 4/1997 | Sato | ...................... | F25B 17/083 62/480 |
| 5,727,397 A * | 3/1998 | He | ........................ | F25B 15/008 62/476 |
| 6,003,331 A * | 12/1999 | Kohler | ................. | F25B 15/008 62/476 |
| 6,311,513 B1 * | 11/2001 | Tang | ..................... | F25B 15/008 62/476 |
| 2006/0230776 A1 * | 10/2006 | Inoue | ................... | F25B 15/008 62/324.2 |
| 2011/0225996 A1 * | 9/2011 | Guerra | ................... | F25B 15/04 62/101 |
| 2013/0008783 A1 * | 1/2013 | Shodai | .................... | C25B 1/245 204/274 |
| 2013/0220576 A1 * | 8/2013 | Paulussen | .............. | F25B 17/00 165/65 |
| 2013/0276475 A1 * | 10/2013 | Aso | ........................ | F25B 17/083 62/477 |
| 2015/0075211 A1 * | 3/2015 | Li | .......................... | F25B 15/02 62/477 |
| 2015/0233610 A1 * | 8/2015 | Li | ........................ | F25B 15/006 62/324.2 |
| 2015/0377525 A1 * | 12/2015 | Hirota | .................... | F25B 30/04 62/101 |
| 2016/0258658 A1 * | 9/2016 | Hirota | .................. | F25B 17/083 |

* cited by examiner

ADSORPTION REFRIGERATOR, METHOD FOR CONTROLLING ADSORPTION REFRIGERATOR, AND COOLING SYSTEM

BACKGROUND

1. Technical Field

The present disclosure relates to an adsorption refrigerator, a method for controlling the adsorption refrigerator, and a cooling system.

2. Description of the Related Art

An adsorption refrigerator is known as a thermal heat pump. In the adsorption refrigerator, a material called an adsorbent (e.g., a porous material such as silica gel or zeolite) is disposed inside a container of an adsorber. Water as an adsorbent refrigerant is adsorbed and desorbed, that is, a compressor operation is performed to move the refrigerant against a temperature gradient, so that a heat pump action is achieved.

In an adsorption process of the adsorber, an inside of the container is controlled in a reduced-pressure state by an appropriate vacuum pump. Thus, vapor having a low temperature (e. g., approximately 6° C.) is adsorbed by the adsorbent from an evaporator. Further, in the adsorption process of the adsorber, the adsorbent generates heat by adsorbing vapor. Thus, the heat of the adsorbent is removed by a cooling water from an appropriate heat exchanger (e.g., a cooling tower). Accordingly, the adsorbent is maintained at a temperature suitable for an adsorption performance of the adsorbent.

The adsorption of vapor is performed when the adsorbent is dry. However, the adsorbent becomes saturated with water vapor and stops the adsorption of vapor after a while. Thus, regeneration (recovery) of the adsorbent is required.

In a regeneration process of the adsorber, the adsorbent is heated by heat of an appropriate external heat source. When a temperature of the adsorbent increases by heating the adsorbent, moisture adhered to the adsorbent is detached (desorbed), so that the adsorption performance of the adsorbent recovers. The vapor separated from the adsorbent is cooled by heat exchange with a cooling water inside a condenser and returned as liquid water to the condenser.

In this manner, the vapor adsorption and the regeneration of the adsorbent are alternately performed in the adsorber of the adsorption refrigerator.

A conventional single effect adsorption refrigerator is typically provided with a pair of such adsorbers. When one of the adsorbers performs the adsorption process, the other adsorber performs the regeneration process. The single effect adsorption refrigerator is configured to continuously generate refrigeration output by timely switching between the adsorption process and the regeneration process.

Hereinbelow, a configuration and an operation of the single effect adsorption refrigerator will be described with reference to drawings. FIGS. 1 and 2 illustrate an example of the conventional single effect adsorption refrigerator.

Single effect adsorption refrigerator 100 includes a pair of adsorbers 101, 102 (hereinbelow, referred to as paired adsorbers 101, 102), refrigerant system 300, thermal system 400, and cooling water system 500.

In each of paired adsorbers 101, 102, an adsorbent such as silica gel or zeolite is filled in a container. Here, a pressure inside each of paired adsorbers 101, 102 is reduced to a pressure of approximately ¹⁄₁₀₀ atmospheres by a vacuum pump (not illustrated).

A flow path member passes through each of paired adsorbers 101, 102. A heating medium (e.g., water) which performs heat exchange with the adsorbent flows through the flow path member. That is, the flow path member includes a heat exchange member such as a heat exchange fin or a heat exchange coil.

Three-way valves 121, 123 are disposed near an exit and an entrance of the flow path member of adsorber 101 so as to timely supply a high-temperature heating medium which circulates through circulation path 120 of thermal system 400 to adsorber 101 and to timely supply a cooling water which circulates through circulation path 130 of cooling water system 500 to adsorber 101. That is, the exit and the entrance of adsorber 101 are connected to both of thermal system 400 and cooling water system 500 respectively through three-way valves 123, 121. Thus, single effect adsorption refrigerator 100 is configured to select whether to pass the heating medium or to pass the cooling water into adsorber 101.

Further, three-way valves 122, 124 are disposed near an exit and an entrance of the flow path member of adsorber 102 so as to timely supply the high-temperature heating medium which circulates through circulation path 120 of thermal system 400 to adsorber 102 and to timely supply the low-temperature cooling water which circulates through circulation path 130 of cooling water system 500 to adsorber 102. That is, the exit and the entrance of adsorber 102 are connected to both of thermal system 400 and cooling water system 500 respectively through three-way valves 124, 122. Thus, single effect adsorption refrigerator 100 is configured to select whether to pass the heating medium or to pass the cooling water into adsorber 102.

For example, an electromagnetic ball valve can be used as each of three-way valves 121, 122, 123, 124.

Paired adsorbers 101, 102 are connected to evaporator 115 respectively through two-way valves 111, 112 and also connected to condenser 116 respectively through two-way valves 113, 114.

For example, an electromagnetic or pneumatic butterfly valve can be used as each of two-way valves 111, 112, 113, 114.

FIG. 1 illustrates a state in which the adsorber 101 performs the adsorption process and the adsorber 102 performs the regeneration process. FIG. 2 illustrates a state in which the adsorber 101 performs the regeneration process and the adsorber 102 performs the adsorption process. That is, heating by the heating medium and cooling by the cooling water are alternately performed in paired adsorbers 101, 102.

In FIGS. 1 and 2, in order to facilitate understanding of details of the drawings, an open side of each of three-way valves 121, 122, 123, 124 is indicated in black, and a closed side of each of three-way valves 121, 122, 123, 124 is indicated in white for convenience. Further, each of two-way valves 111, 112, 113, 114 in an open state is indicated in black, and each of two-way valves 111, 112, 113, 114 in a closed state is indicated in white. Further, solid lines indicate circulation path 130 in a communicating state and a path for vapor adsorbed by the adsorbent. Dotted lines indicate circulation path 120 in a communicating state and a path for regeneration vapor. Thin two-dot chain lines indicate paths in a non-communicating state through which no heating medium flows.

Hereinbelow, single effect adsorption refrigerator 100 in a case where adsorber 101 performs the adsorption process and adsorber 102 performs the regeneration process will be described in more detail with reference to FIG. 1. Single effect adsorption refrigerator 100 of FIG. 2 can be easily understood from the following description. Thus, description for FIG. 2 will be omitted. Water is typically used as the heating medium of refrigerant system 300 and thermal system 400 of single effect adsorption refrigerator 100. Thus, the configuration and the operation of single effect adsorption refrigerator 100 that uses water as the heating medium will be described.

A water temperature in refrigerant system 300, a water temperature in thermal system 400, and a water temperature in cooling water system 500 differ from each other. As an example, the water temperature in refrigerant system 300 is approximately 15° C., the water temperature in thermal system 400 is approximately 80° C., and the water temperature in cooling water system 500 is approximately 30° C.

Respective ends of water path 110 in refrigerant system 300 are connected to evaporator 115 and condenser 116.

In evaporator 115, refrigeration output is taken out by evaporation of water inside evaporator 115. That is, cool water cooled by the evaporation of water can be fed to outside from evaporator 115.

In the present example, two-way valve 111 is open, and two-way valve 112 is closed. Thus, vapor generated in evaporator 115 is adsorbed by the adsorbent of adsorber 101.

In condenser 116, vapor generated in the regeneration process is cooled by circulating water flowing through circulation path 130 in cooling water system 500. Accordingly, condensed water is generated inside condenser 116. The condensed water is fed to evaporator 115 described above by power of pump 117 and reused as water for evaporation. In the present example, two-way valve 113 is closed, and two-way valve 114 is open. Thus, vapor generated in the regeneration process by adsorber 102 is supplied to condenser 116.

For example, a magnet pump or a cascade pump can be used as pump 117.

Heat source heat exchanger 125, adsorber 102, buffer tank 126, and pump 127 are disposed in this order in a circulating water flowing direction on circulation path 120 in thermal system 400. In heat source heat exchanger 125, circulating water flowing through circulation path 120 is used as a heat receiving fluid. Thus, heat can be taken into thermal system 400 from an appropriate heat source (that is, circulating water flowing through circulation path 120 is heated). In the present example, high-temperature circulating water that has passed through heat source heat exchanger 125 in circulation path 120 is fed into adsorber 102 by valve operations of three-way valves 121, 122, 123, 124 and power of pump 127. Accordingly, the adsorbent of adsorber 102 is heated by heat exchange with the high-temperature circulating water, so that the regeneration process of adsorber 102 is performed.

For example, a magnet pump or a cascade pump can be used as pump 127. Buffer tank 126 is a tank for buffer that temporarily stores hot water.

Heat source heat exchanger 131 (e.g., a cooling tower), pump 132, adsorber 101, and condenser 116 are disposed in this order in a circulating water flowing direction on circulation path 130 in the cooling water system 500. In heat exchanger 131, circulating water flowing through circulation path 130 is used as a heat applying fluid. Thus, heat is removed from circulating water in circulation path 130 when the circulating water passes through heat exchanger 131 (that is, the circulating water flowing through circulation path 130 is cooled). In the present example, low-temperature circulating water that has passed through heat exchanger 131 in circulation path 130 is fed into adsorber 101 by valve operations of three-way valves 121, 122, 123, 124 and power of pump 132. Accordingly, the adsorbent of adsorber 101 is cooled by heat exchange with the low-temperature circulating water and maintained at a temperature suitable for the adsorption process. The circulating water that has passed through an inside of the adsorber 101 is used for cooling vapor generated in the regeneration process in condenser 116 described above.

For example, a magnet pump or a cascade pump can be used as pump 132.

In this manner, in single effect adsorption refrigerator 100, when adsorber 101 performs the adsorption process, adsorber 102 performs the regeneration process. Single effect adsorption refrigerator 100 continuously generates refrigeration output by timely switching between the adsorption process and the regeneration process.

The switching described above may be, for example, a system that previously fixes a cycle time or a system that performs control based on a temperature of each of paired adsorbers 101, 102. In the latter case, it is preferred that a pair of temperature detectors (not illustrated) be disposed near the exit and the entrance of the flow path member of adsorber 101, and a pair of temperature detectors (not illustrated) be disposed near the exit and the entrance of the flow path member of adsorber 102. That is, a state of the adsorption process and a state of the regeneration process of paired adsorbers 101, 102 can be understood from a difference in temperatures detected by the pair of temperature detectors (hereinbelow, referred to as a detected temperature difference). For example, when vapor adsorption by the adsorbent has been completely stopped, and the adsorbent has been completely regenerated, the detected temperature difference becomes zero in theory.

Next, double effect of an adsorption refrigerator will be described. So-called double effect of a refrigeration cycle is a system that uses exhaust heat obtained from a first adsorption refrigeration cycle at a side where an operating temperature is high to drive a second adsorption refrigeration cycle at a side where the operating temperature is low in a thermal heat pump.

For example, in an absorption refrigerator, a double effect cycle of a condensation heat recovery system is commonly known. In the double effect cycle of the condensation heat recovery system, regeneration of a low-temperature regenerator is performed by condensation heat of high-temperature regeneration vapor obtained from a high-temperature regenerator. In this case, a coefficient of performance (COP) of the double effect cycle is calculated from a theoretical formula of (Formula 1) described below.

$$\varepsilon 0 = \varepsilon 1 + (\varepsilon 1 \times \varepsilon 2) = \varepsilon 1 \times (1 + \varepsilon 2) \quad \text{(Formula 1)}$$

In (Formula 1), ε0 is the COP of the double effect cycle, ε1 is a single effect COP of a first refrigeration cycle, and ε2 is a single effect COP of a second refrigeration cycle.

A COP of a single effect absorption refrigerator is approximately 0.6. Thus, when the single effect COP of the first refrigeration cycle and the single effect COP of the second refrigeration cycle are both 0.6, ε0=0.96 is calculated by substituting the single effect COPs into (Formula 1). That is, the double effect cycle has a COP that is higher by approximately 60% than the single effect cycle.

It is known that the double effect cycle can also be applied to an adsorption refrigerator similarly to the absorption refrigerator described above. In the adsorption refrigerator, in addition to the double effect by the condensation heat recovery system described above, double effect by an adsorption heat recovery system can be employed (e.g., refer to NPL 1).

NPL 1 discloses that the double effect by the adsorption heat recovery system can achieve a higher efficiency than the double effect by the condensation heat recovery system by selecting an appropriate adsorbent.

Adsorption heat is generated with vapor adsorption by an adsorbent in an adsorption process in an adsorber of an adsorption refrigerator. That is, the adsorption heat is generated as a result of that water vapor sucked to an adsorber is adsorbed by the adsorbent and loses kinetic energy. Thus, the adsorption heat is equal in heat quantity to condensation heat generated in the regeneration process of the adsorber. The double effect by the adsorption heat recovery system is a system that recovers the adsorption heat by a heating medium and regeneration-drives the second adsorption refrigeration cycle by the heat recovered by the heating medium.

CITATION LIST

Non-Patent Literature

NPL 1: "Selection of adsorbents for double effect adsorption refrigeration cycles" by Akisawa Atsushi, Japan Society of Mechanical Engineers (No. 15-12), 20th National Symposium on Power and Energy Systems (2015.06.18-19, Sendai)

NPL 1 discloses that, when silica gel and a combination with silica gel are used as an adsorbent of an adsorber, it is possible to achieve a double effect adsorption refrigerator having a COP of approximately 1.0 by exhaust heat of approximately 120° C. Further, NPL 1 also discloses that, when a combination of an adsorbent "AQSOR (registered trademark)-Z02" and an adsorbent "AQSOR (registered trademark)-Z01" which are put on market by Mitsubishi Plastics, Inc. is used as an adsorbent, it is possible to achieve a double effect adsorption refrigerator having a COP of approximately 1.0 by exhaust heat of approximately 90° C.

However, NPL 1 merely describes an operation principle of the double effect by the adsorption heat recovery system, but discloses no specific element of such an adsorption refrigerator.

SUMMARY

One non-limiting and exemplary embodiment provides an adsorption refrigerator provided with specific elements for double effect by an adsorption heat recovery system. Further, one non-limiting and exemplary embodiment provides a method for controlling the adsorption refrigerator. Furthermore, one non-limiting and exemplary embodiment provides a cooling system provided with the adsorption refrigerator.

In one general aspect, the techniques disclosed here feature an adsorption refrigerator comprising:

a first adsorber containing a first adsorbent capable of adsorbing and desorbing a first adsorbent refrigerant;

a second adsorber containing a second adsorbent capable of adsorbing and desorbing the first adsorbent refrigerant;

a first evaporator capable of evaporating the first adsorbent refrigerant under reduced pressure to cool a first working fluid;

a first condenser capable of condensing the first adsorbent refrigerant in gaseous state;

a third adsorber containing a third adsorbent capable of adsorbing and desorbing a second adsorbent refrigerant;

a fourth adsorber containing a fourth adsorbent capable of adsorbing and desorbing the second adsorbent refrigerant;

a second evaporator capable of evaporating the second adsorbent refrigerant under reduced pressure to cool a second working fluid;

a second condenser capable of condensing the second adsorbent refrigerant in gaseous state;

a first heat exchanger capable of applying heat absorbed from a first heat source to a first heating medium;

a second heat exchanger capable of removing and releasing heat from a second heating medium; and a controller that performs control for switching to any of a first state, a second state, a third state, and a fourth state, wherein:

in the first state, the first evaporator is connected to the first adsorber, the second evaporator is connected to the third adsorber, the controller connects an inlet port of the second adsorber to an outlet port of the first heat exchanger and connects an outlet port of the second adsorber to an inlet port of the first heat exchanger to form a first circulation path, the first heating medium which has flown out of the outlet port of the first heat exchanger flows into the inlet port of the second adsorber, the first adsorbent refrigerant adsorbed by the second adsorbent is desorbed by heat of the first heating medium heated by the first heat exchanger in the second adsorber, the first heating medium which has flown out of the outlet port of the second adsorber flows into the inlet port of the first heat exchanger, the controller connects an inlet port of the third adsorber to an outlet port of the second heat exchanger, connects an outlet port of the third adsorber to an inlet port of the second condenser, connects an outlet port of the second condenser to an inlet port of the first condenser, and connects an outlet port of the first condenser to an inlet port of the second heat exchanger to form a second circulation path, the second heating medium which has flown out of the outlet port of the second heat exchanger flows into the inlet port of the third adsorber, the second adsorbent refrigerant evaporated by the second evaporator is adsorbed by the third adsorbent in the third adsorber to heat the second heating medium, the second heating medium which has flown out of the outlet port of the third adsorber flows into the inlet port of the second condenser, the second heating medium which has flown out of the outlet port of the second condenser flows into the inlet port of the first condenser, the second heating medium which has flown out of the outlet port of the first condenser flows into the inlet port of the second heat exchanger, the controller connects an outlet port of the first adsorber to an inlet port of the fourth adsorber and connects an inlet port of the first adsorber to an outlet port of the fourth adsorber to form a third circulation path, the first adsorbent refrigerant evaporated by the first evaporator is adsorbed by the first adsorbent in the first adsorber to heat a third heating medium, the third heating medium which has flown out of the outlet port of the first adsorber flows into the inlet port of the fourth adsorber, the second adsorbent refrigerant adsorbed by the fourth adsorbent is desorbed by heat of the third heating medium in the fourth adsorber, and the third heating medium which has flown out of the outlet port of the fourth adsorber flows into the inlet port of the first adsorber;

in the second state, the first evaporator is connected to the second adsorber, the second evaporator is connected to the fourth adsorber, the controller connects the inlet port of the first adsorber to the outlet port of the first heat exchanger and connects the outlet port of the first adsorber to the inlet port of the first heat exchanger to form a fourth circulation path, the first heating medium which has flown out of the outlet port of the first heat exchanger flows into the inlet port of the first adsorber, the first adsorbent refrigerant adsorbed by the first adsorbent is desorbed by heat of the first heating medium heated by the first heat exchanger in the first adsorber, the first heating medium which has flown out of the outlet port of the first adsorber flows into the inlet port of the first heat exchanger, the controller connects the inlet port of the fourth adsorber to the outlet port of the second heat exchanger, connects the outlet port of the fourth adsorber to the inlet port of the second condenser, connects the outlet port of the second condenser to the inlet port of the first condenser, and connects the outlet port of the first condenser to the inlet port of the second heat exchanger to form a fifth circulation path, the second heating medium which has flown out of the outlet port of the second heat exchanger flows into the inlet port of the fourth adsorber, the second adsorbent refrigerant evaporated by the second evaporator is adsorbed by the fourth adsorbent in the fourth adsorber to heat the second heating medium, the second heating medium which has flown out of the outlet port of the fourth adsorber flows into the inlet port of the second condenser, the second heating medium which has flown out of the outlet port of the second condenser flows into the inlet port of the first condenser, the second heating medium which has flown out of the outlet port of the first condenser flows into the inlet port of the second heat exchanger, the controller connects the outlet port of the second adsorber to the inlet port of the third adsorber and connects the inlet port of the second adsorber to the outlet port of the third adsorber to form a sixth circulation path, the first adsorbent refrigerant evaporated by the first evaporator is adsorbed by the second adsorbent in the second adsorber to heat the third heating medium, the third heating medium which has flown out of the outlet port of the second adsorber flows into the inlet port of the third adsorber, the second adsorbent refrigerant adsorbed by the third adsorbent is desorbed by heat of the third heating medium in the third adsorber, and the third heating medium which has flown out of the outlet port of the third adsorber flows into the inlet port of the second adsorber;

in the third state, the first evaporator is connected to the first adsorber, the second evaporator is connected to the fourth adsorber, the controller connects the inlet port of the second adsorber to the outlet port of the first heat exchanger and connects the outlet port of the second adsorber to the inlet port of the first heat exchanger to form the first circulation path, the first adsorbent refrigerant adsorbed by the second adsorbent is desorbed by heat of the first heating medium heated by the first heat exchanger in the second adsorber, the first heating medium which has flown out of the outlet port of the first heat exchanger flows into the inlet port of the second adsorber, the first heating medium which has flown out of the outlet port of the second adsorber flows into the inlet port of the first heat exchanger, the controller connects the inlet port of the fourth adsorber to the outlet port of the second heat exchanger, connects the outlet port of the fourth adsorber to the inlet port of the second condenser, connects the outlet port of the second condenser to the inlet port of the first condenser, and connects the outlet port of the first condenser to the inlet port of the second heat exchanger to form the fifth circulation path, the second heating medium which has flown out of the outlet port of the second heat exchanger flows into the inlet port of the fourth adsorber, the second adsorbent refrigerant evaporated by the second evaporator is adsorbed by the fourth adsorbent in the fourth adsorber to heat the second heating medium, the second heating medium which has flown out of the outlet port of the fourth adsorber flows into the inlet port of the second condenser, the second heating medium which has flown out of the outlet port of the second condenser flows into the inlet port of the first condenser, the second heating medium which has flown out of the outlet port of the first condenser flows into the inlet port of the second heat exchanger, the controller connects the outlet port of the first adsorber to the inlet port of the third adsorber and connects the inlet port of the first adsorber to the outlet port of the third adsorber to form a seventh circulation path, the first adsorbent refrigerant evaporated by the first evaporator is adsorbed by the first adsorbent in the first adsorber to heat the third heating medium, the third heating medium which has flown out of the outlet port of the first adsorber flows into the inlet port of the third adsorber, the second adsorbent refrigerant adsorbed by the third adsorbent is desorbed by heat of the third heating medium in the third adsorber, and the third heating medium which has flown out of the outlet port of the third adsorber flows into the inlet port of the first adsorber, and in the fourth state, the first evaporator is connected to the second adsorber, the second evaporator is connected to the fourth adsorber, the controller connects the inlet port of the first adsorber to the outlet port of the first heat exchanger and connects the outlet port of the first adsorber to the inlet port of the first heat exchanger to form the fourth circulation path, the first heating medium which has flown out of the outlet port of the first heat exchanger flows into the inlet port of the first adsorber, the first adsorbent refrigerant adsorbed by the first adsorbent is desorbed by heat of the first heating medium heated by the first heat exchanger in the first adsorber, the first heating medium which has flown out of the outlet port of the first adsorber flows into the inlet port of the first heat exchanger, the controller connects the inlet port of the third adsorber to the outlet port of the second heat exchanger, connects the outlet port of the third adsorber to the inlet port of the second condenser, connects the outlet port of the second condenser to the inlet port of the first condenser, and connects the outlet port of the first condenser to the inlet port of the second heat exchanger to form the second circulation path, the second heating medium which has flown out of the outlet port of the second heat exchanger flows into the inlet port of the third adsorber, the second adsorbent refrigerant evaporated by the second evaporator is adsorbed by the third adsorbent in the third adsorber to heat the second heating medium, the second heating medium which has flown out of the outlet port of the third adsorber flows into the inlet port of the second condenser, the second heating medium which has flown out of the outlet port of the second condenser flows into the inlet port of the first condenser, the second heating medium which has flown out of the outlet port of the first condenser flows into the inlet port of the second heat exchanger, the controller connects the outlet port of the second adsorber to the inlet port of the fourth adsorber and connects the inlet port of the second adsorber to the outlet port of the fourth adsorber to form an eighth circulation path, the first adsorbent refrigerant evaporated by the first evaporator is adsorbed by the second adsorbent in the second adsorber to heat the third heating medium, the third heating medium which has flown out of the outlet port of the second adsorber flows into the inlet port of the fourth adsorber, the second adsorbent refrigerant adsorbed by the fourth adsorbent is desorbed by heat of the third heating medium in the fourth adsorber, and the third heating medium which has flown out of the outlet port of the fourth adsorber flows into the inlet port of the second adsorber.

One aspect of the present disclosure makes it possible to appropriately obtain an adsorption refrigerator provided with specific elements for double effect by an adsorption heat recovery system. Further, one aspect of the present disclosure makes it possible to obtain a method for controlling the adsorption refrigerator. Furthermore, one aspect of the present disclosure makes it possible to obtain a cooling system provided with the adsorption refrigerator.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

DETAILED DESCRIPTION OF THE EMBODIMENTS

Figure 1:
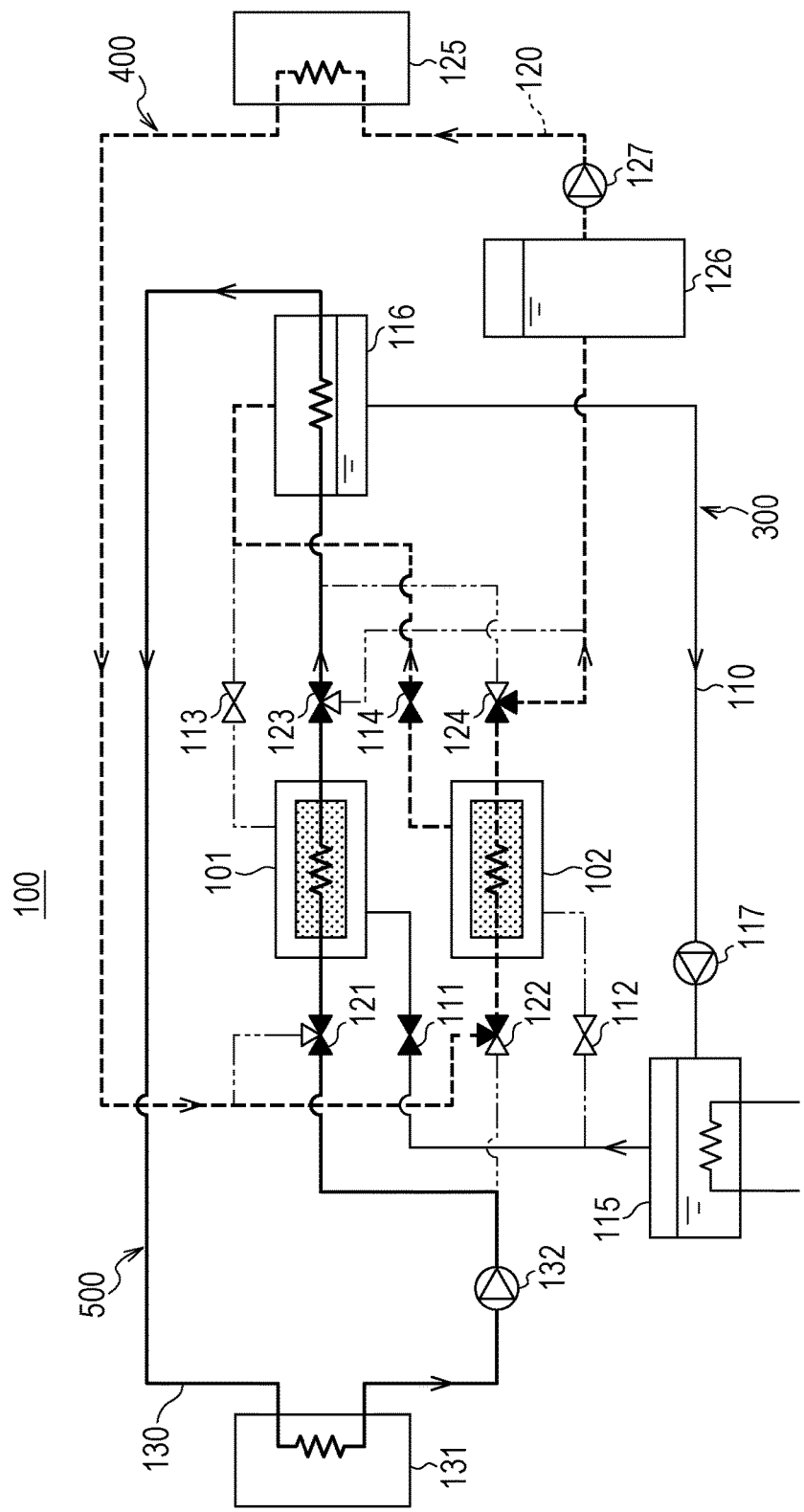
FIG. 1 is a diagram illustrating an example of a conventional single effect adsorption refrigerator.
Figure 2:
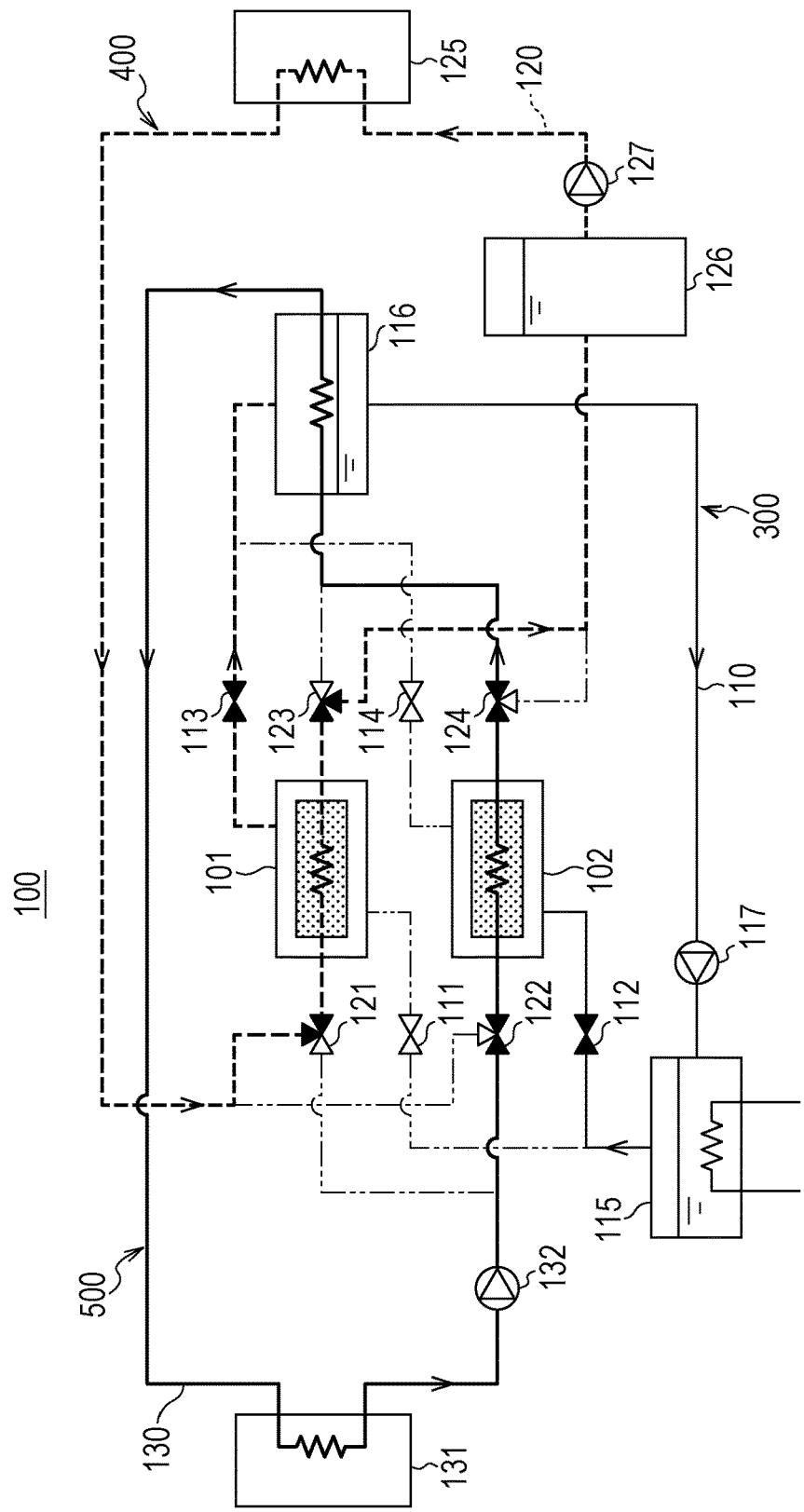
FIG. 2 is a diagram illustrating an example of the conventional single effect adsorption refrigerator.

As described above, NPL 1 describes no specific configuration of the double effect adsorption refrigerator by the adsorption heat recovery system. Thus, the inventor of the present invention has made intensive studies on the configuration and conceived one aspect of the present disclosure described below.

Specifically, an adsorption refrigerator according to a first aspect of the present disclosure comprising:

a first adsorber containing a first adsorbent capable of adsorbing and desorbing a first adsorbent refrigerant;

a second adsorber containing a second adsorbent capable of adsorbing and desorbing the first adsorbent refrigerant;

a first evaporator capable of evaporating the first adsorbent refrigerant under reduced pressure to cool a first working fluid;

a first condenser capable of condensing the first adsorbent refrigerant in gaseous state;

a third adsorber containing a third adsorbent capable of adsorbing and desorbing a second adsorbent refrigerant;

a fourth adsorber containing a fourth adsorbent capable of adsorbing and desorbing the second adsorbent refrigerant;

a second evaporator capable of evaporating the second adsorbent refrigerant under reduced pressure to cool a second working fluid;

a second condenser capable of condensing the second adsorbent refrigerant in gaseous state;

a first heat exchanger capable of applying heat absorbed from a first heat source to a first heating medium;

a second heat exchanger capable of removing and releasing heat from a second heating medium; and a controller that performs control for switching to any of a first state, a second state, a third state, and a fourth state, wherein:

in the first state, the first evaporator is connected to the first adsorber, the second evaporator is connected to the third adsorber, the controller connects an inlet port of the second adsorber to an outlet port of the first heat exchanger and connects an outlet port of the second adsorber to an inlet port of the first heat exchanger to form a first circulation path, the first heating medium which has flown out of the outlet port of the first heat exchanger flows into the inlet port of the second adsorber, the first adsorbent refrigerant adsorbed by the second adsorbent is desorbed by heat of the first heating medium heated by the first heat exchanger in the second adsorber, the first heating medium which has flown out of the outlet port of the second adsorber flows into the inlet port of the first heat exchanger, the controller connects an inlet port of the third adsorber to an outlet port of the second heat exchanger, connects an outlet port of the third adsorber to an inlet port of the second condenser, connects an outlet port of the second condenser to an inlet port of the first condenser, and connects an outlet port of the first condenser to an inlet port of the second heat exchanger to form a second circulation path, the second heating medium which has flown out of the outlet port of the second heat exchanger flows into the inlet port of the third adsorber, the second adsorbent refrigerant evaporated by the second evaporator is adsorbed by the third adsorbent in the third adsorber to heat the second heating medium, the second heating medium which has flown out of the outlet port of the third adsorber flows into the inlet port of the second condenser, the second heating medium which has flown out of the outlet port of the second condenser flows into the inlet port of the first condenser, the second heating medium which has flown out of the outlet port of the first condenser flows into the inlet port of the second heat exchanger, the controller connects an outlet port of the first adsorber to an inlet port of the fourth adsorber and connects an inlet port of the first adsorber to an outlet port of the fourth adsorber to form a third circulation path, the first adsorbent refrigerant evaporated by the first evaporator is adsorbed by the first adsorbent in the first adsorber to heat a third heating medium, the third heating medium which has flown out of the outlet port of the first adsorber flows into the inlet port of the fourth adsorber, the second adsorbent refrigerant adsorbed by the fourth adsorbent is desorbed by heat of the third heating medium in the fourth adsorber, and the third heating medium which has flown out of the outlet port of the fourth adsorber flows into the inlet port of the first adsorber in the second state, the first evaporator is connected to the second adsorber, the second evaporator is connected to the fourth adsorber, the controller connects the inlet port of the first adsorber to the outlet port of the first heat exchanger and connects the outlet port of the first adsorber to the inlet port of the first heat exchanger to form a fourth circulation path, the first heating medium which has flown out of the outlet port of the first heat exchanger flows into the inlet port of the first adsorber, the first adsorbent refrigerant adsorbed by the first adsorbent is desorbed by heat of the first heating medium heated by the first heat exchanger in the first adsorber, the first heating medium which has flown out of the outlet port of the first adsorber flows into the inlet port of the first heat exchanger, the controller connects the inlet port of the fourth adsorber to the outlet port of the second heat exchanger, connects the outlet port of the fourth adsorber to the inlet port of the second condenser, connects the outlet port of the second condenser to the inlet port of the first condenser, and connects the outlet port of the first condenser to the inlet port of the second heat exchanger to form a fifth circulation path, the second heating medium which has flown out of the outlet port of the second heat exchanger flows into the inlet port of the fourth adsorber, the second adsorbent refrigerant evaporated by the second evaporator is adsorbed by the fourth adsorbent in the fourth adsorber to heat the second heating medium, the second heating medium which has flown out of the outlet port of the fourth adsorber flows into the inlet port of the second condenser, the second heating medium which has flown out of the outlet port of the second condenser flows into the inlet port of the first condenser, the second heating medium which has flown out of the outlet port of the first condenser flows into the inlet port of the second heat exchanger, the controller connects the outlet port of the second adsorber to the inlet port of the third adsorber and connects the inlet port of the second adsorber to the outlet port of the third adsorber to form a sixth circulation path, the first adsorbent refrigerant evaporated by the first evaporator is adsorbed by the second adsorbent in the second adsorber to heat the third heating medium, the third heating medium which has flown out of the outlet port of the second adsorber flows into the inlet port of the third adsorber, the second adsorbent refrigerant adsorbed by the third adsorbent is desorbed by heat of the third heating medium in the third adsorber, and the third heating medium which has flown out of the outlet port of the third adsorber flows into the inlet port of the second adsorber in the third state, the first evaporator is connected to the first adsorber, the second evaporator is connected to the fourth adsorber, the controller connects the inlet port of the second adsorber to the outlet port of the first heat exchanger and connects the outlet port of the second adsorber to the inlet port of the first heat exchanger to form the first circulation path, the first adsorbent refrigerant adsorbed by the second adsorbent is desorbed by heat of the first heating medium heated by the first heat exchanger in the second adsorber, the first heating medium which has flown out of the outlet port of the first heat exchanger flows into the inlet port of the second adsorber, the first heating medium which has flown out of the outlet port of the second adsorber flows into the inlet port of the first heat exchanger, the controller connects the inlet port of the fourth adsorber to the outlet port of the second heat exchanger, connects the outlet port of the fourth adsorber to the inlet port of the second condenser, connects the outlet port of the second condenser to the inlet port of the first condenser, and connects the outlet port of the first condenser to the inlet port of the second heat exchanger to form the fifth circulation path, the second heating medium which has flown out of the outlet port of the second heat exchanger flows into the inlet port of the fourth adsorber, the second adsorbent refrigerant evaporated by the second evaporator is adsorbed by the fourth adsorbent in the fourth adsorber to heat the second heating medium, the second heating medium which has flown out of the outlet port of the fourth adsorber flows into the inlet port of the second condenser, the second heating medium which has flown out of the outlet port of the second condenser flows into the inlet port of the first condenser, the second heating medium which has flown out of the outlet port of the first condenser flows into the inlet port of the second heat exchanger, the controller connects the outlet port of the first adsorber to the inlet port of the third adsorber and connects the inlet port of the first adsorber to the outlet port of the third adsorber to form a seventh circulation path, the first adsorbent refrigerant evaporated by the first evaporator is adsorbed by the first adsorbent in the first adsorber to heat the third heating medium, the third heating medium which has flown out of the outlet port of the first adsorber flows into the inlet port of the third adsorber, the second adsorbent refrigerant adsorbed by the third adsorbent is desorbed by heat of the third heating medium in the third adsorber, and the third heating medium which has flown out of the outlet port of the third adsorber flows into the inlet port of the first adsorber and in the fourth state, the first evaporator is connected to the second adsorber, the second evaporator is connected to the third adsorber, the controller connects the inlet port of the first adsorber to the outlet port of the first heat exchanger and connects the outlet port of the first adsorber to the inlet port of the first heat exchanger to form the fourth circulation path, the first heating medium which has flown out of the outlet port of the first heat exchanger flows into the inlet port of the first adsorber, the first adsorbent refrigerant adsorbed by the first adsorbent is desorbed by heat of the first heating medium heated by the first heat exchanger in the first adsorber, the first heating medium which has flown out of the outlet port of the first adsorber flows into the inlet port of the first heat exchanger, the controller connects the inlet port of the third adsorber to the outlet port of the second heat exchanger, connects the outlet port of the third adsorber to the inlet port of the second condenser, connects the outlet port of the second condenser to the inlet port of the first condenser, and connects the outlet port of the first condenser to the inlet port of the second heat exchanger to form the second circulation path, the second heating medium which has flown out of the outlet port of the second heat exchanger flows into the inlet port of the third adsorber, the second adsorbent refrigerant evaporated by the second evaporator is adsorbed by the third adsorbent in the third adsorber to heat the second heating medium, the second heating medium which has flown out of the outlet port of the third adsorber flows into the inlet port of the second condenser, the second heating medium which has flown out of the outlet port of the second condenser flows into the inlet port of the first condenser, the second heating medium which has flown out of the outlet port of the first condenser flows into the inlet port of the second heat exchanger, the controller connects the outlet port of the second adsorber to the inlet port of the fourth adsorber and connects the inlet port of the second adsorber to the outlet port of the fourth adsorber to form an eighth circulation path, the first adsorbent refrigerant evaporated by the first evaporator is adsorbed by the second adsorbent in the second adsorber to heat the third heating medium, the third heating medium which has flown out of the outlet port of the second adsorber flows into the inlet port of the fourth adsorber, the second adsorbent refrigerant adsorbed by the fourth adsorbent is desorbed by heat of the third heating medium in the fourth adsorber, and the third heating medium which has flown out of the outlet port of the fourth adsorber flows into the inlet port of the second adsorber.

Accordingly, the present aspect makes it possible to appropriately obtain the adsorption refrigerator provided with specific elements for the double effect by the adsorption heat recovery system.

Further, a method for controlling an adsorption refrigerator according to one aspect of the present disclosure comprising:

(a) preparing the adsorption refrigerator comprising:

a first adsorber containing a first adsorbent capable of adsorbing and desorbing a first adsorbent refrigerant, a second adsorber containing a second adsorbent capable of adsorbing and desorbing the first adsorbent refrigerant;

a first evaporator capable of evaporating the first adsorbent refrigerant under reduced pressure to cool a first working fluid, a first condenser capable of condensing the first adsorbent refrigerant in gaseous state;

a third adsorber containing a third adsorbent capable of adsorbing and desorbing a second adsorbent refrigerant, a fourth adsorber containing a fourth adsorbent capable of adsorbing and desorbing the second adsorbent refrigerant, a second evaporator capable of evaporating the second adsorbent refrigerant under reduced pressure to exhibit a cooling capacity, a second condenser capable of condensing the second adsorbent refrigerant in gaseous state, a first heat exchanger capable of applying heat absorbed from a first heat source to a first heating medium, a second heat exchanger capable of removing and releasing heat from a second heating medium, and a controller that performs control for switching to any of a first state, a second state, a third state, and a fourth state; and (b) performing switching to any of the first state, the second state, the third state, and the fourth state, wherein:

in the first state, the first evaporator is connected to the first adsorber, the second evaporator is connected to the third adsorber, an inlet port of the second adsorber is connected to an outlet port of the first heat exchanger, and an outlet port of the second adsorber is connected to an inlet port of the first heat exchanger, so that a first circulation path is formed, the first heating medium which has flown out of the outlet port of the first heat exchanger flows into the inlet port of the second adsorber, the first adsorbent refrigerant adsorbed by the second adsorbent is desorbed by heat of the first heating medium heated by the first heat exchanger in the second adsorber, the first heating medium which has flown out of the outlet port of the second adsorber flows into the inlet port of the first heat exchanger, an inlet port of the third adsorber is connected to an outlet port of the second heat exchanger, an outlet port of the third adsorber is connected to an inlet port of the second condenser, an outlet port of the second condenser is connected to an inlet port of the first condenser, and an outlet port of the first condenser is connected to an inlet port of the second heat exchanger, so that a second circulation path is formed, the second heating medium which has flown out of the outlet port of the second heat exchanger flows into the inlet port of the third adsorber, the second adsorbent refrigerant evaporated by the second evaporator is adsorbed by the third adsorbent in the third adsorber to heat the second heating medium, the second heating medium which has flown out of the outlet port of the third adsorber flows into the inlet port of the second condenser, the second heating medium which has flown out of the outlet port of the second condenser flows into the inlet port of the first condenser, the second heating medium which has flown out of the outlet port of the first condenser flows into the inlet port of the second heat exchanger, an outlet port of the first adsorber is connected to an inlet port of the fourth adsorber, and an inlet port of the first adsorber is connected to an outlet port of the fourth adsorber, so that a third circulation path is formed, the first adsorbent refrigerant evaporated by the first evaporator is adsorbed by the first adsorbent in the first adsorber to heat a third heating medium, the third heating medium which has flown out of the outlet port of the first adsorber flows into the inlet port of the fourth adsorber, the second adsorbent refrigerant adsorbed by the fourth adsorbent is desorbed by heat of the third heating medium in the fourth adsorber, and the third heating medium which has flown out of the outlet port of the fourth adsorber flows into the inlet port of the first adsorber, in the second state, the first evaporator is connected to the second adsorber, the second evaporator is connected to the fourth adsorber, the inlet port of the first adsorber is connected to the outlet port of the first heat exchanger, and the outlet port of the first adsorber is connected to the inlet port of the first heat exchanger, so that a fourth circulation path is formed, the first heating medium which has flown out of the outlet port of the first heat exchanger flows into the inlet port of the first adsorber, the first adsorbent refrigerant adsorbed by the first adsorbent is desorbed by heat of the first heating medium heated by the first heat exchanger in the first adsorber, the first heating medium which has flown out of the outlet port of the first adsorber flows into the inlet port of the first heat exchanger, the inlet port of the fourth adsorber is connected to the outlet port of the second heat exchanger, the outlet port of the fourth adsorber is connected to the inlet port of the second condenser, the outlet port of the second condenser is connected to the inlet port of the first condenser, and the outlet port of the first condenser is connected to the inlet port of the second heat exchanger, so that a fifth circulation path is formed, the second heating medium which has flown out of the outlet port of the second heat exchanger flows into the inlet port of the fourth adsorber, the second adsorbent refrigerant evaporated by the second evaporator is adsorbed by the fourth adsorbent in the fourth adsorber to heat the second heating medium, the second heating medium which has flown out of the outlet port of the fourth adsorber flows into the inlet port of the second condenser, the second heating medium which has flown out of the outlet port of the second condenser flows into the inlet port of the first condenser, the second heating medium which has flown out of the outlet port of the first condenser flows into the inlet port of the second heat exchanger, the outlet port of the second adsorber is connected to the inlet port of the third adsorber, and the inlet port of the second adsorber is connected to the outlet port of the third adsorber, so that a sixth circulation path is formed, the first adsorbent refrigerant evaporated by the first evaporator is adsorbed by the second adsorbent in the second adsorber to heat the third heating medium, the third heating medium which has flown out of the outlet port of the second adsorber flows into the inlet port of the third adsorber, the second adsorbent refrigerant adsorbed by the third adsorbent is desorbed by heat of the third heating medium in the third adsorber, and the third heating medium which has flown out of the outlet port of the third adsorber flows into the inlet port of the second adsorber, in the third state, the first evaporator is connected to the first adsorber, the second evaporator is connected to the fourth adsorber, the inlet port of the second adsorber is connected to the outlet port of the first heat exchanger, and the outlet port of the second adsorber is connected to the inlet port of the first heat exchanger, so that the first circulation path is formed, the first adsorbent refrigerant adsorbed by the second adsorbent is desorbed by heat of the first heating medium heated by the first heat exchanger in the second adsorber, the first heating medium which has flown out of the outlet port of the first heat exchanger flows into the inlet port of the second adsorber, the first heating medium which has flown out of the outlet port of the second adsorber flows into the inlet port of the first heat exchanger, the inlet port of the fourth adsorber is connected to the outlet port of the second heat exchanger, the outlet port of the fourth adsorber is connected to the inlet port of the second condenser, the outlet port of the second condenser is connected to the inlet port of the first condenser, and the outlet port of the first condenser is connected to the inlet port of the second heat exchanger, so that the fifth circulation path is formed, the second heating medium which has flown out of the outlet port of the second heat exchanger flows into the inlet port of the fourth adsorber, the second adsorbent refrigerant evaporated by the second evaporator is adsorbed by the fourth adsorbent in the fourth adsorber to heat the second heating medium, the second heating medium which has flown out of the outlet port of the fourth adsorber flows into the inlet port of the second condenser, the second heating medium which has flown out of the outlet port of the second condenser flows into the inlet port of the first condenser, the second heating medium which has flown out of the outlet port of the first condenser flows into the inlet port of the second heat exchanger, the outlet port of the first adsorber is connected to the inlet port of the third adsorber, and the inlet port of the first adsorber is connected to the outlet port of the third adsorber, so that a seventh circulation path is formed, the first adsorbent refrigerant evaporated by the first evaporator is adsorbed by the first adsorbent in the first adsorber to heat the third heating medium, the third heating medium which has flown out of the outlet port of the first adsorber flows into the inlet port of the third adsorber, the second adsorbent refrigerant adsorbed by the third adsorbent is desorbed by heat of the third heating medium in the third adsorber, and the third heating medium which has flown out of the outlet port of the third adsorber flows into the inlet port of the first adsorber; and in the fourth state, the first evaporator is connected to the second adsorber, the second evaporator is connected to the third adsorber, the inlet port of the first adsorber is connected to the outlet port of the first heat exchanger, and the outlet port of the first adsorber is connected to the inlet port of the first heat exchanger, so that the fourth circulation path is formed, the first heating medium which has flown out of the outlet port of the first heat exchanger flows into the inlet port of the first adsorber, the first adsorbent refrigerant adsorbed by the first adsorbent is desorbed by heat of the first heating medium heated by the first heat exchanger in the first adsorber, the first heating medium which has flown out of the outlet port of the first adsorber flows into the inlet port of the first heat exchanger, the inlet port of the third adsorber is connected to the outlet port of the second heat exchanger, the outlet port of the third adsorber is connected to the inlet port of the second condenser, the outlet port of the second condenser is connected to the inlet port of the first condenser, and the outlet port of the first condenser is connected to the inlet port of the second heat exchanger, so that the second circulation path is formed, the second heating medium which has flown out of the outlet port of the second heat exchanger flows into the inlet port of the third adsorber, the second adsorbent refrigerant evaporated by the second evaporator is adsorbed by the third adsorbent in the third adsorber to heat the second heating medium, the second heating medium which has flown out of the outlet port of the third adsorber flows into the inlet port of the second condenser, the second heating medium which has flown out of the outlet port of the second condenser flows into the inlet port of the first condenser, the second heating medium which has flown out of the outlet port of the first condenser flows into the inlet port of the second heat exchanger, the outlet port of the second adsorber is connected to the inlet port of the fourth adsorber, and the inlet port of the second adsorber is connected to the outlet port of the fourth adsorber, so that an eighth circulation path is formed, the first adsorbent refrigerant evaporated by the first evaporator is adsorbed by the second adsorbent in the second adsorber to heat the third heating medium, the third heating medium which has flown out of the outlet port of the second adsorber flows into the inlet port of the fourth adsorber, the second adsorbent refrigerant adsorbed by the fourth adsorbent is desorbed by heat of the third heating medium in the fourth adsorber, and the third heating medium which has flown out of the outlet port of the fourth adsorber flows into the inlet port of the second adsorber.

Accordingly, the present aspect makes it possible to appropriately obtain the method for controlling the adsorption refrigerator, the method including specific steps for the double effect by the adsorption heat recovery system.

According to a second aspect of the present disclosure, the adsorption refrigerator according to the first aspect further comprises a buffer tank disposed between the inlet port of the first adsorber and the outlet port of the fourth adsorber on the third circulation path, between the inlet port of the second adsorber and the outlet port of the third adsorber on the sixth circulation path, between the inlet port of the first adsorber and the outlet port of the third adsorber on the seventh circulation path, or between the inlet port of the second adsorber and the outlet port of the fourth adsorber on the eighth circulation path.

With the above configuration, the adsorption refrigerator of the present aspect is capable of temporarily storing the third heating medium flowing medium which has flown through the third circulation path, the sixth circulation path, the seventh circulation path, or the eighth circulation path in the buffer tank.

Next, intensive studies have been made on effective utilization of heat of a plurality of heat sources having different temperatures, and the following findings have been obtained.

The double effect adsorption refrigerator disclosed in NPL 1 is a system predicated on using a single heat source in a temperature range from approximately 90° C. to approximately 120° C. However, there is no exhaust heat source in such a temperature range close to us. Therefore, the double effect adsorption refrigerator disclosed in NPL 1 has not become widespread in spite of being technically feasible.

Particularly, when there are two heat sources having different temperatures in one external device, it is possible to improve the efficiency and the cooling capacity of refrigeration cycles of the double effect adsorption refrigerator by utilizing a heat source at a high-temperature side in a refrigeration cycle in which an operation temperature of the double effect adsorption refrigerator is high (hereinbelow, referred to as a first adsorption refrigeration cycle) and utilizing a heat source at a low-temperature side in a refrigeration cycle in which the operation temperature of the double effect adsorption refrigerator is low (hereinbelow, referred to as a second adsorption refrigeration cycle).

For example, a temperature of the heat source at the high-temperature side of the external device may be higher than the operation temperature of the first adsorption refrigeration cycle, and a temperature of the heat source at the low-temperature side of the external device may be lower than the operation temperature of the first adsorption refrigeration cycle, but higher than the operation temperature of the second adsorption refrigeration cycle.

Further, for example, the temperature of the heat source at the high-temperature side of the external device may be higher than the operation temperature of the first adsorption refrigeration cycle, and the temperature of the heat source at the low-temperature side of the external device may be slightly lower the operation temperature of the second adsorption refrigeration cycle, but the second adsorption refrigeration cycle may be driven by the heat of the heat source at the low-temperature side by recovering adsorption heat of first adsorption refrigeration cycle.

In the above cases, the heat of the heat source at the high-temperature side of the external device is applied to the first adsorption refrigeration cycle. Further, the heat of the heat source at the low-temperature side of the external device is applied to the second adsorption refrigeration cycle, and the adsorption heat of the first adsorption refrigeration cycle is used in the second adsorption refrigeration cycle. Accordingly, it is possible to effectively utilize both of the heat source at the high-temperature side and the heat source at the low-temperature side.

However, a conventional adsorption refrigerator is provided with only one heat exchanger for receiving heat of the heat sources. Thus, in this case, it is possible to use only either the heat of the heat source at the high-temperature side or the heat of the heat source at the low-temperature side of the external device. Therefore, in many cases, the heat of the unused heat source is discarded, or the heat of the heat source at the high-temperature side and the heat of the heat source at the low-temperature side are mixed, which damages an energy. That is, it is considered that there has not yet been developed a double effect adsorption refrigerator capable of effectively utilizing the heat of the heat source at the high-temperature side and the heat of the heat source at the low-temperature side of the external device.

A third aspect of the present disclosure has been devised based on the above findings. According to the third aspect, the adsorption refrigerator according to the first aspect further comprises a third heat exchanger capable of applying heat absorbed from a second heat source to the third heating medium. The third heat exchanger is disposed between the outlet port of the first adsorber and the inlet port of the fourth adsorber on the third circulation path, between the outlet port of the second adsorber and the inlet port of the third adsorber on the sixth circulation path, between the outlet port of the first adsorber and the inlet port of the third adsorber on the seventh circulation path, or between the outlet port of the second adsorber and the inlet port of the fourth adsorber on the eighth circulation path. The third heating medium is heated by the third heat exchanger, and the second adsorbent refrigerant adsorbed by the third adsorber or the fourth adsorbent is desorbed by heat of the third heating medium heated by the third heat exchanger.

With the above configuration, the adsorption refrigerator of the present aspect is capable of effectively utilizing heat of a plurality of heat sources having different temperatures. When an adsorption refrigerator is provided with only one heat exchanger for receiving heat of the heat sources, it may be impossible to effectively utilize the heat of the heat source at the high-temperature side and the heat of the heat source at the low-temperature side of the external device. However, in the adsorption refrigerator of the present aspect, such a possibility can be reduced by the configuration described above.

Specifically, the first heat exchanger applies heat of the first heat source at the high-temperature side of the external device to the first heating medium, and the third heat exchanger applies heat of the second heat source at the low-temperature side of the external device to the third heating medium. Further, the third heating medium is configured to recover adsorption heat of the first adsorber or the second adsorber. Accordingly, it is possible to effectively utilize both of the first heat source at the high-temperature side and the second heat source at the low-temperature side.

Further, in the adsorption refrigerator of the present aspect, for example, a temperature of the second heat source which supplies heat to the third heat exchanger may be sufficiently higher than a standard regeneration temperature of the third adsorber or the fourth adsorber. In this case, if the third heat exchanger is disposed, for example, between the inlet port of the first adsorber and the outlet port of the fourth adsorber on the third circulation path, it may be impossible for the third heating medium to appropriately recover the adsorption heat of the first adsorber due to an excessive temperature rise in the third heating medium which has flown through a path between the inlet port of the first adsorber and the outlet port of the fourth adsorber. However, in the adsorption refrigerator of the present aspect, the third heat exchanger is disposed on the path described above. Thus, it is possible to reduce such a possibility.

Further, the heat of the second heat source can be applied to the third heating medium immediately before the third heating medium flows into the third adsorber or the fourth adsorber. Thus, the regeneration temperature of the third adsorber or the fourth adsorber becomes sufficiently high, which makes it possible to improve an efficiency of these adsorbers.

Further, there may be a lower limit temperature in an operation of the second heat source described above. In this case, if the third heat exchanger is disposed, for example, between the inlet port of the first adsorber and the outlet port of the fourth adsorber on the third circulation path, heat may be excessively removed from the second heat source by heat exchange with the third heating medium before recovery of the adsorption heat. Accordingly, the temperature of the second heat source may fall below the lower limit temperature. However, in the adsorption refrigerator of the present aspect, the third heat exchanger is disposed on the path described above. Thus, it is possible to reduce such a possibility.

According to a fourth aspect of the present disclosure, the adsorption refrigerator according to the third aspect further comprises:

a pump capable of pumping the third heating medium, the pump being disposed on the third circulation path, the sixth circulation path, the seventh circulation path, and the eighth circulation path; and a temperature detector disposed between an outlet port of the third heat exchanger and the inlet port of the third adsorber on each of the sixth circulation path and the seventh circulation path or between the outlet port of the third heat exchanger and the inlet port of the fourth adsorber on each of the third circulation path and the eighth circulation path.

The controller controls an operation of the pump based on a temperature of the third heating medium detected by the temperature detector.

With the above configuration, the temperature detector is capable of detecting the temperature of the third heating medium immediately before the third heating medium flows into the third adsorber or the fourth adsorber after passing through the first adsorber or the second adsorber and the third heat exchanger. Thus, the controller is capable of controlling the operation of the pump based on the temperature detected by the temperature detector so that the temperature of the third adsorber or the fourth adsorber can be maintained at an appropriate temperature required for the regeneration process of the third adsorber or the fourth adsorber.

According to a fifth aspect of the present disclosure, the adsorption refrigerator according to the third aspect further comprises:

a pump capable of pumping the third heating medium, the pump being disposed on the third circulation path, the sixth circulation path, the seventh circulation path, and the eighth circulation path; and a temperature detector disposed between an inlet port of the third heat exchanger and the outlet port of the first adsorber or between the inlet port of the third heat exchanger and the outlet port of the second adsorber on the third circulation path, the sixth circulation path, the seventh circulation path, and the eighth circulation path.

The controller controls an operation of the pump based on a temperature of the third heating medium detected by the temperature detector.

With the above configuration, the temperature detector is capable of detecting the temperature of the third heating medium immediately before the third heating medium flows into the third heat exchanger after passing through the first adsorber or the second adsorber. Thus, for example, when there is a lower limit temperature in the operation of the second heat source which supplies heat to the third heat exchanger, the controller is capable of controlling the operation of the pump based on the temperature detected by the temperature detector so that the temperature of the second heat source does not fall below the lower limit temperature by heat exchange with the third heating medium.

According to a sixth aspect of the present disclosure, the adsorption refrigerator according to the first aspect further comprises a third heat exchanger capable of applying heat absorbed from a second heat source to the third heating medium. The third heat exchanger being disposed between the inlet port of the first adsorber and the outlet port of the fourth adsorber on the third circulation path, between the inlet port of the second adsorber and the outlet port of the third adsorber on the sixth circulation path, between the inlet port of the first adsorber and the outlet port of the third adsorber on the seventh circulation path, or between the inlet port of the second adsorber and the outlet port of the fourth adsorber on the eighth circulation path. The third heating medium is heated by the third heat exchanger and further heated by heat generated when the first adsorbent or the second adsorbent adsorbs the first adsorbent refrigerant.

With the above configuration, the adsorption refrigerator of the present aspect is capable of effectively utilizing heat of a plurality of heat sources having different temperatures. Details of the effect are similar to the effect in the adsorption refrigerator of the third aspect.

Further, in the adsorption refrigerator of the present aspect, even when the temperature of the second heat source which supplies heat to the third heat exchanger is, for example, lower than the standard regeneration temperature of the third adsorber or the fourth adsorber, the temperature of the third heating medium can be configured to exceed the regeneration temperature of the third adsorber or the fourth adsorber by recovering adsorption heat of the first adsorber or the second adsorber by the third heating medium flowing through the third circulation path, the sixth circulation path, the seventh circulation path, or the eighth circulation path.

Further, there may be an upper limit temperature in the operation of the second heat source described above. In this case, if the third heat exchanger is disposed, for example, between the outlet port of the first adsorber and the inlet port of the fourth adsorber on the third circulation path, heat may not be sufficiently removed from the second heat source by heat exchange with the third heating medium after recovery of the adsorption heat of the first adsorber. Accordingly, the temperature of the second heat source may exceed the upper limit temperature. However, in the adsorption refrigerator of the present aspect, the third heat exchanger is disposed on the path described above. Thus, it is possible to reduce such a possibility.

According to a seventh aspect of the present disclosure, the adsorption refrigerator according to the sixth aspect further comprises:

a pump capable of pumping the third heating medium, the pump being disposed on the third circulation path, the sixth circulation path, the seventh circulation path, and the eighth circulation path; and a temperature detector disposed between the outlet port of the first adsorber and the inlet port of the fourth adsorber on the third circulation path, between the outlet port of the second adsorber and the inlet port of the third adsorber on the sixth circulation path, between the outlet port of the first adsorber and the inlet port of the third adsorber on the seventh circulation path, or between the outlet port of the second adsorber and the inlet port of the fourth adsorber on the eighth circulation path.

The controller controls an operation of the pump based on a temperature of the third heating medium detected by the temperature detector.

With the above configuration, the temperature detector is capable of detecting the temperature of the third heating medium immediately before the third heating medium flows into the third adsorber or the fourth adsorber after passing through the first adsorber or the second adsorber and the second heat exchanger. Thus, the controller is capable of controlling the operation of the pump based on the temperature detected by the temperature detector so that the temperature of the third adsorber or the fourth adsorber can be maintained at an appropriate temperature required for the regeneration process of these adsorbers.

According to an eighth aspect of the present disclosure, the adsorption refrigerator according to the sixth aspect further comprises:

a pump capable of pumping the third heating medium, the pump being disposed on the third circulation path, the sixth circulation path, the seventh circulation path, and the eighth circulation path; and a temperature detector disposed between an outlet port of the third heat exchanger and the inlet port of the first adsorber on each of the third circulation path and the seventh circulation path or between the outlet port of the third heat exchanger and the inlet port of the second adsorber on each of the sixth circulation path and the eighth circulation path.

The controller controls an operation of the pump based on a temperature of the third heating medium detected by the temperature detector.

With the above configuration, the temperature detector is capable of detecting the temperature of the third heating medium immediately after the third heating medium passes through the third heat exchanger. Thus, for example, when there is an upper limit temperature in the operation of the second heat source which supplies heat to the third heat exchanger, the controller is capable of controlling the operation of the pump based on the temperature detected by the temperature detector so that the temperature of the second heat source does not exceed the upper limit temperature by the heat exchange with the third heating medium.

According to a ninth aspect of the present disclosure, in the adsorption refrigerator according to one of the first aspect to the eighth aspect, a first object is cooled by the first working fluid, and a second object is cooled by the second working fluid.

A cooling system according to one aspect of the present disclosure includes:

the adsorption refrigerator described above;
a first heat supply device as the first heat source; and
a second heat supply device as the second heat source.

With the above configuration, the cooling system of the present aspect is capable of effectively utilizing heat of the first heat supply device and heat of the second heat supply device, the first heat supply device and the second heat supply device having different temperatures.

An adsorption refrigerator according to a tenth aspect of the present disclosure comprises:

a first adsorber containing a first adsorbent capable of adsorbing and desorbing a first adsorbent refrigerant;

a second adsorber containing a second adsorbent capable of adsorbing and desorbing the first adsorbent refrigerant;

a first evaporator capable of evaporating the first adsorbent refrigerant under reduced pressure to cool a first working fluid;

a first condenser capable of condensing the first adsorbent refrigerant in gaseous state;

a third adsorber containing a third adsorbent capable of adsorbing and desorbing a second adsorbent refrigerant;

a fourth adsorber containing a fourth adsorbent capable of adsorbing and desorbing the second adsorbent refrigerant;

a second evaporator capable of evaporating the second adsorbent refrigerant under reduced pressure to cool a second working fluid;

a second condenser capable of condensing the second adsorbent refrigerant in gaseous state;

a first heat exchanger capable of applying heat absorbed from a first heat source to a first heating medium;

a second heat exchanger capable of removing and releasing heat from a second heating medium; and a heat recovery path where a third heating medium performs recovery of adsorption heat generated by adsorption-driving of the first adsorber or the second adsorber and performs heat application of regeneration-driving of the third adsorber or the fourth adsorber, wherein the heat recovery path is a circulation path that passes through either the first adsorber or the second adsorber and either the third adsorber or the fourth adsorber.

Hereinbelow, exemplary embodiments of the present disclosure will be described with reference to the accompanying drawings. The exemplary embodiments described below are concrete examples of the present disclosure. That is, numerical values, shapes, materials, elements, and disposed positions and connection modes of the elements in the following exemplary embodiments are merely examples, and have no intention to limit the present disclosure. Further, among the elements in the following exemplary embodiments, elements that are not described in an independent claim that shows a most generic concept of the present disclosure are described as optional elements. In the drawings, description for elements having the same reference sign may be omitted. Further, each of the drawings schematically illustrates each of the elements to facilitate understanding. Thus, shapes and dimensional ratios in the drawings may be inaccurate.

First Exemplary Embodiment

[Configuration of Double Effect Adsorption Refrigerator]

FIGS. 3A, 3B, 3C, and 3D are diagrams illustrating an example of a double effect adsorption refrigerator of a first exemplary embodiment.

Hereinbelow, an entire configuration of double effect adsorption refrigerator 200 of the present exemplary embodiment by an adsorption heat recovery system will be described with reference to the drawings. A configuration of wiring and wiring connection of double effect adsorption refrigerator 200 will be described later with reference to FIG. 4.

Double effect adsorption refrigerator 200 includes first adsorber 101A which contains first adsorbent 101AA capable of adsorbing and desorbing a first adsorbent refrigerant, second adsorber 102A which contains second adsorbent 102AA capable of adsorbing and desorbing the first adsorbent refrigerant, first evaporator 115A capable of evaporating the first adsorbent refrigerant under reduced pressure to cool a first working fluid, first condenser 116A capable of condensing the first adsorbent refrigerant in gaseous state, third adsorber 101B which contains third adsorbent 101BB capable of adsorbing and desorbing a second adsorbent refrigerant, fourth adsorber 102B which contains fourth adsorbent 102BB capable of adsorbing and desorbing the second adsorbent refrigerant, second evaporator 115B capable of evaporating the second adsorbent refrigerant under reduced pressure to cool a second working fluid, second condenser 116B capable of condensing the second adsorbent refrigerant in gaseous state, first heat exchanger 125A capable of applying heat absorbed from a first heat source to a first heating medium, second heat exchanger 231 capable of removing and releasing heat from a second heating medium, and controller 700 which performs control for switching to any of a first state, a second state, a third state, and a fourth state.

In this manner, double effect adsorption refrigerator 200 includes first adsorption refrigeration cycle 100A and second adsorption refrigeration cycle 100B. That is, first adsorption refrigeration cycle 100A includes first adsorber 101A and second adsorber 102A in a first stage of double effect adsorption refrigerator 200. Second adsorption refrigeration cycle 100B includes third adsorber 101B and fourth adsorber 102B in a second stage of double effect adsorption refrigerator 200.

Heat recovery path 220 is a path where the third heating medium performs recovery of adsorption heat generated by adsorption-driving of first adsorber 101A or second adsorber 102A in first adsorption refrigeration cycle 100A and performs heat application of regeneration-driving of third adsorber 101B or fourth adsorber 102B in second adsorption refrigeration cycle 100B. That is, heat recovery path 220 is a circulation path that passes through either first adsorber 101A or second adsorber 102A and either third adsorber 101B or fourth adsorber 102B.

Note that "A" is added to an end of a reference sign of each element included in single effect adsorption refrigerator 100 to designate an element of first adsorption refrigeration cycle 100A that is identical or corresponds to the element of single effect adsorption refrigerator 100, and "B" is added to an end of a reference sign of each element included in single effect adsorption refrigerator 100 to designate an element of second adsorption refrigeration cycle 100B that is identical or corresponds to the element of single effect adsorption refrigerator 100.

Figure 3A:
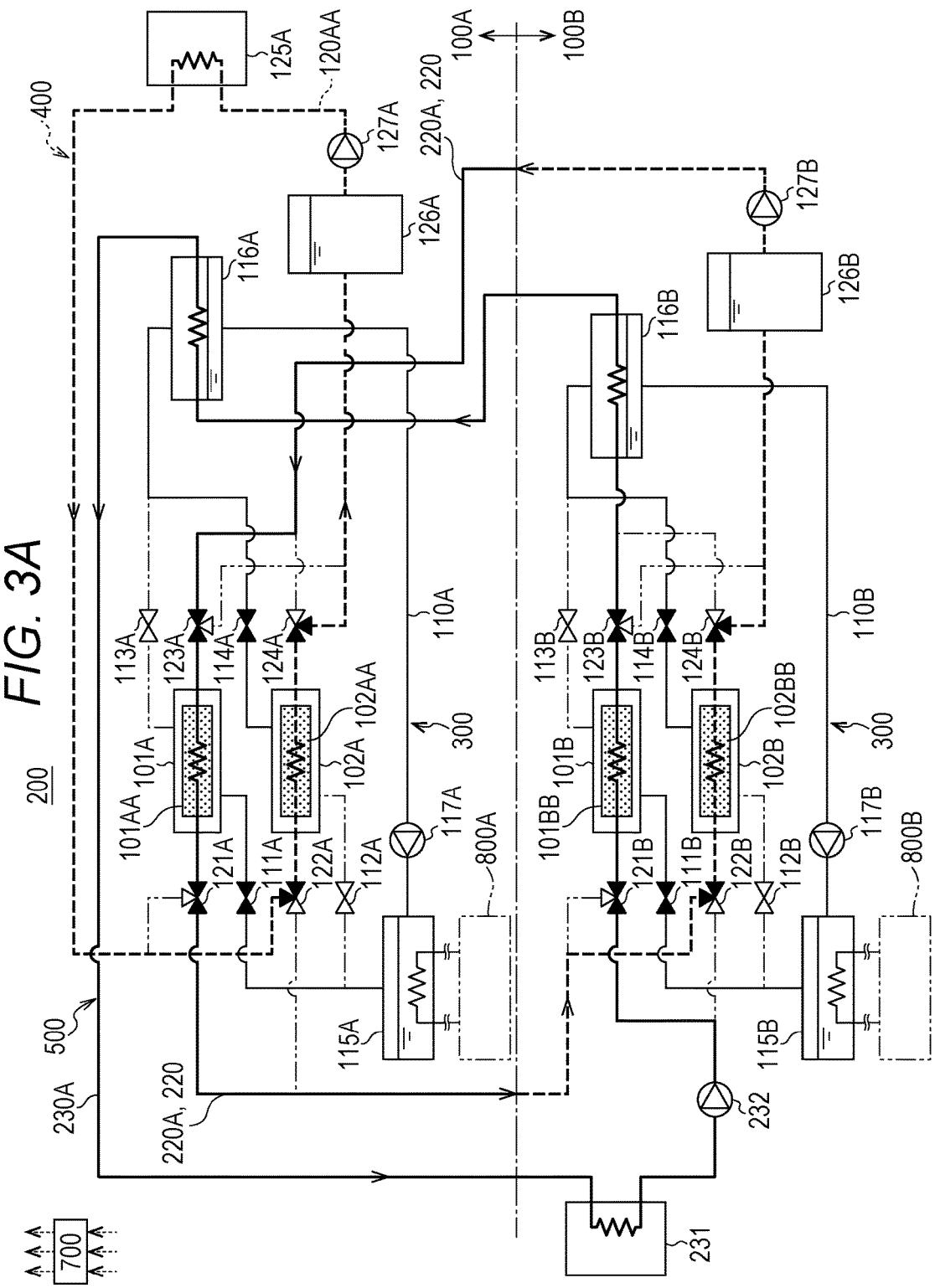
FIG. 3A is a diagram illustrating an example of a double effect adsorption refrigerator of a first exemplary embodiment.

FIG. 3A illustrates the first state of double effect adsorption refrigerator 200 in which first adsorber 101A performs an adsorption process, second adsorber 102A performs a regeneration process, third adsorber 101B performs the adsorption process, and fourth adsorber 102B performs the regeneration process.

Figure 3B:
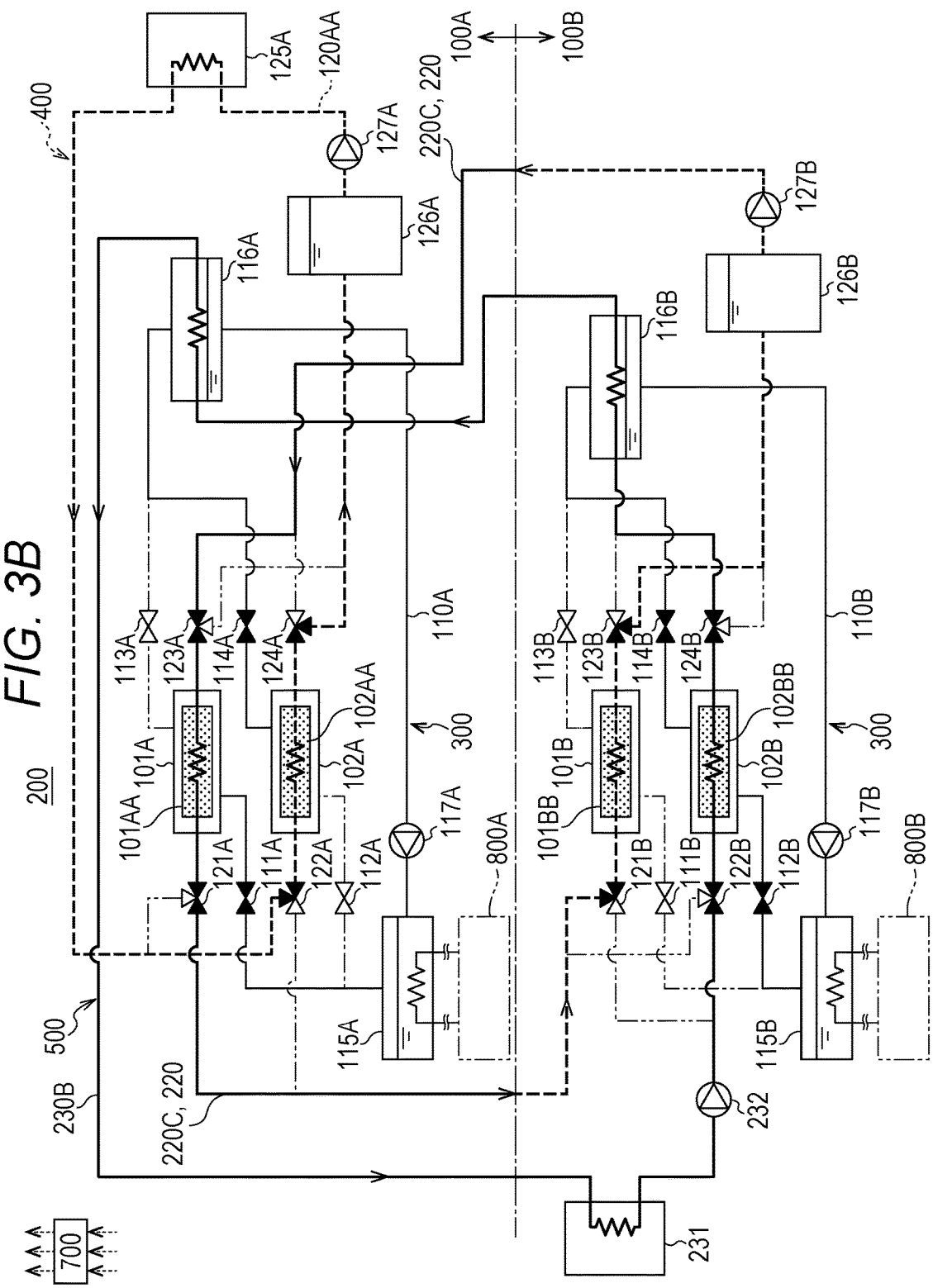
FIG. 3B is a diagram illustrating an example of the double effect adsorption refrigerator of the first exemplary embodiment.

FIG. 3B illustrates the third state of double effect adsorption refrigerator 200 in which first adsorber 101A performs the adsorption process, second adsorber 102A performs the regeneration process, third adsorber 101B performs the regeneration process, and fourth adsorber 102B performs the adsorption process.

Figure 3C:
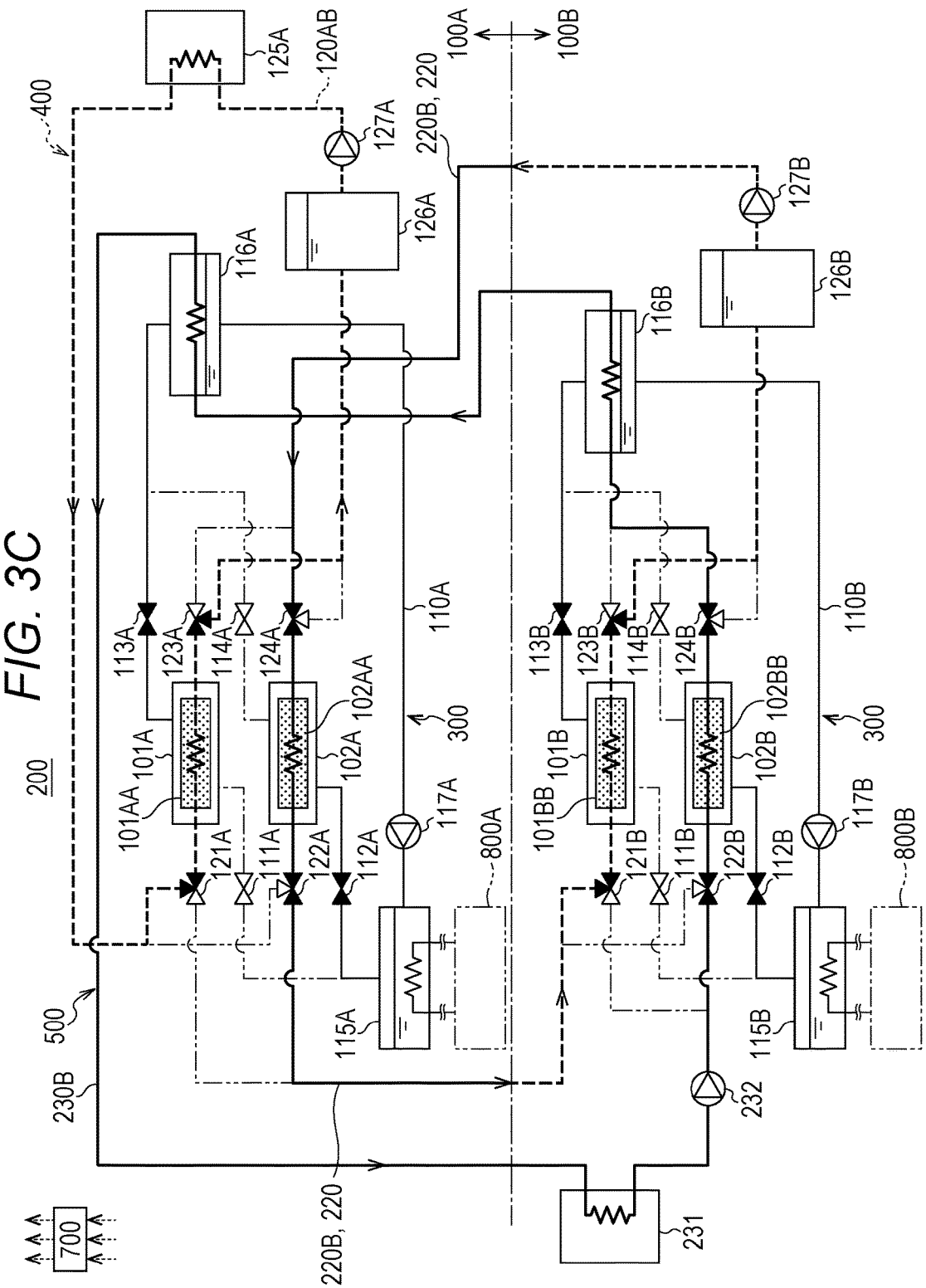
FIG. 3C is a diagram illustrating an example of the double effect adsorption refrigerator of the first exemplary embodiment.

FIG. 3C illustrates the second state of double effect adsorption refrigerator 200 in which first adsorber 101A performs the regeneration process, second adsorber 102A performs the adsorption process, third adsorber 101B performs the regeneration process, and fourth adsorber 102B performs the adsorption process.

Figure 3D:
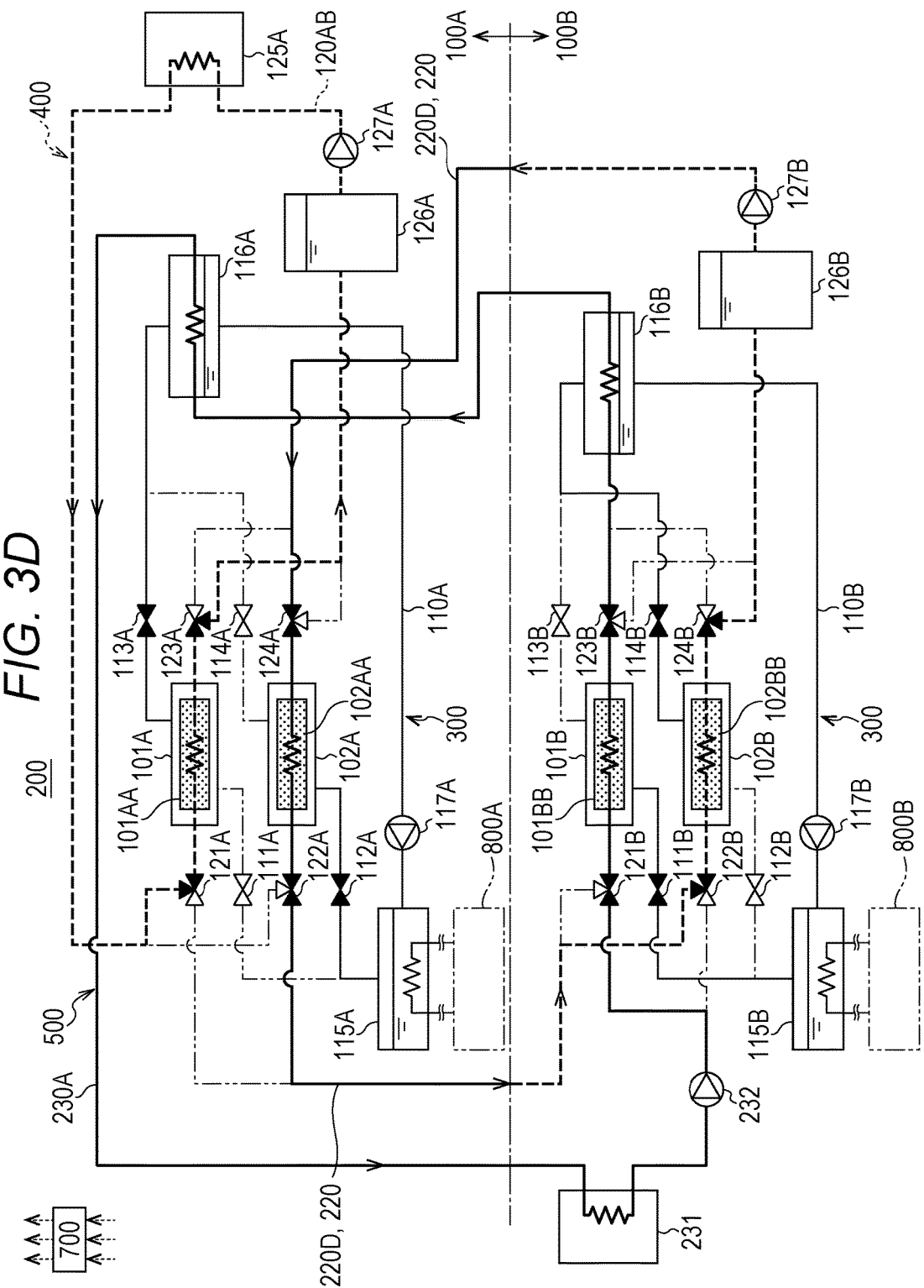
FIG. 3D is a diagram illustrating an example of the double effect adsorption refrigerator of the first exemplary embodiment.

FIG. 3D illustrates the fourth state of double effect adsorption refrigerator 200 in which first adsorber 101A performs the regeneration process, second adsorber 102A performs the adsorption process, third adsorber 101B performs the adsorption process, and fourth adsorber 102B performs the regeneration process.

In FIGS. 3A, 3B, 3C, and 3D, in order to facilitate understanding of details of the drawings, an open side of each of three-way valves 121A, 122A, 123A, 124A, 121B, 122B, 123B, 124B is indicated in black, and a closed side of each of three-way valves 121A, 122A, 123A, 124A, 121B, 122B, 123B, 124B is indicated in white for convenience. Further, each of two-way valves 111A, 111B, 112A, 112B, 113A, 113B, 114A, 114B in an open state is indicated in black, and each of two-way valves 111A, 111B, 112A, 112B, 113A, 113B, 114A, 114B in a closed state is indicated in white.

In first adsorption refrigeration cycle 100A and second adsorption refrigeration cycle 100B, thick solid lines indicate paths through which the second heating medium and the third heating medium (e.g., water) having a low temperature for performing the adsorption process flow. Further, thick dotted lines indicate paths through which the first heating medium and the third heating medium (e.g., water) having a high temperature for performing the regeneration process flow. Further, thin two-dot chain lines indicate paths in a non-communicating state through which no heating medium flows.

Configurations of first adsorber 101A, second adsorber 102A, third adsorber 101B, and fourth adsorber 102B are similar to the configurations of the adsorbers of single effect adsorption refrigerator 100 except differences described below. Thus, detailed description may be omitted as needed.

Further, refrigerant system 300 of each of first adsorption refrigeration cycle 100A and second adsorption refrigeration cycle 100B is similar to the refrigerant system of single effect adsorption refrigerator 100. Thus, detailed description will be omitted.

The first state of double effect adsorption refrigerator 200 will be described in more detail with reference to FIG. 3A.

In the first state of double effect adsorption refrigerator 200, controller 700 connects an inlet port of second adsorber 102A to an outlet port of first heat exchanger 125A and connects an outlet port of second adsorber 102A to an inlet port of first heat exchanger 125A to form first circulation path 120AA. Accordingly, the first heating medium (e.g., water) which has flown out of the outlet port of first heat exchanger 125A flows into the inlet port of second adsorber 102A. In second adsorber 102A, the first adsorbent refrigerant (e.g., water) adsorbed by second adsorbent 102AA is desorbed by heat of the first heating medium heated by first heat exchanger 125A. The first heating medium which has flown out of the outlet port of second adsorber 102A flows into the inlet port of first heat exchanger 125A.

In the first state, controller 700 connects an inlet port of third adsorber 101B to an outlet port of second heat exchanger 231, connects an outlet port of third adsorber 101B to an inlet port of second condenser 116B, connects an outlet port of second condenser 116B to an inlet port of first condenser 116A, and connects an outlet port of first condenser 116A to an inlet port of second heat exchanger 231 to form second circulation path 230A. Accordingly, the second heating medium (e.g., water) which has flown out of the outlet port of second heat exchanger 231 flows into the inlet port of third adsorber 101B. In third adsorber 101B, the second adsorbent refrigerant (e.g., water) evaporated by second evaporator 115B is adsorbed by third adsorbent 101BB to heat the second heating medium. The second heating medium which has flown out of the outlet port of third adsorber 101B flows into the inlet port of second condenser 116B. The second heating medium which has flown out of the outlet port of second condenser 116B flows into the inlet port of first condenser 116A. The second heating medium which has flown out of the outlet port of first condenser 116A flows into the inlet port of second heat exchanger 231.

In the first state, controller 700 connects an outlet port of first adsorber 101A to an inlet port of fourth adsorber 102B and connects an inlet port of first adsorber 101A to an outlet port of fourth adsorber 102B to form third circulation path 220A. Accordingly, in first adsorber 101A, the first adsorbent refrigerant evaporated by first evaporator 115A is adsorbed by first adsorbent 101AA, and the third heating medium (e.g., water) is heated by the adsorption. The third heating medium which has flown out of the outlet port of first adsorber 101A flows into the inlet port of fourth adsorber 102B. In fourth adsorber 102B, the second adsorbent refrigerant adsorbed by fourth adsorbent 102BB is desorbed by heat of third heating medium. The third heating medium which has flown out of the outlet port of fourth adsorber 102B flows into the inlet port of first adsorber 101A.

In the first state, first evaporator 115A is connected to first adsorber 101A, and second evaporator 115B is connected to third adsorber 101B. At this time, first object 800A is cooled by the first working fluid from first evaporator 115A, and second object 800B is cooled by the second working fluid from second evaporator 115B.

The third state of double effect adsorption refrigerator 200 will be described in more detail with reference to FIG. 3B.

In the third state of double effect adsorption refrigerator 200, controller 700 connects the inlet port of second adsorber 102A to the outlet port of first heat exchanger 125A and connects the outlet port of second adsorber 102A to the inlet port of first heat exchanger 125A to form first circulation path 120AA. Accordingly, in second adsorber 102A, the first adsorbent refrigerant adsorbed by second adsorbent 102AA is desorbed by heat of the first heating medium heated by first heat exchanger 125A. The first heating medium which has flown out of the outlet port of first heat exchanger 125A flows into the inlet port of second adsorber 102A. The first heating medium which has flown out of the outlet port of second adsorber 102A flows into the inlet port of first heat exchanger 125A.

In the third state, controller 700 connects the inlet port of fourth adsorber 102B to the outlet port of second heat exchanger 231, connects the outlet port of fourth adsorber 102B to the inlet port of second condenser 116B, connects the outlet port of second condenser 116B to the inlet port of first condenser 116A, and connects the outlet port of first condenser 116A to the inlet port of second heat exchanger 231 to form fifth circulation path 230B. Accordingly, the second heating medium which has flown out of the outlet port of second heat exchanger 231 flows into the inlet port of fourth adsorber 102B. In fourth adsorber 102B, the second adsorbent refrigerant evaporated by second evaporator 115B is adsorbed by fourth adsorbent 102BB to heat the second heating medium. The second heating medium which has flown out of the outlet port of fourth adsorber 102B flows into the inlet port of second condenser 116B. The second heating medium which has flown out of the outlet port of second condenser 116B flows into the inlet port of first condenser 116A. The second heating medium which has flown out of the outlet port of first condenser 116A flows into the inlet port of second heat exchanger 231.

In the third state, controller 700 connects the outlet port of first adsorber 101A to the inlet port of third adsorber 101B and connects the inlet port of first adsorber 101A to the outlet port of third adsorber 101B to form seventh circulation path 220C. Accordingly, in first adsorber 101A, the first adsorbent refrigerant evaporated by first evaporator 115A is adsorbed by first adsorbent 101AA to heat the third heating medium. The third heating medium which has flown out of the outlet port of first adsorber 101A flows into the inlet port of third adsorber 101B. In third adsorber 101B, the second adsorbent refrigerant adsorbed by third adsorbent 101BB is desorbed by heat of the third heating medium. The third heating medium which has flown out of the outlet port of third adsorber 101B flows into the inlet port of first adsorber 101A.

In the third state, first evaporator 115A is connected to first adsorber 101A, and second evaporator 115B is connected to fourth adsorber 102B. At this time, first object 800A is cooled by the first working fluid from first evaporator 115A, and second object 800B is cooled by the second working fluid from second evaporator 115B.

The second state of double effect adsorption refrigerator 200 will be described in more detail with reference to FIG. 3C.

In the second state of double effect adsorption refrigerator 200, controller 700 connects the inlet port of first adsorber 101A to the outlet port of first heat exchanger 125A and connects the outlet port of first adsorber 101A to the inlet port of first heat exchanger 125A to form fourth circulation path 120AB. Accordingly, the first heating medium which has flown out of the outlet port of first heat exchanger 125A flows into the inlet port of first adsorber 101A. In first adsorber 101A, the first adsorbent refrigerant adsorbed by first adsorbent 101AA is desorbed by heat of the first heating medium heated by first heat exchanger 125A. The first heating medium which has flown out of the outlet port of first adsorber 101A flows into the inlet port of first heat exchanger 125A.

With reference to FIG. 3C, in the second state, controller 700 connects the inlet port of fourth adsorber 102B to the outlet port of second heat exchanger 231, connects the outlet port of fourth adsorber 102B to the inlet port of second condenser 116B, connects the outlet port of second condenser 116B to the inlet port of first condenser 116A, and connects the outlet port of first condenser 116A to the inlet port of second heat exchanger 231 to form fifth circulation path 230B. Accordingly, the second heating medium which has flown out of the outlet port of second heat exchanger 231 flows into the inlet port of fourth adsorber 102B. In fourth adsorber 102B, the second adsorbent refrigerant evaporated by second evaporator 115B is adsorbed by fourth adsorbent 102BB to heat the the second heating medium. The second heating medium which has flown out of the outlet port of fourth adsorber 102B flows into the inlet port of second condenser 116B. The second heating medium which has flown out of the outlet port of second condenser 116B flows into the inlet port of first condenser 116A. The second heating medium which has flown out of the outlet port of first condenser 116A flows into the inlet port of second heat exchanger 231.

In the second state, controller 700 connects the outlet port of second adsorber 102A to the inlet port of third adsorber 101B and connects the inlet port of second adsorber 102A to the outlet port of third adsorber 101B to form sixth circulation path 220B. Accordingly, in second adsorber 102A, the first adsorbent refrigerant evaporated by first evaporator 115A is adsorbed by second adsorbent 102AA to heat the third heating medium. The third heating medium which has flown out of the outlet port of second adsorber 102A flows into the inlet port of third adsorber 101B. In third adsorber 101B, the second adsorbent refrigerant adsorbed by third adsorbent 101BB is desorbed by heat of the third heating medium. The third heating medium which has flown out of the outlet port of third adsorber 101B flows into the inlet port of second adsorber 102A.

In the second state, first evaporator 115A is connected to second adsorber 102A, and second evaporator 115B is connected to fourth adsorber 102B. At this time, first object 800A is cooled by the first working fluid from first evaporator 115A, and second object 800B is cooled by the second working fluid from second evaporator 115B.

The fourth state of double effect adsorption refrigerator 200 will be described in more detail with reference to FIG. 3D.

In the fourth state of double effect adsorption refrigerator 200, controller 700 connects the inlet port of first adsorber 101A to the outlet port of first heat exchanger 125A and connects the outlet port of first adsorber 101A to the inlet port of first heat exchanger 125A to form fourth circulation path 120AB. Accordingly, the first heating medium which has flown out of the outlet port of first heat exchanger 125A flows into the inlet port of first adsorber 101A. In first adsorber 101A, the first adsorbent refrigerant adsorbed by first adsorbent 101AA is desorbed by heat of the first heating medium heated by first heat exchanger 125A. The first heating medium which has flown out of the outlet port of first adsorber 101A flows into the inlet port of first heat exchanger 125A.

In the fourth state, controller 700 connects the inlet port of third adsorber 101B to the outlet port of second heat exchanger 231, connects the outlet port of third adsorber 101B to the inlet port of second condenser 116B, connects the outlet port of second condenser 116B to the inlet port of first condenser 116A, and connects the outlet port of first condenser 116A to the inlet port of second heat exchanger 231 to form second circulation path 230A. Accordingly, the second heating medium which has flown out of the outlet port of second heat exchanger 231 flows into the inlet port of third adsorber 101B. In third adsorber 101B, the second adsorbent refrigerant evaporated by second evaporator 115B is adsorbed by third adsorbent 101BB to heat the second heating medium. The second heating medium which has flown out of the outlet port of third adsorber 101B flows into the inlet port of second condenser 116B. The second heating medium which has flown out of the outlet port of second condenser 116B flows into the inlet port of first condenser 116A. The second heating medium which has flown out of the outlet port of first condenser 116A flows into the inlet port of second heat exchanger 231.

In the fourth state, controller 700 connects the outlet port of second adsorber 102A to the inlet port of fourth adsorber 102B and connects the inlet port of second adsorber 102A to the outlet port of fourth adsorber 102B to form eighth circulation path 220D. Accordingly, in second adsorber 102A, the first adsorbent refrigerant evaporated by first evaporator 115A is adsorbed by second adsorbent 102AA to heat the third heating medium. The third heating medium which has flown out of the outlet port of second adsorber 102A flows into the inlet port of fourth adsorber 102B. In fourth adsorber 102B, the second adsorbent refrigerant adsorbed by fourth adsorbent 102BB is desorbed by heat of the third heating medium. The third heating medium which has flown out of the outlet port of fourth adsorber 102B flows into the inlet port of second adsorber 102A.

In the fourth state, first evaporator 115A is connected to second adsorber 102A, and second evaporator 115B is connected to third adsorber 101B. At this time, first object 800A is cooled by the first working fluid from first evaporator 115A, and second object 800B is cooled by the second working fluid from second evaporator 115B.

A device required for circulation of the first heating medium flowing through first circulation path 120AA and fourth circulation path 120AB is appropriately provided.

In the present example, buffer tank 126A and pump 127A are disposed between the outlet port of second adsorber 102A and the inlet port of first heat exchanger 125A on first circulation path 120AA. That is, first heat exchanger 125A, second adsorber 102A, buffer tank 126A, and pump 127A are disposed in this order in a flowing direction of the first heating medium on first circulation path 120AA of thermal system 400.

Buffer tank 126A and pump 127A are disposed between the outlet port of first adsorber 101A and the inlet port of first heat exchanger 125A on fourth circulation path 120AB. That is, first heat exchanger 125A, first adsorber 101A, buffer tank 126A, and pump 127A are disposed in this order in a flowing direction of the first heating medium on fourth circulation path 120AB of thermal system 400.

Pump 127A described above is a device for pressure-feeding the first heating medium. For example, a magnet pump or a cascade pump can be used as pump 127A.

A device required for circulation of the second heating medium flowing through second circulation path 230A and the fifth circulation path 230B is appropriately provided.

In the present example, pump 232 is disposed between the outlet port of second heat exchanger 231 and the inlet port of third adsorber 101B on second circulation path 230A. That is, second heat exchanger 231 (e.g., a cooling tower), pump 232, third adsorber 101B, second condenser 116B, and first condenser 116A are disposed in this order in a flowing direction of the second heating medium on second circulation path 230A of cooling water system 500.

Pump 232 is disposed between the outlet port of second heat exchanger 231 and the inlet port fourth adsorber 102B on fifth circulation path 230B. That is, second heat exchanger 231 (e.g., a cooling tower), pump 232, fourth adsorber 102B, second condenser 116B, and first condenser 116A are disposed in this order in a flowing direction of the second heating medium on fifth circulation path 230B of cooling water system 500.

Pump 232 described above is a device for pressure-feeding the second heating medium.

A device required for circulation of the third heating medium flowing through third circulation path 220A, sixth circulation path 220B, seventh circulation path 220C, and eighth circulation path 220D is appropriately provided.

In the present example, buffer tank 126B and pump 127B are disposed between the inlet port of first adsorber 101A and the outlet port of fourth adsorber 102B on third circulation path 220A. That is, buffer tank 126B, pump 127B, first adsorber 101A, and fourth adsorber 102B are disposed in this order in a flowing direction of the third heating medium on third circulation path 220A (heat recovery path 220).

Buffer tank 126B and pump 127B are disposed between the inlet port of second adsorber 102A and the outlet port of third adsorber 101B on sixth circulation path 220B. That is, buffer tank 126B, pump 127B, second adsorber 102A, and third adsorber 101B are disposed in this order in a flowing direction of the third heating medium on sixth circulation path 220B (heat recovery path 220).

Buffer tank 126B and pump 127B are disposed between the inlet port of first adsorber 101A and the outlet port of third adsorber 101B on seventh circulation path 220C. That is, buffer tank 126B, pump 127B, first adsorber 101A, and third adsorber 101B are disposed in this order in a flowing direction of the third heating medium on seventh circulation path 220C (heat recovery path 220).

Buffer tank 126B and pump 127B are disposed between the inlet port of second adsorber 102A and the outlet port of fourth adsorber 102B on eighth circulation path 220D. That is, buffer tank 126B, pump 127B, second adsorber 102A, and fourth adsorber 102B are disposed in this order in a flowing direction of the third heating medium on eighth circulation path 220D (heat recovery path 220).

Pump 127B described above is a device for pressure-feeding the third heating medium. For example, a magnet pump or a cascade pump can be used as pump 127B.

Controller 700 is capable of forming first circulation path 120AA, second circulation path 230A, third circulation path 220A, fourth circulation path 120AB, fifth circulation path 230B, sixth circulation path 220B, seventh circulation path 220C, and eighth circulation path 220D by controlling valve operations of three-way valves 121A, 122A, 123A, 124A, 121B, 122B, 123B, 124B and two-way valves 111A, 111B, 112A, 112B, 113A, 113B, 114A, 114B. Details of the valve operations can be easily understood by referring to white and black indications for the valves, and indications by solid lines, dotted lines, and two-dot chain lines for wiring in FIGS. 3A, 3B, 3C, and 3D. Thus, detailed description for the valve operations will be omitted.

Controller 700 is capable of controlling a flow rate of the first heating medium, a flow rate of the second heating medium, and a flow rate of third heating medium by powers of pump 127A, pump 232, and pump 127B, respectively.

Controller 700 may have any configuration having a control function. Controller 700 includes, for example, an operation circuit (not illustrated) and a storage circuit (not illustrated) which stores a control program. Examples of the operation circuit include a micro processing unit (MPU) and a central processing unit (CPU). An example of the storage circuit includes a memory. Controller 700 may be a single controller that performs centralized control or may include a plurality of controllers that perform decentralized control in cooperation with each other.

As described above, first heat exchanger 125A is a device (e.g., a heat source heat exchanger) that heats the first heating medium flowing through first circulation path 120AA and fourth circulation path 120AB of thermal system 400. That is, in first heat exchanger 125A, the first heating medium is used as a heat receiving fluid. Thus, heat can be taken into thermal system 400 from the appropriate first heat source when the first heating medium passes through first heat exchanger 125A.

First heat exchanger 125A may have any configuration capable of heating the first heating medium. That is, first heat exchanger 125A is a device in which heat exchange is performed between objects. When the objects are fluids, a high-temperature object and a low-temperature object can be referred to as, but not limited to, a heat applying fluid and a heat receiving fluid, respectively. The objects may be, for example, solids, or may be combinations of a fluid and a solid.

As described above, second heat exchanger 231 is a device (e.g., a cooling tower) that cools the second heating medium flowing through second circulation path 230A and the fifth circulation path 230B of cooling water system 500. That is, in second heat exchanger 231, the second heating medium is used as the heat applying fluid. Thus, heat is removed from the second heating medium when the second heating medium passes through second heat exchanger 231.

Second heat exchanger 231 may have any configuration capable of cooling the second heating medium. That is, second heat exchanger 231 is a device in which heat exchange is performed between objects. When the objects are fluids, a high-temperature object and a low-temperature object can be referred to as, but not limited to, the heat applying fluid and the heat receiving fluid, respectively. The objects may be, for example, solids, or may be combinations of a fluid and a solid.

The regeneration process and the adsorption process in first adsorption refrigeration cycle 100A and second adsorption refrigeration cycle 100B described above are examples, and the present disclosure is not limited to the examples. Further, types and dispositions of the above valves and a method for routing the paths are examples, and the present disclosure is not limited to the examples.

For example, the second heating medium of cooling water system 500 is used for cooling vapor generated in the regeneration process of first adsorption refrigeration cycle 100A and vapor generated in the regeneration process of second adsorption refrigeration cycle 100B in second condenser 116B and first condenser 116A. At this time, in cooling water system 500 of the present exemplary embodiment, the second heating medium passes through second condenser 116B and first condenser 116A in series in this order as described above. However, although not illustrated, a circulation path may be formed in such a manner that the second heating medium passes through second condenser 116B and first condenser 116A in parallel.

However, since a cooling temperature of vapor generated in the regeneration process of second adsorption refrigeration cycle 100B and a cooling temperature of vapor generated in the regeneration process of first adsorption refrigeration cycle 100A can be set higher in this order, a configuration of cooling water system 500 of the present exemplary embodiment enables the second heating medium that has passed through second adsorption refrigeration cycle 100B to be used in a cascade manner in cooling vapor generated in the regeneration process of first adsorption refrigeration cycle 100A. Further, only one pump 232 is required, which is rational in simplification of the configuration as compared to a case where the second heating medium passes through second condenser 116B and first condenser 116A in parallel.

[Configuration of Pipes and Pipe Connection in Double Effect Adsorption Refrigerator]

Figure 4:
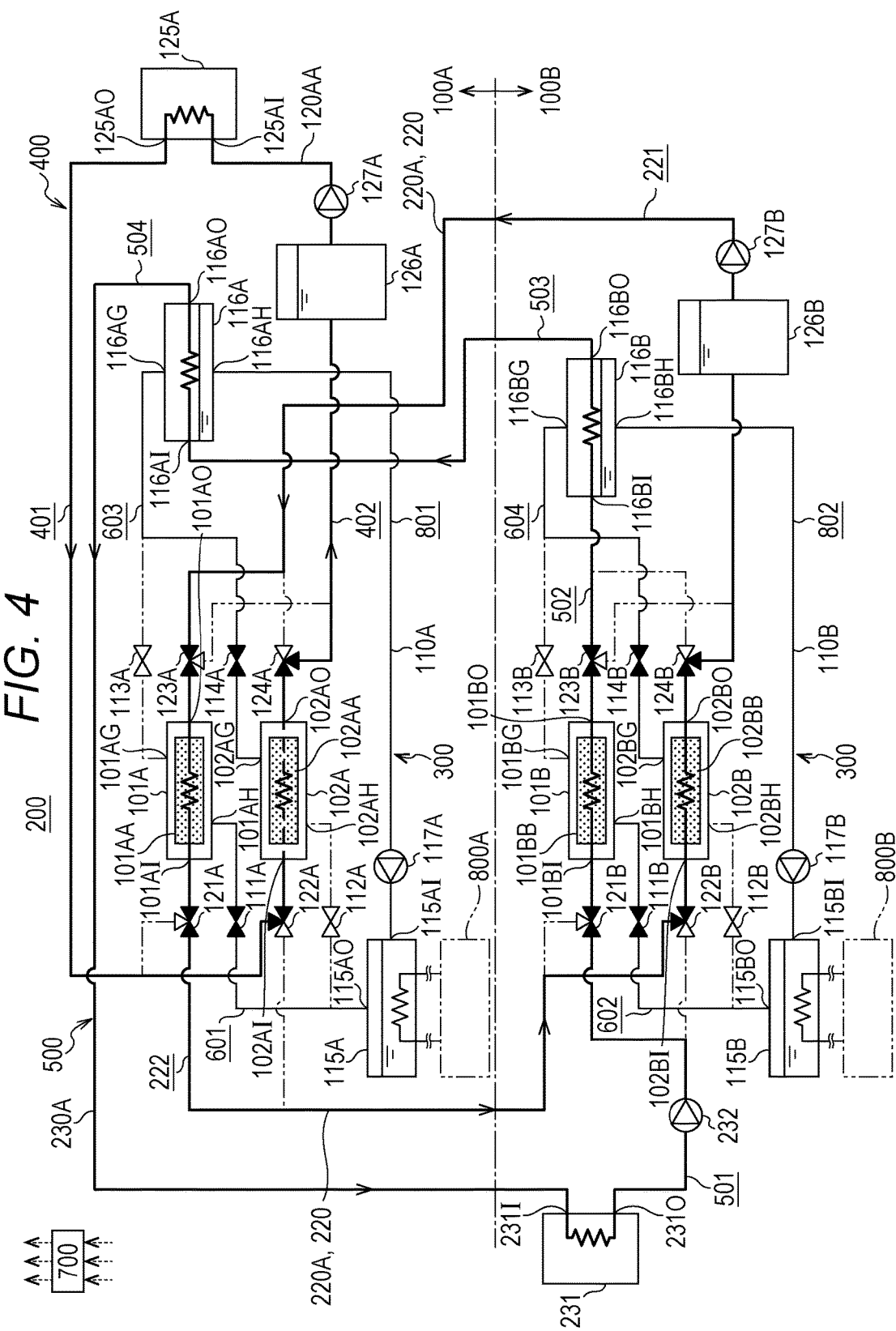
FIG. 4 is a diagram illustrating an example of a configuration of pipes and pipe connection in the double effect adsorption refrigerator of the first exemplary embodiment.

FIG. 4 is a diagram illustrating an example of a configuration of pipes and pipe connection in the double effect adsorption refrigerator of the first exemplary embodiment.

FIG. 4 illustrates the configuration of the pipes and the pipe connection in double effect adsorption refrigerator 200 corresponding to the first state (FIG. 3A) of double effect adsorption refrigerator 200. In FIG. 3A, thick solid lines indicate the paths through which the second heating medium and the third heating medium having a low temperature for performing the adsorption process flow, and thick dotted lines indicate the paths through which the first heating medium and the third heating medium having a high temperature for performing the regeneration process flow. On the other hand, in FIG. 4, all the paths are indicated by thick solid lines. In order to facilitate understanding of illustrated details of FIG. 4, reference signs designating the pipes are underlined.

Configurations of the pipes and the pipe connection in double effect adsorption refrigerator 200 corresponding to the third state (FIG. 3B), the second state (FIG. 3C), and the fourth state (FIG. 3D) of double effect adsorption refrigerator 200 can be easily understood from the following detailed description. Thus, description for these configurations will be omitted.

First heat exchanger 125A includes discharge port 125AO for the first heating medium and inlet port 125AI for the first heating medium.

Second heat exchanger 231 includes discharge port 231O for the second heating medium and inlet port 231I for the second heating medium.

First adsorber 101A contains first adsorbent 101AA, and includes first connection port 101AI, second connection port 101AO, third connection port 101AG, and fourth connection port 101AH.

Second adsorber 102A contains second adsorbent 102AA, and includes first connection port 102AI, second connection port 102AO, third connection port 102AG, and fourth connection port 102AH.

Third adsorber 101B contains third adsorbent 101BB, and includes first connection port 101BII, second connection port 101BO, third connection port 101BG, and fourth connection port 101BH.

Fourth adsorber 102B contains fourth adsorbent 102BB, and includes first connection port 102BI, second connection port 102BO, third connection port 102BG, and fourth connection port 102BH.

First condenser 116A includes first connection port 116AI, second connection port 116AO, third connection port 116AG, and fourth connection port 116AH.

Second condenser 116B includes first connection port 116BII, second connection port 116BO, third connection port 116BG, and fourth connection port 116BH.

First evaporator 115A includes first connection port 115AI and second connection port 115AO.

Second evaporator 115B includes first connection port 115BI and second connection port 115BO.

First pipe 401 which constitutes a part of first circulation path 120AA in thermal system 400 allows communication between discharge port 125AO of first heat exchanger 125A and first connection port 102AI of second adsorber 102A through three-way valve 122A by a valve operation of a first valve device (here, three-way valves 121A, 122A). That is, a valve operation of three-way valve 121A blocks communication of a pipe that constitutes a path indicated by a two-dot chain line, the path branching from first pipe 401 and extending up to three-way valve 121A.

Second pipe 402 which constitutes a part of first circulation path 120AA in thermal system 400 allows communication between inlet port 125AI of first heat exchanger 125A and second connection port 102AO of second adsorber 102A through three-way valve 124A (strictly, buffer tank 126A and pump 127A lie midway in second pipe 402) by a valve operation of a second valve device (here, three-way valves 123A, 124A). That is, a valve operation of three-way valve 123A blocks communication of a pipe that constitutes a path indicated by a two-dot chain line, the path branching from second pipe 402 and extending up to three-way valve 123A.

Third pipe 501 which constitutes a part of second circulation path 230A in cooling water system 500 allows communication between discharge port 231O of second heat exchanger 231 and first connection port 101BI of third adsorber 101B through three-way valve 121B (strictly, pump 232 lies midway in third pipe 501) by a valve operation of a third valve device (here, three-way valves 121B, 122B). That is, a valve operation of three-way valve 122B blocks communication of a pipe that constitutes a path indicated by a two-dot chain line, the path branching from third pipe 501 and extending up to three-way valve 122B.

Fourth pipe 502 which constitutes a part of second circulation path 230A in cooling water system 500 allows communication between second connection port 101BO of third adsorber 101B and first connection port 116BI of second condenser 116B through three-way valve 123B by a valve operation of a fourth valve device (here, three-way valves 123B, 124B). That is, a valve operation of three-way valve 124B blocks communication of a pipe that constitutes a path indicated by a two-dot chain line, the path branching from fourth pipe 502 and extending up to three-way valve 124B.

Fifth pipe 503 which constitutes a part of second circulation path 230A in cooling water system 500 allows communication between second connection port 116BO of second condenser 116B and first connection port 116AI of first condenser 116A.

Sixth pipe 504 which constitutes a part of second circulation path 230A in cooling water system 500 allows communication between second connection port 116AO of first condenser 116A and inlet port 231I of second heat exchanger 231.

Seventh pipe 221 which constitutes a part of third circulation path 220A (heat recovery path 220) allows communication between second connection port 102BO of fourth adsorber 102B and second connection port 101AO of first adsorber 101A through three-way valves 123A, 124B (strictly, buffer tank 126B and pump 127B lie midway in seventh pipe 221) by valve operations of the second valve device (here, three-way valves 123A, 124A) and the fourth valve device (here, three-way valves 123B, 124B). That is, a valve operation of three-way valve 124A blocks communication of a pipe that constitutes a path indicated by a two-dot chain line, the path branching from seventh pipe 221 and extending up to three-way valve 124A. A valve operation of three-way valve 123B blocks communication of a pipe that constitutes a path indicated by a two-dot chain line, the path branching from seventh pipe 221 and extending up to three-way valve 123B.

Eighth pipe 222 which constitutes a part of third circulation path 220A (heat recovery path 220) allows communication between first connection port 101AI of first adsorber 101A and first connection port 102BI of fourth adsorber 102B through three-way valves 121A, 122B by valve operations of the first valve device (here, three-way valves 121A, 122A) and the third valve device (here, three-way valves 121B, 122B). That is, a valve operation of three-way valve 122A blocks communication of a pipe that constitutes a path indicated by a two-dot chain line, the path branching from eighth pipe 222 and extending up to three-way valve 122A. A valve operation of three-way valve 121B blocks communication of a pipe that constitutes a path indicated by a two-dot chain line, the path branching from eighth pipe 222 and extending up to three-way valve 121B.

Ninth pipe 601 which constitutes a vapor passage path from first evaporator 115A to first adsorber 101A allows communication between second connection port 115AO of first evaporator 115A and fourth connection port 101AH of first adsorber 101A through two-way valve 111A by a valve operation of a fifth valve device (here, two-way valves 111A, 112A). That is, a valve operation of two-way valve 112A blocks communication of a pipe that constitutes a path indicated by a two-dot chain line, the path branching from ninth pipe 601 and extending up to fourth connection port 102AH of second adsorber 102A.

Tenth pipe 602 which constitutes a vapor passage path from second evaporator 115B to third adsorber 101B allows communication between second connection port 115BO of second evaporator 115B and fourth connection port 101BH of third adsorber 101B through two-way valve 111B by a valve operation of a sixth valve device (here, two-way valves 111B, 112B). That is, a valve operation of two-way valve 112B blocks communication of a pipe that constitutes a path indicated by a two-dot chain line, the path branching from tenth pipe 602 and extending up to fourth connection port 102BH of fourth adsorber 102B.

Eleventh pipe 603 which constitutes a vapor passage path from second adsorber 102A to first condenser 116A allows communication between third connection port 102AG of second adsorber 102A and third connection port 116AG of first condenser 116A through two-way valve 114A by a valve operation of a seventh valve device (here, two-way valves 113A, 114A). That is, a valve operation of two-way valve 113A blocks communication of a pipe that constitutes a path indicated by a two-dot chain line, the path branching from eleventh pipe 603 and extending up to third connection port 101AG of first adsorber 101A.

Twelfth pipe 604 which constitutes a vapor passage path from fourth adsorber 102B to second condenser 116B allows communication between third connection port 102BG of fourth adsorber 102B and third connection port 116BG of second condenser 116B through two-way valve 114B by a valve operation of an eighth valve device (here, two-way valves 113B, 114B). That is, a valve operation of two-way valve 113B blocks communication of a pipe that constitutes a path indicated by a two-dot chain line, the path branching from twelfth pipe 604 and extending up to third connection port 101BG of third adsorber 101B.

Thirteenth pipe 801 which constitutes water path 110A in refrigerant system 300 allows communication between fourth connection port 116AH of first condenser 116A and first connection port 115AI of first evaporator 115A (strictly, pump 117A lies midway in thirteenth pipe 801).

Fourteenth pipe 802 which constitutes water path 110B in refrigerant system 300 allows communication between fourth connection port 116BH of second condenser 116B and first connection port 115BI of second evaporator 115B (strictly, pump 117A lies midway in thirteenth pipe 801).

The types, dispositions, and the method for connecting and routing the pipes described above are examples, and the present disclosure is not limited to the examples. For example, although, in the above exemplary embodiment, the first valve device, the second valve device, the third valve device, and the fourth valve device are constituted of the three-way valves, these valve devices may be constituted of two-way valves.

Accordingly, it is possible to appropriately obtain double effect adsorption refrigerator 200 provided with specific elements for the double effect by the adsorption heat recovery system.

Further, in double effect adsorption refrigerator 200 of the present exemplary embodiment, the third heating medium flowing through third circulation path 220A, sixth circulation path 220B, seventh circulation path 220C, or eighth circulation path 220D can be temporarily stored in buffer tank 126B.

[Operation]

Hereinbelow, a method (operation) for controlling double effect adsorption refrigerator 200 of the present exemplary embodiment by the adsorption heat recovery system will be described with reference to FIGS. 3A, 3B, 3C, and 3D.

The operation described below is performed by controller 700 by reading the control program from the storage circuit by the operation circuit. However, it is not necessarily essential to perform the operation by the controller. An operator may perform part of the operation or the entire operation.

First, a step of preparing double effect adsorption refrigerator 200 provided with the following elements is performed.

Specifically, double effect adsorption refrigerator 200 includes first adsorber 101A which contains first adsorbent 101AA capable of adsorbing and desorbing the first adsorbent refrigerant, second adsorber 102A which contains second adsorbent 102AA capable of adsorbing and desorbing the first adsorbent refrigerant, first evaporator 115A capable of evaporating the first adsorbent refrigerant under reduced pressure to cool the first working fluid, first condenser 116A capable of condensing the first adsorbent refrigerant in gaseous state, third adsorber 101B which contains third adsorbent 101BB capable of adsorbing and desorbing the second adsorbent refrigerant, fourth adsorber 102B which contains fourth adsorbent 102BB capable of adsorbing and desorbing the second adsorbent refrigerant, second evaporator 115B capable of evaporating the second adsorbent refrigerant under reduced pressure to cool the second working fluid, second condenser 116B capable of condensing the second adsorbent refrigerant in gaseous state, first heat exchanger 125A capable of applying heat absorbed from the first heat source to the first heating medium, second heat exchanger 231 capable of removing and releasing heat from the second heating medium, and controller 700 which performs control for switching to any of the first state, the second state, the third state, and the fourth state.

Next, a step of performing switching to any one of the first state, the second state, the third state, and the fourth state is performed.

In the first state, the inlet port of second adsorber 102A is connected to the outlet port of first heat exchanger 125A, and the outlet port of second adsorber 102A is connected to the inlet port of first heat exchanger 125A, so that first circulation path 120AA is formed. The first heating medium (e.g., water) which has flown out of the outlet port of first heat exchanger 125A flows into the inlet port of second adsorber 102A. In second adsorber 102A, the first adsorbent refrigerant (e.g., water) adsorbed by second adsorbent 102AA is desorbed by heat of the first heating medium heated by first heat exchanger 125A. The first heating medium which has flown out of the outlet port of second adsorber 102A flows into the inlet port of first heat exchanger 125A.

Further, in the first state, the inlet port of third adsorber 101B is connected to the outlet port of second heat exchanger 231, the outlet port of third adsorber 101B is connected to the inlet port of second condenser 116B, the outlet port of second condenser 116B is connected to the inlet port of first condenser 116A, and the outlet port of first condenser 116A is connected to the inlet port of second heat exchanger 231, so that second circulation path 230A is formed. The second heating medium (e.g., water) which has flown out of the outlet port of second heat exchanger 231 flows into the inlet port of third adsorber 101B. In third adsorber 101B, the second adsorbent refrigerant (e.g., water) evaporated by second evaporator 115B is adsorbed by third adsorbent 101BB to heat the second heating medium. The second heating medium which has flown out of the outlet port of third adsorber 101B flows into the inlet port of second condenser 116B. The second heating medium which has flown out of the outlet port of second condenser 116B flows into the inlet port of first condenser 116A. The second heating medium which has flown out of the outlet port of first condenser 116A flows into the inlet port of second heat exchanger 231.

Further, in the first state, the outlet port of first adsorber 101A is connected to the inlet port of fourth adsorber 102B, and the inlet port of first adsorber 101A is connected to the outlet port of fourth adsorber 102B, so that third circulation path 220A is formed. In first adsorber 101A, the first adsorbent refrigerant evaporated by first evaporator 115A is adsorbed by first adsorbent 101AA, and the third heating medium (e.g., water) is heated by the adsorption. The third heating medium which has flown out of the outlet port of first adsorber 101A flows into the inlet port of fourth adsorber 102B. In fourth adsorber 102B, the second adsorbent refrigerant adsorbed by fourth adsorbent 102BB is desorbed by heat of third heating medium. The third heating medium which has flown out of the outlet port of fourth adsorber 102B flows into the inlet port of first adsorber 101A.

Further, in the first state, first evaporator 115A is connected to first adsorber 101A, and second evaporator 115B is connected to third adsorber 101B. Accordingly, first object 800A is cooled by the first working fluid from first evaporator 115A, and second object 800B is cooled by the second working fluid from second evaporator 115B.

In the second state, the inlet port of first adsorber 101A is connected to the outlet port of first heat exchanger 125A, and the outlet port of first adsorber 101A is connected to the inlet port of first heat exchanger 125A, so that fourth circulation path 120AB is formed. The first heating medium which has flown out of the outlet port of first heat exchanger 125A flows into the inlet port of first adsorber 101A. In first adsorber 101A, the first adsorbent refrigerant adsorbed by first adsorbent 101AA is desorbed by heat of the first heating medium heated by first heat exchanger 125A. The first heating medium which has flown out of the outlet port of first adsorber 101A flows into the inlet port of first heat exchanger 125A.

Further, in the second state, the inlet port of fourth adsorber 102B is connected to the outlet port of second heat exchanger 231, the outlet port of fourth adsorber 102B is connected to the inlet port of second condenser 116B, the outlet port of second condenser 116B is connected to the inlet port of first condenser 116A, and the outlet port of first condenser 116A is connected to the inlet port of second heat exchanger 231, so that fifth circulation path 230B is formed. The second heating medium which has flown out of the outlet port of second heat exchanger 231 flows into the inlet port of fourth adsorber 102B. In fourth adsorber 102B, the second adsorbent refrigerant evaporated by second evaporator 115B is adsorbed by fourth adsorbent 102BB to heat the second heating medium. The second heating medium which has flown out of the outlet port of fourth adsorber 102B flows into the inlet port of second condenser 116B. The second heating medium which has flown out of the outlet port of second condenser 116B flows into the inlet port of first condenser 116A. The second heating medium which has flown out of the outlet port of first condenser 116A flows into the inlet port of second heat exchanger 231.

Further, in the second state, the outlet port of second adsorber 102A is connected to the inlet port of third adsorber 101B, and the inlet port of second adsorber 102A is connected to the outlet port of third adsorber 101B, so that sixth circulation path 220B is formed. In second adsorber 102A, the first adsorbent refrigerant evaporated by first evaporator 115A is adsorbed by second adsorbent 102AA to heat the third heating medium. The third heating medium which has flown out of the outlet port of second adsorber 102A flows into the inlet port of third adsorber 101B. In third adsorber 101B, the second adsorbent refrigerant adsorbed by third adsorbent 101BB is desorbed by heat of the third heating medium. The third heating medium which has flown out of the outlet port of third adsorber 101B flows into the inlet port of second adsorber 102A.

Further, in the second state, first evaporator 115A is connected to second adsorber 102A, and second evaporator 115B is connected to fourth adsorber 102B. Accordingly, first object 800A is cooled by the first working fluid from first evaporator 115A, and second object 800B is cooled by the second working fluid from second evaporator 115B.

In the third state, the inlet port of second adsorber 102A is connected to the outlet port of first heat exchanger 125A, and the outlet port of second adsorber 102A is connected to the inlet port of first heat exchanger 125A, so that first circulation path 120AA is formed. In second adsorber 102A, the first adsorbent refrigerant adsorbed by second adsorbent 102AA is desorbed by heat of the first heating medium heated by first heat exchanger 125A. The first heating medium which has flown out of the outlet port of first heat exchanger 125A flows into the inlet port of second adsorber 102A. The first heating medium which has flown out of the outlet port of second adsorber 102A flows into the inlet port of first heat exchanger 125A.

Further, in the third state, the inlet port of fourth adsorber 102B is connected to the outlet port of second heat exchanger 231, the outlet port of fourth adsorber 102B is connected to the inlet port of second condenser 116B, the outlet port of second condenser 116B is connected to the inlet port of first condenser 116A, and the outlet port of first condenser 116A is connected to the inlet port of second heat exchanger 231, so that fifth circulation path 230B is formed. The second heating medium which has flown out of the outlet port of second heat exchanger 231 flows into the inlet port of fourth adsorber 102B. In fourth adsorber 102B, the second adsorbent refrigerant evaporated by second evaporator 115B is adsorbed by fourth adsorbent 102BB to heat the second heating medium. The second heating medium which has flown out of the outlet port of fourth adsorber 102B flows into the inlet port of second condenser 116B. The second heating medium which has flown out of the outlet port of second condenser 116B flows into the inlet port of first condenser 116A. The second heating medium which has flown out of the outlet port of first condenser 116A flows into the inlet port of second heat exchanger 231.

Further, in the third state, the outlet port of first adsorber 101A is connected to the inlet port of third adsorber 101B, and the inlet port of first adsorber 101A is connected to the outlet port of third adsorber 101B, so that seventh circulation path 220C is formed. In first adsorber 101A, the first adsorbent refrigerant evaporated by first evaporator 115A is adsorbed by first adsorbent 101AA to heat the third heating medium. The third heating medium which has flown out of the outlet port of first adsorber 101A flows into the inlet port of third adsorber 101B. In third adsorber 101B, the second adsorbent refrigerant adsorbed by third adsorbent 101BB is desorbed by heat of the third heating medium. The third heating medium which has flown out of the outlet port of third adsorber 101B flows into the inlet port of first adsorber 101A.

Further, in the third state, first evaporator 115A is connected to first adsorber 101A, and second evaporator 115B is connected to fourth adsorber 102B. Accordingly, first object 800A is cooled by the first working fluid from first evaporator 115A, and second object 800B is cooled by the second working fluid from second evaporator 115B.

In the fourth state, the inlet port of first adsorber 101A is connected to the outlet port of first heat exchanger 125A, and the outlet port of first adsorber 101A is connected to the inlet port of first heat exchanger 125A, so that fourth circulation path 120AB is formed. The first heating medium which has flown out of the outlet port of first heat exchanger 125A flows into the inlet port of first adsorber 101A. In first adsorber 101A, the first adsorbent refrigerant adsorbed by first adsorbent 101AA is desorbed by heat of the first heating medium heated by first heat exchanger 125A. The first heating medium which has flown out of the outlet port of first adsorber 101A flows into the inlet port of first heat exchanger 125A.

Further, in the fourth state, the inlet port of third adsorber 101B is connected to the outlet port of second heat exchanger 231, the outlet port of third adsorber 101B is connected to the inlet port of second condenser 116B, the outlet port of second condenser 116B is connected to the inlet port of first condenser 116A, and the outlet port of first condenser 116A is connected to the inlet port of second heat exchanger 231, so that second circulation path 230A is formed. The second heating medium which has flown out of the outlet port of second heat exchanger 231 flows into the inlet port of third adsorber 101B. In third adsorber 101B, the second adsorbent refrigerant evaporated by second evaporator 115B is adsorbed by the third adsorbent to heat the second heating medium. The second heating medium which has flown out of the outlet port of third adsorber 101B flows into the inlet port of second condenser 116B. The second heating medium which has flown out of the outlet port of second condenser 116B flows into the inlet port of first condenser 116A. The second heating medium which has flown out of the outlet port of first condenser 116A flows into the inlet port of second heat exchanger 231.

Further, in the fourth state, the outlet port of second adsorber 102A is connected to the inlet port of fourth adsorber 102B, and the inlet port of second adsorber 102A is connected to the outlet port of fourth adsorber 102B, so that eighth circulation path 220D is formed. In second adsorber 102A, the first adsorbent refrigerant evaporated by first evaporator 115A is adsorbed by second adsorbent 102AA to heat the third heating medium. The third heating medium which has flown out of the outlet port of second adsorber 102A flows into the inlet port of fourth adsorber 102B. In fourth adsorber 102B, the second adsorbent refrigerant adsorbed by fourth adsorbent 102BB is desorbed by heat of the third heating medium. The third heating medium which has flown out of the outlet port of fourth adsorber 102B flows into the inlet port of second adsorber 102A.

Further, in the fourth state, first evaporator 115A is connected to second adsorber 102A, and second evaporator 115B is connected to third adsorber 101B. Accordingly, first object 800A is cooled by the first working fluid from first evaporator 115A, and second object 800B is cooled by the second working fluid from second evaporator 115B.

Accordingly, it is possible to appropriately obtain the method for controlling double effect adsorption refrigerator 200, the method including specific steps for the double effect by the adsorption heat recovery system.

Second Exemplary Embodiment

Figure 5:
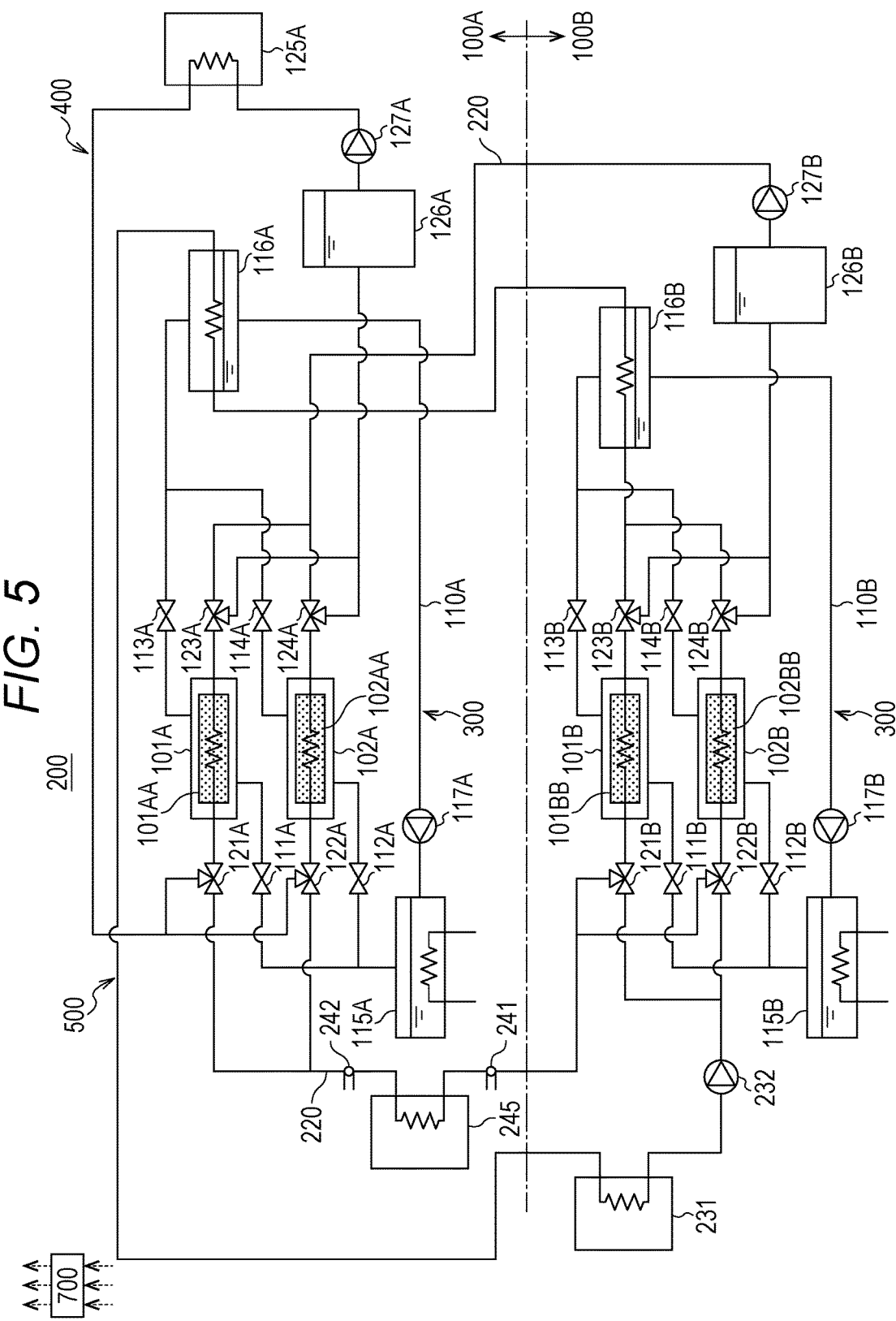
FIG. 5 is a diagram illustrating an example of a double effect adsorption refrigerator of a second exemplary embodiment.

FIG. 5 is a diagram illustrating an example of a double effect adsorption refrigerator of a second exemplary embodiment. Switching of an operation state of each of first adsorber 101A, second adsorber 102A, third adsorber 101B, and fourth adsorber 102B can be easily understood from the above description. Thus, all three-way valves and all two-way valves in FIG. 5 are indicated in white, and all paths are indicated by solid lines. Further, an arrow indicating a flow of a heating medium is omitted.

As described above, heat recovery path 220 of FIG. 5 functions as any of third circulation path 220A (FIG. 3A), sixth circulation path 220B (FIG. 3B), seventh circulation path 220C (FIG. 3C), and eighth circulation path 220D (FIG. 3D) by valve operations of three-way valves 121A, 122A, 123A, 124A, 121B, 122B, 123B, 124B.

As illustrated in FIG. 5, double effect adsorption refrigerator 200 of the present exemplary embodiment includes first temperature detector 241, second temperature detector 242, third heat exchanger 245 (e.g., a heat source heat exchanger), and controller 700. Other elements are similar to the elements of double effect adsorption refrigerator 200 of the first exemplary embodiment. Thus, description for the other elements may be omitted.

Third heat exchanger 245 is a heat exchanger capable of applying heat absorbed from a second heat source to a third heating medium and disposed between an outlet port of first adsorber 101A and an inlet port of fourth adsorber 102B on third circulation path 220A, between an outlet port of second adsorber 102A and an inlet port of third adsorber 101B on sixth circulation path 220B, between the outlet port of first adsorber 101A and the inlet port of third adsorber 101B on seventh circulation path 220C, or between the outlet port of second adsorber 102A and the inlet port of fourth adsorber 102B on eighth circulation path 220D. The third heating medium is heated by third heat exchanger 245. A second adsorbent refrigerant adsorbed by third adsorbent 101BB of third adsorber 101B or fourth adsorbent 102BB of fourth adsorber 102B is desorbed by heat of the heated third heating medium.

That is, in third heat exchanger 245, the third heating medium, after passing through first adsorber 101A or second adsorber 102A in first adsorption refrigeration cycle 100A and before flowing into third adsorber 101B or fourth adsorber 102B in second adsorption refrigeration cycle 100B, is used as a heat receiving fluid. Further, in third heat exchanger 245, heat is supplied from the second heat source at a low-temperature side of an external device. A concrete example of the second heat source will be described in a working example.

As described above, third heat exchanger 245 is a device that heats the third heating medium flowing through heat recovery path 220. Third heat exchanger 245 may have any configuration capable of heating the third heating medium flowing through heat recovery path 220. That is, third heat exchanger 245 is a device in which heat exchange is performed between objects. When the objects are fluids, a high-temperature object and a low-temperature object can be referred to as, but not limited to, a heat applying fluid and a heat receiving fluid, respectively. The objects may be, for example, solids, or may be combinations of a fluid and a solid.

First temperature detector 241 is disposed between an outlet port of third heat exchanger 245 and the inlet port of third adsorber 101B on each of sixth circulation path 220B and seventh circulation path 220C or between the outlet port of third heat exchanger 245 and the inlet port of fourth adsorber 102B on each of third circulation path 220A and eighth circulation path 220D.

That is, first temperature detector 241 is a detector that detects a temperature of the third heating medium immediately before the third heating medium flows into third adsorber 101B or fourth adsorber 102B where a regeneration process of second adsorption refrigeration cycle 100B is performed. First temperature detector 241 may have any configuration capable of directly or indirectly detecting such a temperature of the third heating medium.

For example, first temperature detector 241 may be disposed within heat recovery path 220 to directly detect the temperature of the third heating medium, or first temperature detector 241 may be disposed at a predetermined location (e.g., a surface of a pipe that constitutes heat recovery path 220 or an area around the surface of the pipe) that is correlated with the temperature of the third heating medium to indirectly detect the temperature of the third heating medium. Examples of first temperature detector 241 include a thermocouple and a thermistor.

Second temperature detector 242 is disposed between an inlet port of third heat exchanger 245 and the outlet port of first adsorber 101A or between the inlet port of third heat exchanger 245 and the outlet port of the second adsorber 102A on third circulation path 220A, sixth circulation path 220B, seventh circulation path 220C, and eighth circulation path 220D.

That is, second temperature detector 242 is a detector that detects the temperature of the third heating medium immediately before the third heating medium flows into third heat exchanger 245. Second temperature detector 242 may have any configuration capable of directly or indirectly detecting such a temperature of the third heating medium.

For example, second temperature detector 242 may be disposed within heat recovery path 220 to directly detect the temperature of the third heating medium, or second temperature detector 242 may be disposed at a predetermined location (e.g., a surface of a pipe that constitutes heat recovery path 220 or an area around the surface of the pipe) that is correlated with the temperature of the third heating medium to indirectly detect the temperature of the third heating medium. Examples of second temperature detector 242 include a thermocouple and a thermistor.

Double effect adsorption refrigerator 200 includes pump 127B for pressure-feeding the third heating medium. Pump 127B is disposed on third circulation path 220A, sixth circulation path 220B, seventh circulation path 220C, and eighth circulation path 220D.

Thus, controller 700 controls an operation of pump 127B based on the temperature of the third heating medium detected by first temperature detector 241. Further, controller 700 controls the operation of pump 127B based on the temperature of the third heating medium detected by second temperature detector 242.

Accordingly, double effect adsorption refrigerator 200 of the present exemplary embodiment is capable of effectively utilizing heat of a plurality of heat sources having different temperatures. When double effect adsorption refrigerator 200 is provided with only one heat exchanger for receiving heat of heat sources, it may be impossible to effectively utilize heat of a heat source at a high-temperature side and heat of a heat source at a low-temperature side of an external device. However, in double effect adsorption refrigerator 200 of the present exemplary embodiment, such a possibility can be reduced by the configuration described above.

Specifically, first heat exchanger 125A applies heat of a first heat source (e.g., a heat supply device) at the high-temperature side of the external device to the first heating medium, and third heat exchanger 245 applies heat of the second heat source (e.g., a heat supply device) at the low-temperature side of the external device to the third heating medium. Further, the third heating medium is configured to recover adsorption heat of first adsorber 101A or second adsorber 102A. Accordingly, it is possible to effectively utilize both of the first heat source at the high-temperature side and the second heat source at the low-temperature side.

In double effect adsorption refrigerator 200 of the present exemplary embodiment, adsorption heat of first adsorption refrigeration cycle 100A can be appropriately recovered by the third heating medium within heat recovery path 220.

For example, a temperature of the second heat source which supplies heat to third heat exchanger 245 may be sufficiently higher than a standard regeneration temperature of third adsorber 101B or fourth adsorber 102B. In this case, if third heat exchanger 245 is disposed, for example, between the inlet port of first adsorber 101A and the outlet port of fourth adsorber 102B on third circulation path 220A, it may be impossible for the third heating medium to appropriately recover the adsorption heat of first adsorber 101A due to an excessive temperature rise in the third heating medium which has flown through a path between the inlet port of first adsorber 101A and the outlet port of fourth adsorber 102B. However, in double effect adsorption refrigerator 200 of the present exemplary embodiment, third heat exchanger 245 is disposed on the path described above. Thus, it is possible to reduce such a possibility.

Further, heat of the second heat source described above can be applied to the third heating medium immediately before the third heating medium flows into third adsorber 101B or fourth adsorber 102B. Thus, the regeneration temperature of third adsorber 101B or fourth adsorber 102B becomes sufficiently high, which makes it possible to appropriately improve an efficiency of third adsorber 101B and an efficiency of fourth adsorber 102B.

Further, there may be a lower limit temperature in an operation of the second heat source described above. In this case, if third heat exchanger 245 is disposed, for example, between the inlet port of first adsorber 101A and the outlet port of fourth adsorber 102B on third circulation path 220A, heat may be excessively removed from the second heat source by heat exchange with the third heating medium before recovery of the adsorption heat. Accordingly, the temperature of the second heat source may fall below the lower limit temperature. However, in double effect adsorption refrigerator 200 of the present exemplary embodiment, third heat exchanger 245 is disposed on the path described above. Thus, it is possible to reduce such a possibility.

Further, in double effect adsorption refrigerator 200 of the present exemplary embodiment, first temperature detector 241 is capable of detecting the temperature of the third heating medium immediately before the third heating medium flows into third adsorber 101B or fourth adsorber 102B in second adsorption refrigeration cycle 100B after passing through first adsorber 101A or second adsorber 102A and third heat exchanger 245 in first adsorption refrigeration cycle 100A. Thus, controller 700 is capable of controlling the operation of pump 127B based on the temperature detected by first temperature detector 241 so that the temperature of third adsorber 101B or fourth adsorber 102B in second adsorption refrigeration cycle 100B can be maintained at an appropriate temperature required for the regeneration process of second adsorption refrigeration cycle 100B.

Further, second temperature detector 242 is capable of detecting the temperature of the third heating medium immediately before the third heating medium flows into third heat exchanger 245 after passing through first adsorber 101A or second adsorber 102A in first adsorption refrigeration cycle 100A. Thus, for example, when there is a lower limit temperature in the operation of the second heat source which supplies heat to third heat exchanger 245, controller 700 is capable of controlling the operation of pump 127B based on the temperature detected by second temperature detector 242 so that the temperature of the second heat source does not fall below the lower limit temperature.

Double effect adsorption refrigerator 200 of the present exemplary embodiment may be configured similarly to double effect adsorption refrigerator 200 of the first exemplary embodiment except characteristics described above.

Working Example

Figure 6:
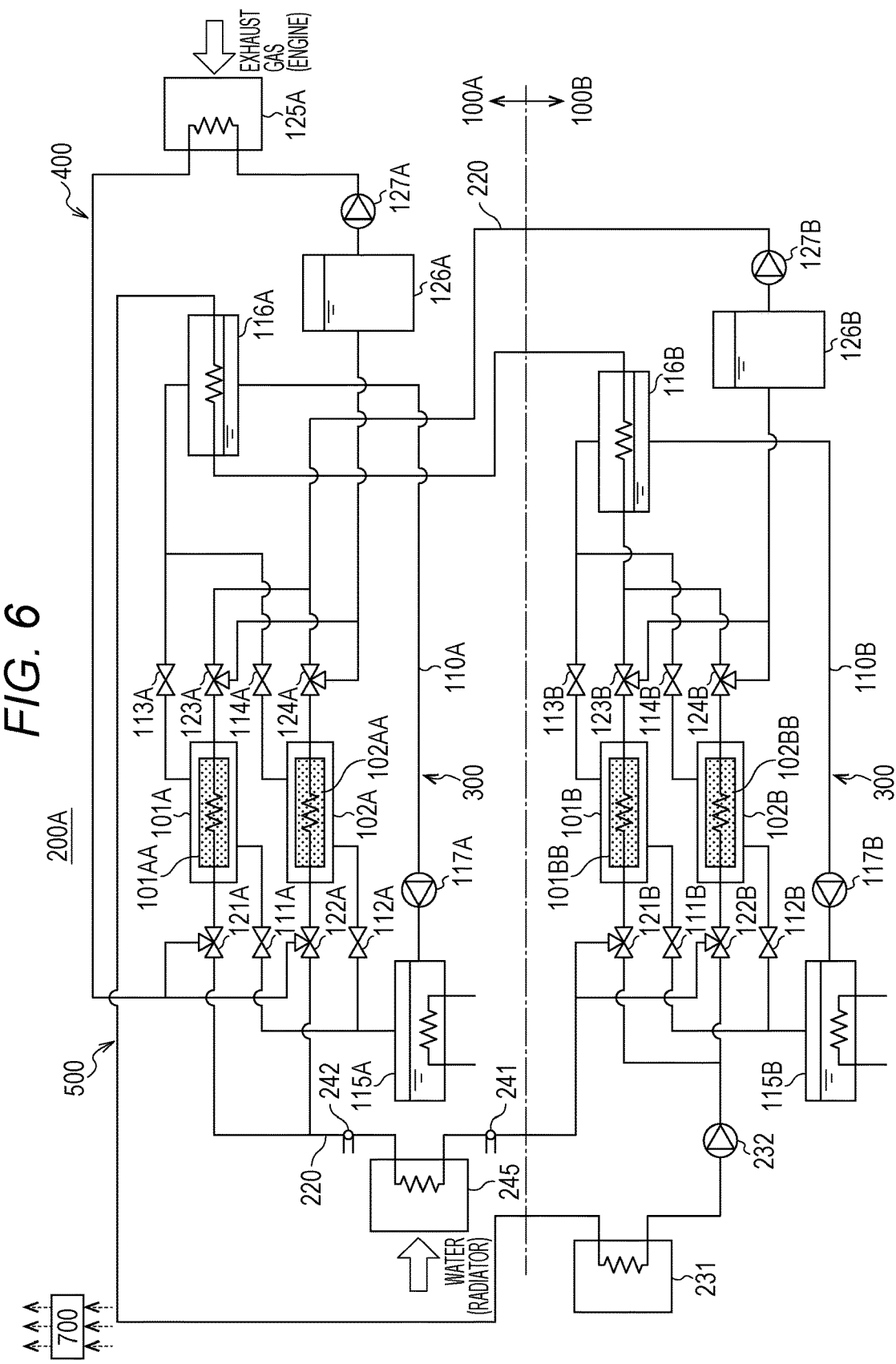
FIG. 6 is a diagram illustrating an example of a refrigeration cogeneration system (cooling system) in a working example of the second exemplary embodiment.

FIG. 6 is a diagram illustrating an example of a refrigeration cogeneration system (cooling system) in a working example of the second exemplary embodiment. FIG. 6 illustrates refrigeration cogeneration system (cooling system) 200A which is a combination of an engine generator and double effect adsorption refrigerator 200 of FIG. 5. A configuration of the engine generator is known. Thus, detailed description and illustration for the engine generator will be omitted.

In the present example, exhaust gas having a high temperature (e.g., approximately 200° C.) discharged from an engine combustion chamber is supplied, as a heat applying fluid, to first heat exchanger 125A of refrigeration cogeneration system 200A. Water (hot water) having a predetermined temperature (e.g., in a range from approximately 80° C. to approximately 85° C.) supplied from a radiator is supplied, as a heat applying fluid, to third heat exchanger 245 of refrigeration cogeneration system 200A. Thus, in this case, refrigeration cogeneration system 200A includes an engine which supplies heat to the first heating medium (e.g., water) flowing through thermal system 400 in first heat exchanger 125A. Further, refrigeration cogeneration system 200A includes the radiator which supplies heat to the third heating medium (e.g., water) flowing through heat recovery path 220 before the third heating medium flows into third adsorber 101B or fourth adsorber 102B in second adsorption refrigeration cycle 100B after passing through first adsorber 101A or second adsorber 102A in first adsorption refrigeration cycle 100A in third heat exchanger 245. Water (cool water) whose heat is taken away by third heat exchanger 245 is used for maintaining the engine at an appropriate temperature.

A diesel engine generator typically has a power generation efficiency of approximately 40%. In this case, exhaust gas of approximately 200° C. is discharged from the engine combustion chamber, and a percentage of exhaust heat is approximately 20%. Further, water (hot water) of approximately 85° C. is transmitted from the radiator, and a percentage of exhaust heat (radiator exhaust heat) is 30%. Remaining energy of approximately 10% is an unrecoverable unavoidable loss.

When an adsorbent of an adsorber is silica gel, a standard regeneration temperature of a single effect adsorption refrigerator is approximately 85° C. Further, a temperature of approximately 120° C. enables double effect.

From the above point, hot water of approximately 120° C. and vapor can be generated by heat of the high-temperature exhaust gas. Thus, as illustrated in FIG. 6, it is possible to effectively utilize both of a high-temperature first heat source and a low-temperature second heat source of a diesel engine generator.

Thus, hereinbelow, there will be described a comparison between a performance (cooling capacity) of refrigeration cogeneration system 200A and a performance of a single effect cogeneration system when refrigeration cogeneration system 200A of the present working example includes a diesel engine generator as an example.

The performance of refrigeration cogeneration system 200A is estimated as described below in the comparison with the performance of the single effect cogeneration system when a combustion heat amount of fuel (diesel oil) consumed in the diesel engine generator is, for example, 1000 kWh, and a COP of each of first adsorption refrigeration cycle 100A and second adsorption refrigeration cycle 100B is, for example, 0.6. Superiority of the performance of refrigeration cogeneration system 200A of the present working example can be easily understood from a result of the estimation described below.

<Single Effect Cogeneration System>

A power generation amount is 1000×40%=400 (kWh). A refrigeration output is 1000×30%×0.6=180 (kWh). An auxiliary power is 180×5%=9 (kWh). Thus, the cooling capacity of the system is estimated as 180 (kWh)−9 (kWh)=171 (kWh).

<Refrigeration Cogeneration System of Present Working Example>

A power generation amount is 1000×40%=400 (kWh). A refrigeration output of the first adsorption refrigeration cycle is 1000×20%×0.6=120 (kWh). A refrigeration output of the second adsorption refrigeration cycle is (1000×30%+120)×0.6=252 (kWh). A sum of the refrigeration outputs is 120+252=372 (kWh). An auxiliary power is 372×5%=19 (kWh). Thus, the cooling capacity of the system is estimated as 372 (kWh)−19 (kWh)=353 (kWh).

Accordingly, refrigeration cogeneration system (cooling system) 200A of the present working example is capable of effectively utilizing heat of a plurality of heat sources having different temperatures (in the present example, the engine and the radiator of the diesel engine generator).

Further, in refrigeration cogeneration system 200A of the present working example, second temperature detector 242 is capable of detecting the temperature of the third heating medium immediately before the third heating medium flows into third heat exchanger 245 after passing through first adsorber 101A or second adsorber 102A in first adsorption refrigeration cycle 100A. Thus, it is possible to determine, from the temperature of the third heating medium immediately before flowing into third heat exchanger 245, whether there is a loss in a power generation performance caused by a reduction in a thermal efficiency of the engine due to overcooling of the engine caused by water passing through the radiator after heat exchange in third heat exchanger 245. That is, there is a lower limit temperature that does not reduce the thermal efficiency of the engine in the operation of the engine. Thus, controller 700 is capable of controlling the operation of pump 127B based on the temperature detected by second temperature detector 242 so that a temperature of the engine does not fall below the lower limit temperature.

In this manner, controller 700 feedback-controls pump 127B based on the temperature detected by first temperature detector 241 and the temperature detected by second temperature detector 242 so as to prevent losses in a function of first adsorption refrigeration cycle 100A and a function of second adsorption refrigeration cycle 100B and to prevent overheating and overcooling of the engine in the diesel engine generator.

The dispositions of first temperature detector 241 and second temperature detector 242 described above are appropriately determined according to characteristics of heat supply devices and system requests, and not necessarily limited to the present example. Further, the temperatures of the heating mediums, the power generation efficiency, and the COPs of the refrigeration cycles described above are examples, and the present disclosure is not limited to the examples.

Refrigeration cogeneration system 200A of the present working example may be configured similarly to double effect adsorption refrigerator 200 of the second exemplary embodiment except the characteristics described above.

Third Exemplary Embodiment

Figure 7:
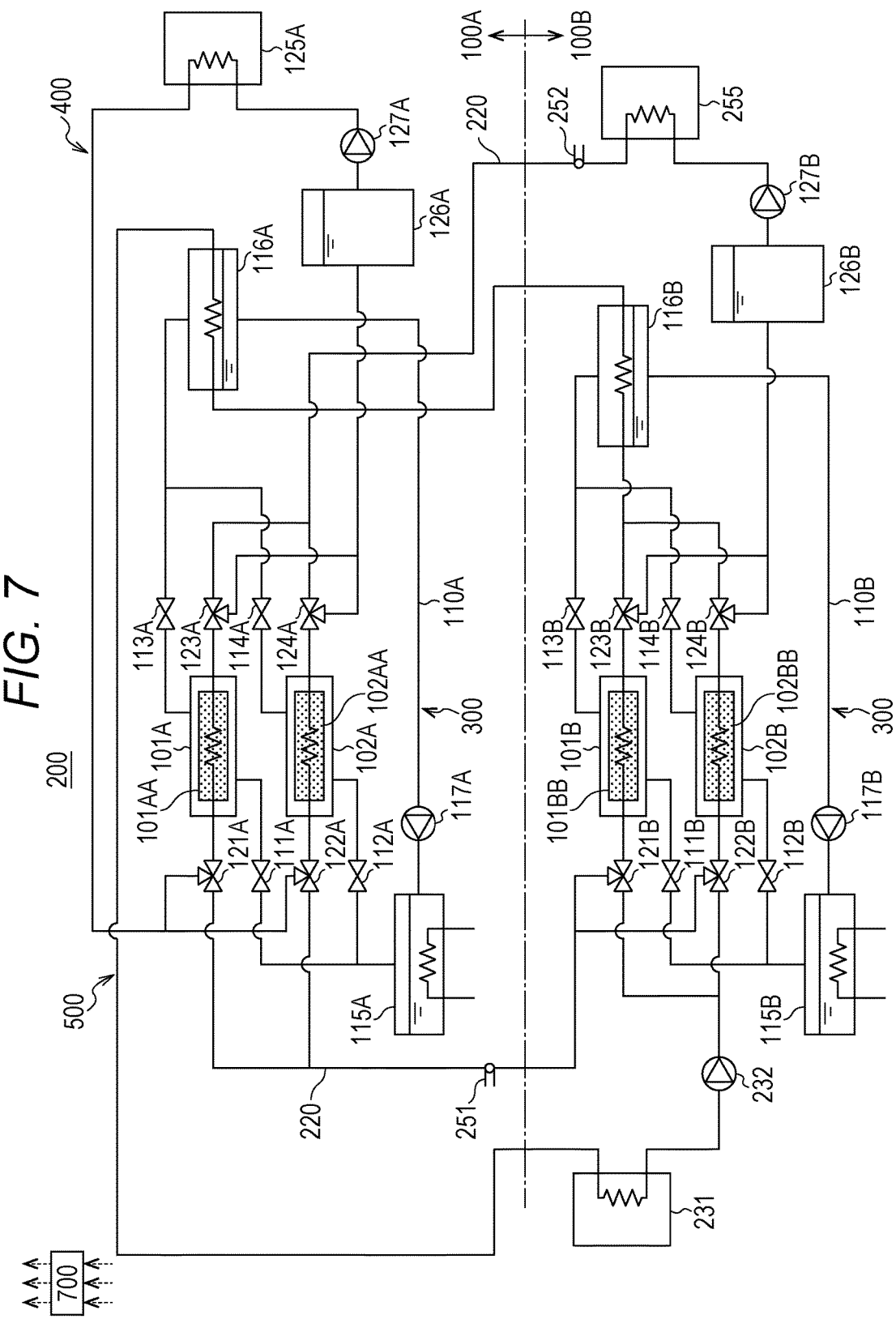
FIG. 7 is a diagram illustrating an example of a double effect adsorption refrigerator of a third exemplary embodiment.

FIG. 7 is a diagram illustrating an example of a double effect adsorption refrigerator of a third exemplary embodiment. Switching of an operation state of each of first adsorber 101A, second adsorber 102A, third adsorber 101B, and fourth adsorber 102B can be easily understood from the above description. Thus, all three-way valves and all two-way valves in FIG. 7 are indicated in white, and all paths are indicated by solid lines. Further, an arrow indicating a flow of a heating medium is omitted.

As described above, heat recovery path 220 of FIG. 7 functions as any of third circulation path 220A (FIG. 3A), sixth circulation path 220B (FIG. 3B), seventh circulation path 220C (FIG. 3C), and eighth circulation path 220D (FIG. 3D) by valve operations of three-way valves 121A, 122A, 123A, 124A, 121B, 122B, 123B, 124B.

As illustrated in FIG. 7, double effect adsorption refrigerator 200 of the present exemplary embodiment includes third temperature detector 251, fourth temperature detector 252, third heat exchanger 255 (e.g., a heat source heat exchanger), and controller 700. Other elements are similar to the elements of double effect adsorption refrigerator 200 of the first exemplary embodiment. Thus, description for the other elements may be omitted.

Third heat exchanger 255 is a heat exchanger capable of applying heat absorbed from a second heat source to a third heating medium and disposed between an inlet port of first adsorber 101A and an outlet port of fourth adsorber 102B on third circulation path 220A, between an inlet port of second adsorber 102A and an outlet port of third adsorber 101B on sixth circulation path 220B, between the inlet port of first adsorber 101A and the outlet port of third adsorber 101B on seventh circulation path 220C, or between the inlet port of second adsorber 102A and the outlet port of fourth adsorber 102B on eighth circulation path 220D. The third heating medium is heated by third heat exchanger 255 and further heated by heat that is generated when first adsorbent 101AA of first adsorber 101A or second adsorbent 102AA of second adsorber 102A adsorbs a first adsorbent refrigerant.

That is, in third heat exchanger 255, the third heating medium, after passing through third adsorber 101B or fourth adsorber 102B in second adsorption refrigeration cycle 100B and before flowing into first adsorber 101A or second adsorber 102A in first adsorption refrigeration cycle 100A, is used as a heat receiving fluid. Further, in third heat exchanger 255, heat is supplied from the second heat source at a low-temperature side of an external device. A concrete example of the second heat source will be described in a working example and a modification.

As described above, third heat exchanger 255 is a device that heats the third heating medium flowing through heat recovery path 220. Third heat exchanger 255 may have any configuration capable of heating the third heating medium flowing through heat recovery path 220. That is, third heat exchanger 255 is a device in which heat exchange is performed between objects. When the objects are fluids, a high-temperature object and a low-temperature object can be referred to as, but not limited to, a heat applying fluid and a heat receiving fluid, respectively. The objects may be, for example, solids, or may be combinations of a fluid and a solid.

Third temperature detector 251 is disposed between an outlet port of first adsorber 101A and an inlet port of fourth adsorber 102B on third circulation path 220A, between an outlet port of second adsorber 102A and an inlet port of third adsorber 101B on sixth circulation path 220B, between the outlet port of first adsorber 101A and the inlet port of third adsorber 101B on seventh circulation path 220C, or between the outlet port of second adsorber 102A and the inlet port of fourth adsorber 102B on eighth circulation path 220D.

That is, third temperature detector 251 is a detector that detects a temperature of the third heating medium immediately before the third heating medium flows into third adsorber 101B or fourth adsorber 102B where a regeneration process of second adsorption refrigeration cycle 100B is performed. Third temperature detector 251 may have any configuration capable of directly or indirectly detecting such a temperature of the third heating medium.

For example, third temperature detector 251 may be disposed within heat recovery path 220 to directly detect the temperature of the third heating medium, or third temperature detector 251 may be disposed at a predetermined location (e.g., a surface of a pipe that constitutes heat recovery path 220 or an area around the surface of the pipe) that is correlated with the temperature of the third heating medium to indirectly detect the temperature of the third heating medium. Examples of third temperature detector 251 include a thermocouple and a thermistor.

Fourth temperature detector 252 is disposed between an outlet port of third heat exchanger 255 and the inlet port of first adsorber 101A on each of third circulation path 220A and seventh circulation path 220C or between the outlet port of third heat exchanger 255 and the inlet port of second adsorber 102A on each of sixth circulation path 220B and eighth circulation path 220D.

That is, fourth temperature detector 252 is a detector that detects the temperature of the third heating medium immediately after the third heating medium flows out of third heat exchanger 255. Fourth temperature detector 252 may have any configuration capable of directly or indirectly detecting such a temperature of the third heating medium.

For example, fourth temperature detector 252 may be disposed within heat recovery path 220 to directly detect the temperature of the third heating medium, or fourth temperature detector 252 may be disposed at a predetermined location (e.g., a surface of a pipe that constitutes heat recovery path 220 or an area around the surface of the pipe) that is correlated with the temperature of the third heating medium to indirectly detect the temperature of the third heating medium. Examples of fourth temperature detector 252 include a thermocouple and a thermistor.

Double effect adsorption refrigerator 200 includes pump 127B for pressure-feeding the third heating medium. Pump 127B is disposed on third circulation path 220A, sixth circulation path 220B, seventh circulation path 220C, and eighth circulation path 220D.

Thus, controller 700 controls an operation of pump 127B based on the temperature of the third heating medium detected by third temperature detector 251. Further, controller 700 controls the operation of pump 127B based on the temperature of the third heating medium detected by fourth temperature detector 252.

Accordingly, double effect adsorption refrigerator 200 of the present exemplary embodiment is capable of effectively utilizing heat of a plurality of heat sources having different temperatures. Details of this effect are similar to the details of the effect of double effect adsorption refrigerator 200 in the second exemplary embodiment.

Further, in double effect adsorption refrigerator 200 of the present exemplary embodiment, adsorption heat of first adsorption refrigeration cycle 100A can be appropriately recovered by the third heating medium within heat recovery path 220.

For example, in double effect adsorption refrigerator 200 of the present exemplary embodiment, even when a temperature of the second heat source which supplies heat to third heat exchanger 255 is, for example, lower than a standard regeneration temperature of third adsorber 101B or fourth adsorber 102B, the temperature of the third heating medium can be configured to exceed the regeneration temperature of third adsorber 101B or fourth adsorber 102B by recovering adsorption heat of first adsorber 101A or second adsorber 102A by the third heating medium flowing through third circulation path 220A, sixth circulation path 220B, seventh circulation path 220C, or eighth circulation path 220D.

Further, there may be an upper limit temperature in an operation of the second heat source described above. In this case, if third heat exchanger 255 is disposed, for example, between the outlet port of first adsorber 101A and the inlet port of fourth adsorber 102B on third circulation path 220A, heat may not be sufficiently removed from the second heat source by heat exchange with the third heating medium after recovery of the adsorption heat of first adsorber 101A. Accordingly, the temperature of the second heat source may exceed the upper limit temperature. However, in double effect adsorption refrigerator 200 of the present exemplary embodiment, third heat exchanger 255 is disposed on the path described above. Thus, it is possible to reduce such a possibility.

Further, in double effect adsorption refrigerator 200 of the present exemplary embodiment, third temperature detector 251 is capable of detecting the temperature of the third heating medium immediately before the third heating medium flows into third adsorber 101B or fourth adsorber 102B in second adsorption refrigeration cycle 100B after passing through first adsorber 101A or second adsorber 102A and third heat exchanger 255 in first adsorption refrigeration cycle 100A. Thus, controller 700 is capable of controlling the operation of pump 127B based on the temperature detected by third temperature detector 251 so that the temperature of third adsorber 101B or fourth adsorber 102B in second adsorption refrigeration cycle 100B can be maintained at an appropriate temperature required for the regeneration process of second adsorption refrigeration cycle 100B.

Further, in double effect adsorption refrigerator 200 of the present exemplary embodiment, fourth temperature detector 252 is capable of detecting the temperature of the third heating medium immediately after the third heating medium passes through third heat exchanger 255. Thus, for example, when there is an upper limit temperature in the operation of the second heat source which supplies heat to third heat exchanger 255, controller 700 is capable of controlling the operation of pump 127B based on the temperature detected by fourth temperature detector 252 so that the temperature of the second heat source does not exceed the upper limit temperature.

Double effect adsorption refrigerator 200 of the present exemplary embodiment may be configured similarly to double effect adsorption refrigerator 200 of the first exemplary embodiment except characteristics described above.

Working Example

Figure 8:
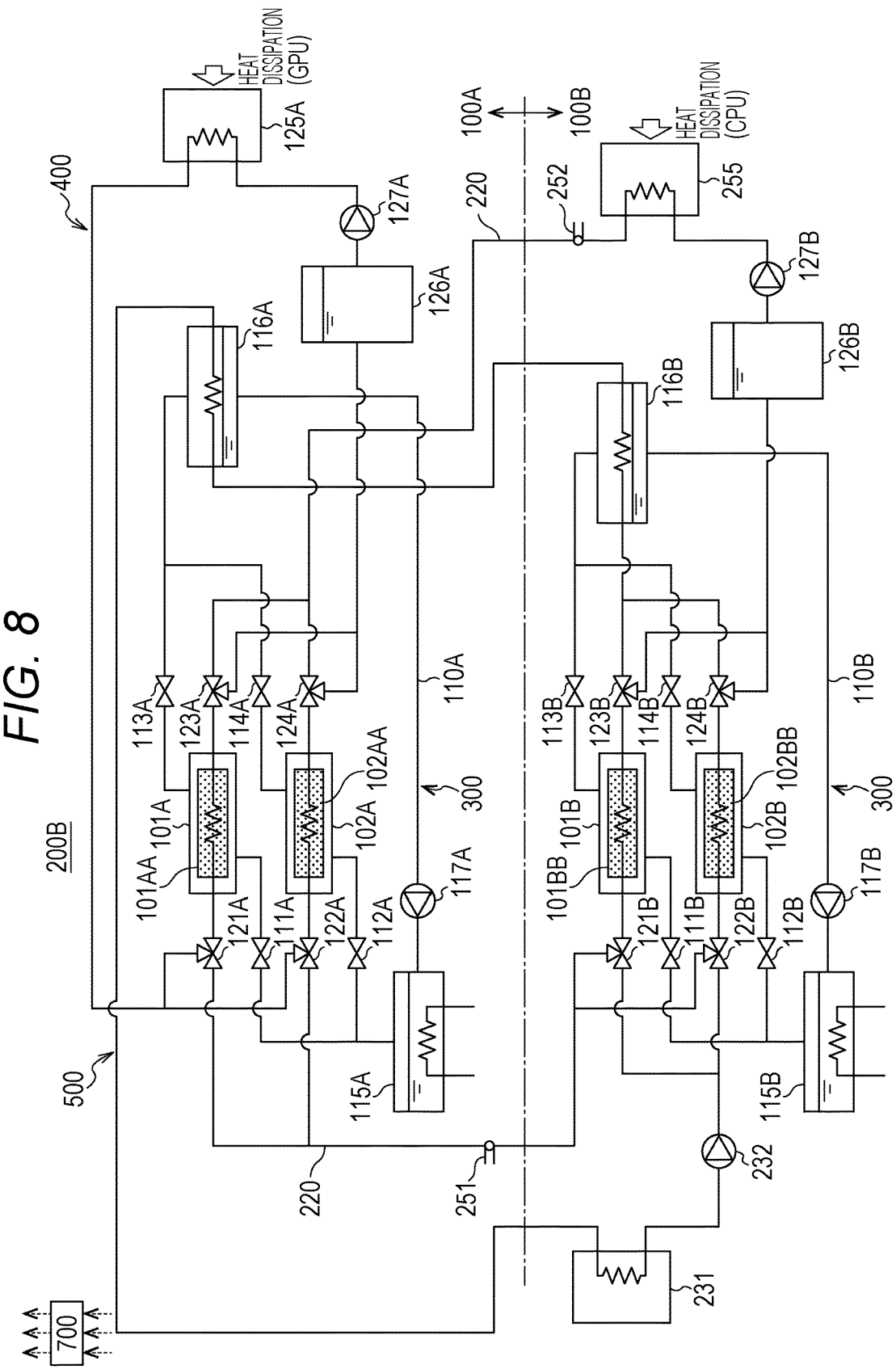
FIG. 8 is a diagram illustrating an example of a cooling system in a working example of the third exemplary embodiment.

FIG. 8 is a diagram illustrating an example of a cooling system in a working example of the third exemplary embodiment.

FIG. 8 illustrates cooling system 200B of, for example, a data center, which is a combination of a computer (server) and double effect adsorption refrigerator 200 of FIG. 7. A configuration of the computer (server) is known. Thus, detailed description and illustration for the computer will be omitted.

In recent years, water cooling of an electronic device, such as a central processing unit (CPU) or a graphic processing unit (GPU), has become widespread in a computer (or a server with integrated computers or a data center) because of the following background. That is, further progress has been made in achieving higher speed and more integration of electronic devices in response to improvements in an information processing capacity requested to a server or a data center in every year. As a result, a heat generation amount in electronic devices increases, and water cooling thus becomes essential in electronic devices.

For example, a power consumption of a high-performance CPU is currently approximately 160 W in maximum, and an allowable temperature of the high-performance CPU is in a range from approximately 60° C. to approximately 70° C. A power consumption of a GPU is approximately 350 W in maximum, and an allowable temperature of the GPU is in a range from approximately 90° C. to approximately 100° C. Thus, when both of the electronic devices are mounted on one unit (U) of a server, a heat generation amount of the server exceeds approximately 500 W in maximum. Accordingly, in a server rack that includes integrated 40 U of servers, a heat generation amount is approximately 20 kW or more in maximum. It is needless to say that an operation of, for example, a data center cannot be performed without continuously removing heat generated in the servers. Thus, it is urgent to develop a server cooling technique.

As described in NPL 1, zeolite adsorbents which have been put on market in recent years exhibit better adsorption and desorption characteristics than silica gel in a lower temperature range and a narrower relative water vapor pressure range than silica gel. As an example, a regeneration temperature of an adsorbent "AQSOR (registered trademark)-Z02" which is put on market by Mitsubishi Plastics, Inc. is approximately 85° C. Further, a regeneration temperature of an adsorbent "AQSOR (registered trademark)-Z05" which is also put on market by Mitsubishi Plastics, Inc. is approximately 60° C. in minimum, and preferably approximately 65° C. or more.

Thus, in a course of development of the server cooling technique, the inventor of the present invention has conceived an idea that the adsorbent "AQSOR (registered trademark)-Z02" is used in first adsorption refrigeration cycle 100A, and the adsorbent "AQSOR (registered trademark)-Z05" is used in second adsorption refrigeration cycle 100B.

In the example illustrated in FIG. 8, heat released from the GPU is recovered in first heat exchanger 125A by the first heating medium flowing through thermal system 400. Further, heat released from the CPU is recovered in third heat exchanger 255 by the third heating medium flowing through heat recovery path 220 before the third heating medium flows into first adsorber 101A or second adsorber 102A in first adsorption refrigeration cycle 100A after passing through third adsorber 101B or fourth adsorber 102B in second adsorption refrigeration cycle 100B. Accordingly, it is possible to achieve a high-efficiency server cooling technique that is capable of appropriately performing heat protection for the GPU and the CPU and effectively utilizing heat released from the GPU and the CPU. Thus, in this case, cooling system 200B includes the GPU which supplies heat to the first heating medium flowing through thermal system 400 in first heat exchanger 125A. Further, cooling system 200B includes the CPU which supplies heat to the third heating medium flowing through heat recovery path 220 before the third heating medium flows into first adsorber 101A or second adsorber 102A in first adsorption refrigeration cycle 100A after passing through third adsorber 101B or fourth adsorber 102B in second adsorption refrigeration cycle 100B in third heat exchanger 255.

A computer cooling technique by a single effect adsorption refrigerator is already known (e.g., Unexamined Japanese Patent Publication No. 2010-2084). Thus, hereinbelow, there will be described a comparison between a performance (cooling capacity) of cooling system 200B and a performance of a cooling system by a single effect adsorption refrigerator when cooling system 200B of the present working example includes a data center as an example.

The performance of cooling system 200B is estimated as described below in the comparison with the performance of the cooling system by the single effect adsorption refrigerator when a COP of each of first adsorption refrigeration cycle 100A and second adsorption refrigeration cycle 100B is, for example, 0.6 when the adsorbent "AQSOR (registered trademark)-Z02" and the adsorbent "AQSOR (registered trademark)-Z05" are used assuming that four hundred servers (40 U per rack×10 racks) are integrated in the data center. Superiority of the performance of cooling system 200B of the present working example can be easily understood from a result of the estimation described below.

<Cooling System by Single Effect Adsorption Refrigerator>

A heat dissipation of a CPU is 160 W×400=64000 W=64 kW. A heat dissipation of a GPU is 350 W×400=140000 W=140 kW. A sum of heat dissipations is (64+140)=204 kW. The cooling capacity is (64+140)×0.6=122.4 kW.

<Cooling System of Present Working Example>

A heat dissipation of the CPU is 160 W×400=64000 W=64 kW. A heat dissipation of the GPU is 350 W×400=140000 W=140 kW. A sum of heat dissipations is (64+140)=204 kW. A cooling capacity of the first adsorption refrigeration cycle is 140×0.6=84 kW. A cooling capacity of the second adsorption refrigeration cycle is (84+64)×0.6=88.8 (kW). A sum of the cooling capacities is 84+88.8=172.8 (kW).

As described above, the cooling capacity of cooling system 200B of the present working example is improved by approximately 40% as compared to the cooling system by the single effect adsorption refrigerator.

The cooling capacity described above indicates a capacity that can be supplied to outside by the cooling system based on a premise that the CPU and the GPU are used as heart sources of the adsorption refrigerator and heat released from the CPU and heat released from the GPU are consumed and removed. For example, the cooing capacity indicates a capacity that can be used for cooling other server elements such as a power source and an uninterruptible power supply (UPS) or for cooling a data center building.

Accordingly, cooling system 200B of the present working example is capable of effectively utilizing heat of a plurality of heat sources having different temperatures (in the present example, the GPU and the CPU).

Further, in cooling system 200B of the present working example, fourth temperature detector 252 is capable of detecting the temperature of the third heating medium immediately after the third heating medium passes through third heat exchanger 255. Thus, it is possible to determine, from the temperature of the third heating medium immediately after passing through third heat exchanger 255, in third heat exchanger 255, whether heat can be sufficiently removed from the CPU by heat exchange with the heating medium flowing through heat recovery path 220. That is, in the CPU, there is an upper limit temperature (an upper limit value of the allowable temperature) that does not cause an operation failure and breakdown of the CPU. Thus, controller 700 is capable of controlling the operation of pump 127B based on the temperature detected by fourth temperature detector 252 so that the temperature of the CPU does not exceed the upper limit temperature.

It can be easily understood, from a configuration of heat recovery path 220 of cooling system 220B in the present working example, that the temperature of the third heating medium immediately after recovery of heat released from the CPU (the temperature detected by fourth temperature detector 252) is lower than the temperature of the third heating medium immediately after recovery of adsorption heat from first adsorption refrigeration cycle 100A (the temperature detected by third temperature detector 251). Thus, for example, when the temperature detected by third temperature detector 251 is lower than the upper limit value of the allowable temperature of the CPU (e.g., approximately 65° C.), the temperature detected by fourth temperature detector 252 automatically becomes 65° C. or less. Thus, controller 700 may also control the operation of pump 127B based on the temperature detected by third temperature detector 251 so that the temperature of the CPU does not exceed the upper limit value of the allowable temperature of the CPU. However, commonly, a load to the CPU may change in a moment (e.g., an idle state is changed to a maximum load within one second in common). In this case, the temperature detected by third temperature detector 251 may be temporally delayed with respect to a temperature change in the CPU. Thus, when the operation of pump 127B is controlled based on the temperature detected by third temperature detector 251, it may be impossible to follow a rapid temperature rise in the CPU with a momentary load change in the CPU. Therefore, it is preferred to protect the CPU from heat so as to prevent overheating of the CPU based on comprehensive information including the temperature detected by third temperature detector 251 and the temperature detected by fourth temperature detector 252.

In this manner, controller 700 feedback-controls pump 127B based on the temperature detected by third temperature detector 251 and the temperature detected by fourth temperature detector 252 so as to prevent losses in a function of first adsorption refrigeration cycle 100A and a function of second adsorption refrigeration cycle 100B and to prevent overheating of the CPU.

Further, controller 700 also feedback-controls pump 127A based on temperatures detected by temperature detectors (not illustrated) so as to prevent overheating of the GPU in a manner similar to the control for the CPU. Details of the feedback control can be easily understood from the above description. Thus, description for the feedback control will be omitted.

The dispositions of third temperature detector 251 and fourth temperature detector 252 described above are appropriately determined according to characteristics of heat supply devices and system requests, and not necessarily limited to the present example. Further, the temperatures of the heating mediums, the power generation efficiency, and the COPs of the refrigeration cycles described above are examples, and the present disclosure is not limited to the examples.

Cooling system 200B of the present working example may be configured similarly to double effect adsorption refrigerator 200 of the third exemplary embodiment except the characteristics described above.

Modification

Figure 9:
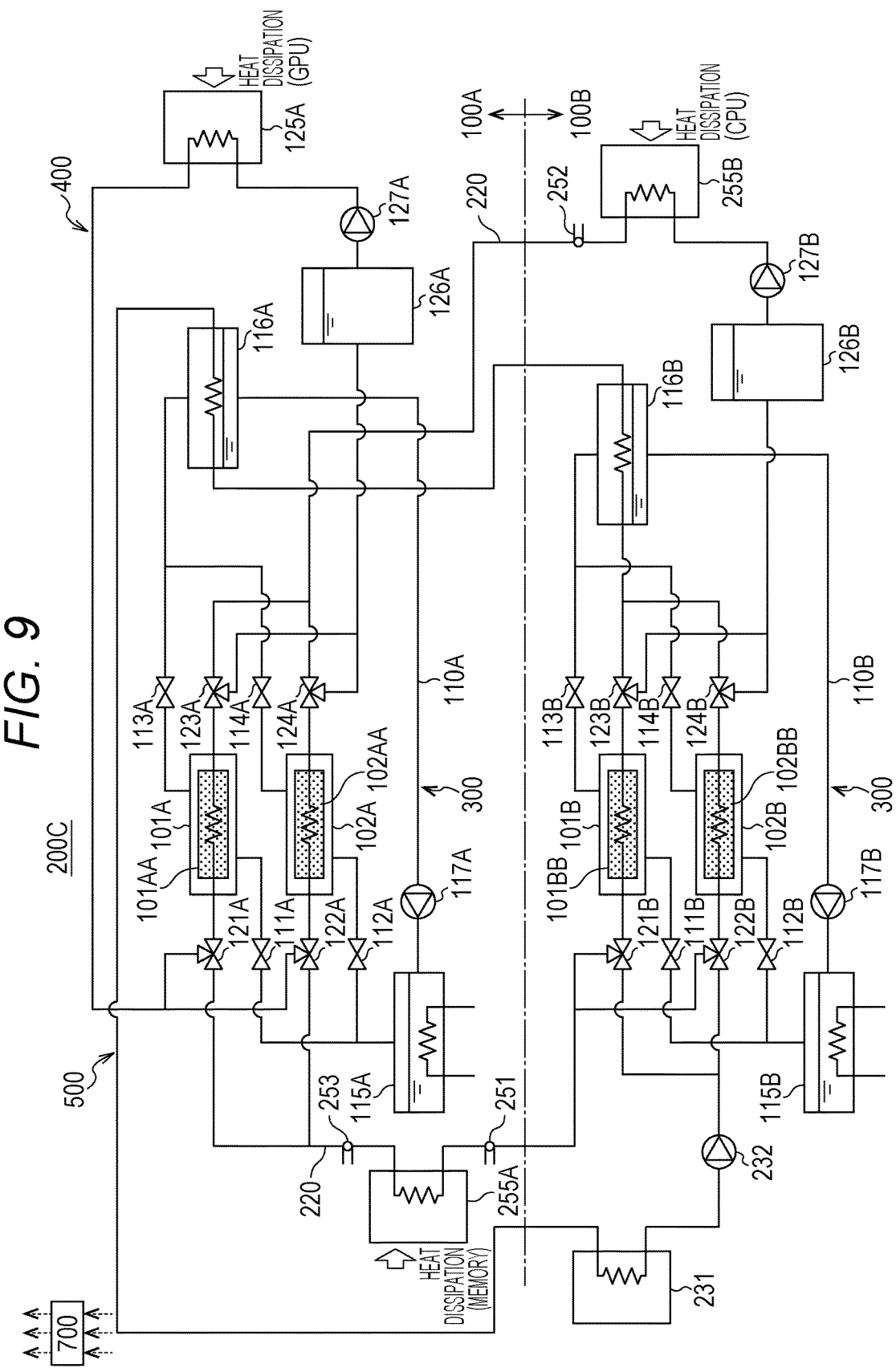
FIG. 9 is a diagram illustrating an example of the cooling system in a modification of the third exemplary embodiment.

FIG. 9 is a diagram illustrating an example of a cooling system in a modification of the third exemplary embodiment.

FIG. 9 illustrates cooling system 200C of, for example, a data center, which is a combination of a computer (server) and double effect adsorption refrigerator 200 of FIG. 7 similar to the working example of the third exemplary embodiment (FIG. 8). A configuration of the computer (server) is known. Thus, detailed description and illustration for the computer are omitted.

Cooling system 200C of FIG. 9 further includes a memory (e.g., a dynamic random-access memory (DRAM)) as a heat source in addition to the CPU and the GPU.

Typically, a heat generation amount of the DRAM is approximately one-third of the heat generation amount of the CPU. Further, an allowable temperature of the DRAM is in a range from approximately 85° C. to approximately 90° C.

Thus, as illustrated in FIG. 9, heat released from the CPU which has a lower allowable temperature than the memory is recovered in third heat exchanger 255B by the third heating medium flowing through heat recovery path 220 before the third heating medium flows into first adsorber 101A or second adsorber 102A in first adsorption refrigeration cycle 100A after passing through third adsorber 101B or fourth adsorber 102B in second adsorption refrigeration cycle 100B. Further, heat released from the memory which has a higher allowable temperature is recovered in third heat exchanger 255A by the third heating medium flowin through heat recovery path 220 before the third heating medium flows into third adsorber 101B or fourth adsorber 102B in second adsorption refrigeration cycle 100B after passing through first adsorber 101A or second adsorber 102A in first adsorption refrigeration cycle 100A.

Accordingly, it is possible to achieve a high-efficiency server cooling technique that is capable of appropriately performing heat protection for the CPU and the memory and effectively utilizing heat released from the CPU and the memory. Thus, in this case, cooling system 200C includes the GPU which supplies heat to the first heating medium flowing through thermal system 400 in first heat exchanger 125A. Further, cooling system 200C includes the CPU which supplies heat to the third heating medium flowing through heat recovery path 220 before the third heating medium flows into first adsorber 101A or second adsorber 102A in first adsorption refrigeration cycle 100A after passing through third adsorber 101B or fourth adsorber 102B in second adsorption refrigeration cycle 100B in third heat exchanger 255B. Further, cooling system 200C includes the memory which supplies heat to the third heating medium flowing through heat recovery path 220 before the third heating medium flows into third adsorber 101B or fourth adsorber 102B in second adsorption refrigeration cycle 100B after passing through first adsorber 101A or second adsorber 102A in first adsorption refrigeration cycle 100A in third heat exchanger 255A.

In cooling system 200C of the present modification, temperature detector 253 is disposed between third heat exchanger 255A and first adsorber 101A or second adsorber 102A in first adsorption refrigeration cycle 100A on heat recovery path 220 in addition to third temperature detector 251 and fourth temperature detector 252 of FIG. 8. Temperature detector 253 is capable of detecting the temperature of the third heating medium immediately before the third heating medium flows into third heat exchanger 255A after passing through first adsorber 101A or second adsorber 102A in first adsorption refrigeration cycle 100A. Thus, controller 700 is capable of controlling the operation of pump 127B based on the temperature detected by temperature detector 253 so that the temperature of the memory does not exceed an upper limit temperature (an upper limit value of the allowable temperature).

In this manner, controller 700 feedback-controls pump 127B based on the temperature detected by third temperature detector 251 and the temperature detected by temperature detector 253 so as to prevent losses in the function of first adsorption refrigeration cycle 100A and the function of second adsorption refrigeration cycle 100B and to prevent overheating of the CPU and the memory.

The dispositions of third temperature detector 251, fourth temperature detector 252, and temperature detector 253 are appropriately determined according to characteristics of heat supply devices and system requests and not necessarily limited to the present example.

Further, cooling system 200C of the present modification may be configured similarly to cooling system 200B in the working example of the third exemplary embodiment except the characteristics described above.

The first exemplary embodiment, the second exemplary embodiment, the working example of the second exemplary embodiment, the third exemplary embodiment, the working example of the third exemplary embodiment, and the modification of the third exemplary embodiment may be combined with each other unless the combined ones are mutually exclusive.

Double effect adsorption refrigerator 200 has been described above. However, also in a multiple effect adsorption refrigerator of three or more effects having more stages than the stages of double effect adsorption refrigerator 200, adsorption heat of an adsorber at an upper stage (a side having a higher operation temperature) can be used in an adsorber at a lower stage (a side having a lower operation temperature) in a manner similar to the above manner.

As described above, many improvements and other exemplary embodiments are obvious to those skilled in the art from the above description. Thus, the above description should be interpreted only as examples and provided for the purpose of teaching the best mode for carrying out the present disclosure to those skilled in the art. The operation condition, composition, structure and/or function of the present disclosure can be substantially changed without departing from the scope of the present disclosure.

One aspect of the present disclosure can be used in an adsorption refrigerator provided with specific elements for double effect by an adsorption heat recovery system.

REFERENTIAL SIGNS LIST

100: single effect adsorption refrigerator
100A: first adsorption refrigeration cycle
100B: second adsorption refrigeration cycle
101: adsorber
101A: first adsorber
101AA: first adsorbent
101AG: third connection port
101AH: fourth connection port
101AI: first connection port
101AO: second connection port
101B: third adsorber
101BB: third adsorbent
101BG: third connection port
101BH: fourth connection port
101BI: first connection port
101BO: second connection port
102: adsorber
102A: second adsorber
102AA: second adsorbent
102AG: third connection port
102AH: fourth connection port
102AI: first connection port
102AO: second connection port
102B: fourth adsorber
102BB: fourth adsorbent
102BG: third connection port
102BH: fourth connection port
102BI: first connection port
102BO: second connection port
110: water path
110A: water path
110B: water path
111: two-way valve
111A: two-way valve
111B: two-way valve
112: two-way valve
112A: two-way valve
112B: two-way valve
113: two-way valve
113A: two-way valve
113B: two-way valve
114: two-way valve
114A: two-way valve
114B: two-way valve
115: evaporator
115A: first evaporator
115AI: first connection port
115AO: second connection port
115B: second evaporator
115BI: first connection port
115BO: second connection port
116: condenser
116A: first condenser
116AG: third connection port
116AH: fourth connection port
116AI: first connection port
116AO: second connection port
116B: second condenser
116BG: third connection port
116BH: fourth connection port
116BI: first connection port
116BO: second connection port
117: pump
117A: pump
120: circulation path
120AA: first circulation path
120AB: fourth circulation path
121: three-way valve
121A: three-way valve
121B: three-way valve 122: three-way valve
122A: three-way valve
122B: three-way valve
123: three-way valve
123A: three-way valve
123B: three-way valve
124: three-way valve
124A: three-way valve
124B: three-way valve
125: heat source heat exchanger
125A: first heat exchanger
125AI: inlet port
125AO: discharge port
126: buffer tank
126A: buffer tank
126B: buffer tank
127: pump
127A: pump
127B: pump
130: circulation path
131: heat exchanger
132: pump
200: double effect adsorption refrigerator
200A: refrigeration cogeneration system
200B: cooling system
200C: cooling system
220: heat recovery path
220A: third circulation path
220B: sixth circulation path
220C: seventh circulation path
220D: eighth circulation path
221: seventh pipe
222: eighth pipe
230A: second circulation path
230B: fifth circulation path
231: second heat exchanger
231I: inlet port
231O: discharge port
232: pump
241: first temperature detector
242: second temperature detector
245: third heat exchanger
251: third temperature detector
252: fourth temperature detector
253: temperature detector
255: third heat exchanger
255A: third heat exchanger
255B: third heat exchanger
300: refrigerant system
400: thermal system
401: first pipe
402: second pipe
500: cooling water system
501: third pipe
502: fourth pipe
503: fifth pipe
504: sixth pipe
601: ninth pipe
602: tenth pipe
603: eleventh pipe
604: twelfth pipe
700: controller
800A: first object
800B: first object
801: thirteenth pipe
802: fourteenth pipe

What is claimed is:

1. An adsorption refrigerator comprising:
a first adsorber containing a first adsorbent capable of adsorbing and desorbing a first adsorbent refrigerant;
a second adsorber containing a second adsorbent capable of adsorbing and desorbing the first adsorbent refrigerant;
a first evaporator capable of evaporating the first adsorbent refrigerant under reduced pressure to cool a first working fluid;
a first condenser capable of condensing the first adsorbent refrigerant in gaseous state;
a third adsorber containing a third adsorbent capable of adsorbing and desorbing a second adsorbent refrigerant;
a fourth adsorber containing a fourth adsorbent capable of adsorbing and desorbing the second adsorbent refrigerant;
a second evaporator capable of evaporating the second adsorbent refrigerant under reduced pressure to cool a second working fluid;
a second condenser capable of condensing the second adsorbent refrigerant in gaseous state;
a first heat exchanger capable of applying heat absorbed from a first heat source to a first heating medium;
a second heat exchanger capable of removing and releasing heat from a second heating medium; and
a controller that performs control for switching to any of a first state, a second state, a third state, and a fourth state,
wherein
in the first state,
the first evaporator is connected to the first adsorber,
the second evaporator is connected to the third adsorber,
the controller connects an inlet port of the second adsorber to an outlet port of the first heat exchanger and connects an outlet port of the second adsorber to an inlet port of the first heat exchanger to form a first circulation path,
the first heating medium which has flown out of the outlet port of the first heat exchanger flows into the inlet port of the second adsorber,
the first adsorbent refrigerant adsorbed by the second adsorbent is desorbed by heat of the first heating medium heated by the first heat exchanger in the second adsorber,
the first heating medium which has flown out of the outlet port of the second adsorber flows into the inlet port of the first heat exchanger,
the controller connects an inlet port of the third adsorber to an outlet port of the second heat exchanger, connects an outlet port of the third adsorber to an inlet port of the second condenser, connects an outlet port of the second condenser to an inlet port of the first condenser, and connects an outlet port of the first condenser to an inlet port of the second heat exchanger to form a second circulation path,
the second heating medium which has flown out of the outlet port of the second heat exchanger flows into the inlet port of the third adsorber,
the second adsorbent refrigerant evaporated by the second evaporator is adsorbed by the third adsorbent in the third adsorber to heat the second heating medium,
the second heating medium which has flown out of the outlet port of the third adsorber flows into the inlet port of the second condenser, the second heating medium which has flown out of the outlet port of the second condenser flows into the inlet port of the first condenser, the second heating medium which has flown out of the outlet port of the first condenser flows into the inlet port of the second heat exchanger, the controller connects an outlet port of the first adsorber to an inlet port of the fourth adsorber and connects an inlet port of the first adsorber to an outlet port of the fourth adsorber to form a third circulation path, the first adsorbent refrigerant evaporated by the first evaporator is adsorbed by the first adsorbent in the first adsorber to heat a third heating medium, the third heating medium which has flown out of the outlet port of the first adsorber flows into the inlet port of the fourth adsorber, the second adsorbent refrigerant adsorbed by the fourth adsorbent is desorbed by heat of the heated third heating medium in the fourth adsorber, and the third heating medium which has flown out of the outlet port of the fourth adsorber flows into the inlet port of the first adsorber;

in the second state, the first evaporator is connected to the second adsorber, the second evaporator is connected to the fourth adsorber, the controller connects the inlet port of the first adsorber to the outlet port of the first heat exchanger and connects the outlet port of the first adsorber to the inlet port of the first heat exchanger to form a fourth circulation path, the first heating medium which has flown out of the outlet port of the first heat exchanger flows into the inlet port of the first adsorber, the first adsorbent refrigerant adsorbed by the first adsorbent is desorbed by heat of the first heating medium heated by the first heat exchanger in the first adsorber, the first heating medium which has flown out of the outlet port of the first adsorber flows into the inlet port of the first heat exchanger, the controller connects the inlet port of the fourth adsorber to the outlet port of the second heat exchanger, connects the outlet port of the fourth adsorber to the inlet port of the second condenser, connects the outlet port of the second condenser to the inlet port of the first condenser, and connects the outlet port of the first condenser to the inlet port of the second heat exchanger to form a fifth circulation path, the second heating medium which has flown out of the outlet port of the second heat exchanger flows into the inlet port of the fourth adsorber, the second adsorbent refrigerant evaporated by the second evaporator is adsorbed by the fourth adsorbent in the fourth adsorber to heat the second heating medium, the second heating medium which has flown out of the outlet port of the fourth adsorber flows into the inlet port of the second condenser, the second heating medium which has flown out of the outlet port of the second condenser flows into the inlet port of the first condenser, the second heating medium which has flown out of the outlet port of the first condenser flows into the inlet port of the second heat exchanger, the controller connects the outlet port of the second adsorber to the inlet port of the third adsorber and connects the inlet port of the second adsorber to the outlet port of the third adsorber to form a sixth circulation path, the first adsorbent refrigerant evaporated by the first evaporator is adsorbed by the second adsorbent in the second adsorber to heat the third heating medium, the third heating medium which has flown out of the outlet port of the second adsorber flows into the inlet port of the third adsorber, the second adsorbent refrigerant adsorbed by the third adsorbent is desorbed by heat of the heated third heating medium in the third adsorber, and the third heating medium which has flown out of the outlet port of the third adsorber flows into the inlet port of the second adsorber;

in the third state, the first evaporator is connected to the first adsorber, the second evaporator is connected to the fourth adsorber, the controller connects the inlet port of the second adsorber to the outlet port of the first heat exchanger and connects the outlet port of the second adsorber to the inlet port of the first heat exchanger to form the first circulation path, the first adsorbent refrigerant adsorbed by the second adsorbent is desorbed by heat of the first heating medium heated by the first heat exchanger in the second adsorber, the first heating medium which has flown out of the outlet port of the first heat exchanger flows into the inlet port of the second adsorber, the first heating medium which has flown out of the outlet port of the second adsorber flows into the inlet port of the first heat exchanger, the controller connects the inlet port of the fourth adsorber to the outlet port of the second heat exchanger, connects the outlet port of the fourth adsorber to the inlet port of the second condenser, connects the outlet port of the second condenser to the inlet port of the first condenser, and connects the outlet port of the first condenser to the inlet port of the second heat exchanger to form the fifth circulation path, the second heating medium which has flown out of the outlet port of the second heat exchanger flows into the inlet port of the fourth adsorber, the second adsorbent refrigerant evaporated by the second evaporator is adsorbed by the fourth adsorbent in the fourth adsorber to heat the second heating medium, the second heating medium which has flown out of the outlet port of the fourth adsorber flows into the inlet port of the second condenser, the second heating medium which has flown out of the outlet port of the second condenser flows into the inlet port of the first condenser, the second heating medium which has flown out of the outlet port of the first condenser flows into the inlet port of the second heat exchanger, the controller connects the outlet port of the first adsorber to the inlet port of the third adsorber and connects the inlet port of the first adsorber to the outlet port of the third adsorber to form a seventh circulation path, the first adsorbent refrigerant evaporated by the first evaporator is adsorbed by the first adsorbent in the first adsorber to heat the third heating medium, the third heating medium which has flown out of the outlet port of the first adsorber flows into the inlet port of the third adsorber, the second adsorbent refrigerant adsorbed by the third adsorbent is desorbed by heat of the third heating medium in the third adsorber, and the third heating medium which has flown out of the outlet port of the third adsorber flows into the inlet port of the first adsorber; and in the fourth state, the first evaporator is connected to the second adsorber, the second evaporator is connected to the third adsorber, the controller connects the inlet port of the first adsorber to the outlet port of the first heat exchanger and connects the outlet port of the first adsorber to the inlet port of the first heat exchanger to form the fourth circulation path, the first heating medium which has flown out of the outlet port of the first heat exchanger flows into the inlet port of the first adsorber, the first adsorbent refrigerant adsorbed by the first adsorbent is desorbed by heat of the first heating medium heated by the first heat exchanger in the first adsorber, the first heating medium which has flown out of the outlet port of the first adsorber flows into the inlet port of the first heat exchanger, the controller connects the inlet port of the third adsorber to the outlet port of the second heat exchanger, connects the outlet port of the third adsorber to the inlet port of the second condenser, connects the outlet port of the second condenser to the inlet port of the first condenser, and connects the outlet port of the first condenser to the inlet port of the second heat exchanger to form the second circulation path, the second heating medium which has flown out of the outlet port of the second heat exchanger flows into the inlet port of the third adsorber, the second adsorbent refrigerant evaporated by the second evaporator is adsorbed by the third adsorbent in the third adsorber to heat the second heating medium, the second heating medium which has flown out of the outlet port of the third adsorber flows into the inlet port of the second condenser, the second heating medium which has flown out of the outlet port of the second condenser flows into the inlet port of the first condenser, the second heating medium which has flown out of the outlet port of the first condenser flows into the inlet port of the second heat exchanger, the controller connects the outlet port of the second adsorber to the inlet port of the fourth adsorber and connects the inlet port of the second adsorber to the outlet port of the fourth adsorber to form an eighth circulation path, the first adsorbent refrigerant evaporated by the first evaporator is adsorbed by the second adsorbent in the second adsorber to heat the third heating medium, the third heating medium which has flown out of the outlet port of the second adsorber flows into the inlet port of the fourth adsorber, the second adsorbent refrigerant adsorbed by the fourth adsorbent is desorbed by heat of the third heating medium in the fourth adsorber, and the third heating medium which has flown out of the outlet port of the fourth adsorber flows into the inlet port of the second adsorber.

2. The adsorption refrigerator according to claim 1, further comprising:

a buffer tank disposed between the inlet port of the first adsorber and the outlet port of the fourth adsorber on the third circulation path, between the inlet port of the second adsorber and the outlet port of the third adsorber on the sixth circulation path, between the inlet port of the first adsorber and the outlet port of the third adsorber on the seventh circulation path, or between the inlet port of the second adsorber and the outlet port of the fourth adsorber on the eighth circulation path.

3. The adsorption refrigerator according to claim 1, further comprising:

a third heat exchanger capable of applying heat absorbed from a second heat source to the third heating medium, wherein the third heat exchanger is disposed between the outlet port of the first adsorber and the inlet port of the fourth adsorber on the third circulation path, between the outlet port of the second adsorber and the inlet port of the third adsorber on the sixth circulation path, between the outlet port of the first adsorber and the inlet port of the third adsorber on the seventh circulation path, or between the outlet port of the second adsorber and the inlet port of the fourth adsorber on the eighth circulation path, and the third heating medium is heated by the third heat exchanger, and the second adsorbent refrigerant adsorbed by the third adsorbent or the fourth adsorbent is desorbed by heat of the third heating medium heated by the third heat exchanger.

4. The adsorption refrigerator according to claim 3, further comprising:

a pump capable of pumping the third heating medium, the pump being disposed on the third circulation path, the sixth circulation path, the seventh circulation path, and the eighth circulation path; and a temperature detector disposed between an outlet port of the third heat exchanger and the inlet port of the third adsorber on each of the sixth circulation path and the seventh circulation path or between the outlet port of the third heat exchanger and the inlet port of the fourth adsorber on each of the third circulation path and the eighth circulation path, wherein the controller controls an operation of the pump based on a temperature of the third heating medium detected by the temperature detector.

5. The adsorption refrigerator according to claim 3, further comprising:

a pump capable of pumping the third heating medium, the pump being disposed on the third circulation path, the sixth circulation path, the seventh circulation path, and the eighth circulation path; and a temperature detector disposed between an inlet port of the third heat exchanger and the outlet port of the first adsorber or between the inlet port of the third heat exchanger and the outlet port of the second adsorber on the third circulation path, the sixth circulation path, the seventh circulation path, and the eighth circulation path, wherein the controller controls an operation of the pump based on a temperature of the third heating medium detected by the temperature detector.

6. The adsorption refrigerator according to claim 1, further comprising:

a third heat exchanger capable of applying heat absorbed from a second heat source to the third heating medium, wherein the third heat exchanger is disposed between the inlet port of the first adsorber and the outlet port of the fourth adsorber on the third circulation path, between the inlet port of the second adsorber and the outlet port of the third adsorber on the sixth circulation path, between the inlet port of the first adsorber and the outlet port of the third adsorber on the seventh circulation path, or between the inlet port of the second adsorber and the outlet port of the fourth adsorber on the eighth circulation path, and the third heating medium is heated by the third heat exchanger and further heated by heat generated when the first adsorbent or the second adsorbent adsorbs the first adsorbent refrigerant.

7. The adsorption refrigerator according to claim 6, further comprising:

a pump capable of pumping the third heating medium, the pump being disposed on the third circulation path, the sixth circulation path, the seventh circulation path, and the eighth circulation path; and a temperature detector disposed between the outlet port of the first adsorber and the inlet port of the fourth adsorber on the third circulation path, between the outlet port of the second adsorber and the inlet port of the third adsorber on the sixth circulation path, between the outlet port of the first adsorber and the inlet port of the third adsorber on the seventh circulation path, or between the outlet port of the second adsorber and the inlet port of the fourth adsorber on the eighth circulation path, wherein the controller controls an operation of the pump based on a temperature of the third heating medium detected by the temperature detector.

8. The adsorption refrigerator according to claim 6, further comprising:

a pump capable of pumping the third heating medium, the pump being disposed on the third circulation path, the sixth circulation path, the seventh circulation path, and the eighth circulation path; and a temperature detector disposed between an outlet port of the third heat exchanger and the inlet port of the first adsorber on each of the third circulation path and the seventh circulation path or between the outlet port of the third heat exchanger and the inlet port of the second adsorber on each of the sixth circulation path and the eighth circulation path, wherein the controller controls an operation of the pump based on a temperature of the third heating medium detected by the temperature detector.

9. The adsorption refrigerator according to claim 1, wherein a first object is cooled by the first working fluid, and
a second object is cooled by the second working fluid.

10. A method for controlling an adsorption refrigerator, the method comprising:

(a) preparing the adsorption refrigerator comprising:

a first adsorber containing a first adsorbent capable of adsorbing and desorbing a first adsorbent refrigerant;

a second adsorber containing a second adsorbent capable of adsorbing and desorbing the first adsorbent refrigerant;

a first evaporator capable of evaporating the first adsorbent refrigerant under reduced pressure to cool a first working fluid;

a first condenser capable of condensing the first adsorbent refrigerant in gaseous state;

a third adsorber containing a third adsorbent capable of adsorbing and desorbing a second adsorbent refrigerant;

a fourth adsorber containing a fourth adsorbent capable of adsorbing and desorbing the second adsorbent refrigerant;

a second evaporator capable of evaporating the second adsorbent refrigerant under reduced pressure to exhibit a cooling capacity, a second condenser capable of condensing the second adsorbent refrigerant in gaseous state, a first heat exchanger capable of applying heat absorbed from a first heat source to a first heating medium, a second heat exchanger capable of removing and releasing heat from a second heating medium, and a controller that performs control for switching to any of a first state, a second state, a third state, and a fourth state; and (b) performing switching to any of the first state, the second state, the third state, and the fourth state, wherein:

in the first state, the first evaporator is connected to the first adsorber, the second evaporator is connected to the third adsorber, an inlet port of the second adsorber is connected to an outlet port of the first heat exchanger, and an outlet port of the second adsorber is connected to an inlet port of the first heat exchanger, so that a first circulation path is formed, the first heating medium which has flown out of the outlet port of the first heat exchanger flows into the inlet port of the second adsorber, the first adsorbent refrigerant adsorbed by the second adsorbent is desorbed by heat of the first heating medium heated by the first heat exchanger in the second adsorber, the first heating medium which has flown out of the outlet port of the second adsorber flows into the inlet port of the first heat exchanger, an inlet port of the third adsorber is connected to an outlet port of the second heat exchanger, an outlet port of the third adsorber is connected to an inlet port of the second condenser, an outlet port of the second condenser is connected to an inlet port of the first condenser, and an outlet port of the first condenser is connected to an inlet port of the second heat exchanger, so that a second circulation path is formed, the second heating medium which has flown out of the outlet port of the second heat exchanger flows into the inlet port of the third adsorber, the second adsorbent refrigerant evaporated by the second evaporator is adsorbed by the third adsorbent in the third adsorber to heat the second heating medium, the second heating medium which has flown out of the outlet port of the third adsorber flows into the inlet port of the second condenser, the second heating medium which has flown out of the outlet port of the second condenser flows into the inlet port of the first condenser, the second heating medium which has flown out of the outlet port of the first condenser flows into the inlet port of the second heat exchanger, an outlet port of the first adsorber is connected to an inlet port of the fourth adsorber, and an inlet port of the first adsorber is connected to an outlet port of the fourth adsorber, so that a third circulation path is formed, the first adsorbent refrigerant evaporated by the first evaporator is adsorbed by the first adsorbent in the first adsorber to heat a third heating medium, the third heating medium which has flown out of the outlet port of the first adsorber flows into the inlet port of the fourth adsorber,
the second adsorbent refrigerant adsorbed by the fourth adsorbent is desorbed by heat of the heated third heating medium in the fourth adsorber, and
the third heating medium which has flown out of the outlet port of the fourth adsorber flows into the inlet port of the first adsorber;
in the second state,
the first evaporator is connected to the second adsorber,
the second evaporator is connected to the fourth adsorber,
the inlet port of the first adsorber is connected to the outlet port of the first heat exchanger, and the outlet port of the first adsorber is connected to the inlet port of the first heat exchanger, so that a fourth circulation path is formed,
the first heating medium which has flown out of the outlet port of the first heat exchanger flows into the inlet port of the first adsorber,
the first adsorbent refrigerant adsorbed by the first adsorbent is desorbed by heat of the first heating medium heated by the first heat exchanger in the first adsorber,
the first heating medium which has flown out of the outlet port of the first adsorber flows into the inlet port of the first heat exchanger,
the inlet port of the fourth adsorber is connected to the outlet port of the second heat exchanger, the outlet port of the fourth adsorber is connected to the inlet port of the second condenser, the outlet port of the second condenser is connected to the inlet port of the first condenser, and the outlet port of the first condenser is connected to the inlet port of the second heat exchanger, so that a fifth circulation path is formed,
the second heating medium which has flown out of the outlet port of the second heat exchanger flows into the inlet port of the fourth adsorber,
the second adsorbent refrigerant evaporated by the second evaporator is adsorbed by the fourth adsorbent in the fourth adsorber to heat the second heating medium,
the second heating medium which has flown out of the outlet port of the fourth adsorber flows into the inlet port of the second condenser,
the second heating medium which has flown out of the outlet port of the second condenser flows into the inlet port of the first condenser,
the second heating medium which has flown out of the outlet port of the first condenser flows into the inlet port of the second heat exchanger,
the outlet port of the second adsorber is connected to the inlet port of the third adsorber, and the inlet port of the second adsorber is connected to the outlet port of the third adsorber, so that a sixth circulation path is formed,
the first adsorbent refrigerant evaporated by the first evaporator is adsorbed by the second adsorbent in the second adsorber to heat the third heating medium,
the third heating medium which has flown out of the outlet port of the second adsorber flows into the inlet port of the third adsorber,
the second adsorbent refrigerant adsorbed by the third adsorbent is desorbed by heat of the third heating medium in the third adsorber, and
the third heating medium which has flown out of the outlet port of the third adsorber flows into the inlet port of the second adsorber;
in the third state,
the first evaporator is connected to the first adsorber,
the second evaporator is connected to the fourth adsorber,
the inlet port of the second adsorber is connected to the outlet port of the first heat exchanger, and the outlet port of the second adsorber is connected to the inlet port of the first heat exchanger, so that the first circulation path is formed,
the first adsorbent refrigerant adsorbed by the second adsorbent is desorbed by heat of the first heating medium heated by the first heat exchanger in the second adsorber,
the first heating medium which has flown out of the outlet port of the first heat exchanger flows into the inlet port of the second adsorber,
the first heating medium which has flown out of the outlet port of the second adsorber flows into the inlet port of the first heat exchanger,
the inlet port of the fourth adsorber is connected to the outlet port of the second heat exchanger, the outlet port of the fourth adsorber is connected to the inlet port of the second condenser, the outlet port of the second condenser is connected to the inlet port of the first condenser, and the outlet port of the first condenser is connected to the inlet port of the second heat exchanger, so that the fifth circulation path is formed,
the second heating medium which has flown out of the outlet port of the second heat exchanger flows into the inlet port of the fourth adsorber,
the second adsorbent refrigerant evaporated by the second evaporator is adsorbed by the fourth adsorbent in the fourth adsorber to heat the second heating medium,
the second heating medium which has flown out of the outlet port of the fourth adsorber flows into the inlet port of the second condenser,
the second heating medium which has flown out of the outlet port of the second condenser flows into the inlet port of the first condenser,
the second heating medium which has flown out of the outlet port of the first condenser flows into the inlet port of the second heat exchanger,
the outlet port of the first adsorber is connected to the inlet port of the third adsorber, and the inlet port of the first adsorber is connected to the outlet port of the third adsorber, so that a seventh circulation path is formed,
the first adsorbent refrigerant evaporated by the first evaporator is adsorbed by the first adsorbent in the first adsorber to heat the third heating medium,
the third heating medium which has flown out of the outlet port of the first adsorber flows into the inlet port of the third adsorber,
the second adsorbent refrigerant adsorbed by the third adsorbent is desorbed by heat of the third heating medium in the third adsorber, and
the third heating medium which has flown out of the outlet port of the third adsorber flows into the inlet port of the first adsorber; and
in the fourth state,
the first evaporator is connected to the second adsorber,
the second evaporator is connected to the third adsorber,
the inlet port of the first adsorber is connected to the outlet port of the first heat exchanger, and the outlet port of the first adsorber is connected to the inlet port of the first heat exchanger, so that the fourth circulation path is formed,
the first heating medium which has flown out of the outlet port of the first heat exchanger flows into the inlet port of the first adsorber, the first adsorbent refrigerant adsorbed by the first adsorbent is desorbed by heat of the first heating medium heated by the first heat exchanger in the first adsorber, the first heating medium which has flown out of the outlet port of the first adsorber flows into the inlet port of the first heat exchanger, the inlet port of the third adsorber is connected to the outlet port of the second heat exchanger, the outlet port of the third adsorber is connected to the inlet port of the second condenser, the outlet port of the second condenser is connected to the inlet port of the first condenser, and the outlet port of the first condenser is connected to the inlet port of the second heat exchanger, so that the second circulation path is formed, the second heating medium which has flown out of the outlet port of the second heat exchanger flows into the inlet port of the third adsorber, the second adsorbent refrigerant evaporated by the second evaporator is adsorbed by the third adsorbent in the third adsorber to heat the second heating medium, the second heating medium which has flown out of the outlet port of the third adsorber flows into the inlet port of the second condenser, the second heating medium which has flown out of the outlet port of the second condenser flows into the inlet port of the first condenser, the second heating medium which has flown out of the outlet port of the first condenser flows into the inlet port of the second heat exchanger, the outlet port of the second adsorber is connected to the inlet port of the fourth adsorber, and the inlet port of the second adsorber is connected to the outlet port of the fourth adsorber, so that an eighth circulation path is formed, the first adsorbent refrigerant evaporated by the first evaporator is adsorbed by the second adsorbent in the second adsorber to heat the third heating medium, the third heating medium which has flown out of the outlet port of the second adsorber flows into the inlet port of the fourth adsorber, the second adsorbent refrigerant adsorbed by the fourth adsorbent is desorbed by heat of the third heating medium in the fourth adsorber, and the third heating medium which has flown out of the outlet port of the fourth adsorber flows into the inlet port of the second adsorber.

11. A cooling system comprising:
the adsorption refrigerator according to claim 3;
a first heat supply device as the first heat source; and
a second heat supply device as the second heat source.

* * * * *